US010505407B2

(12) United States Patent
Nagao et al.

(10) Patent No.: US 10,505,407 B2
(45) Date of Patent: Dec. 10, 2019

(54) BRUSHLESS MOTOR, STATOR, STATOR MANUFACTURING METHOD AND BRUSHLESS MOTOR MANUFACTURING METHOD

(71) Applicant: ASMO CO., LTD., Kosai, Shizuoka-pref. (JP)

(72) Inventors: Yoshinobu Nagao, Kosai (JP); Satoru Suzuki, Toyohashi (JP); Takashi Nagaya, Kosai (JP); Yoshihiro Adachi, Hamamatsu (JP); Yukihide Ishino, Hamamatsu (JP); Yoshitsugu Nakagawa, Kosai (JP); Masaru Irie, Kosai (JP); Toshihiro Matsuura, Kosai (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 487 days.

(21) Appl. No.: 15/427,783

(22) Filed: Feb. 8, 2017

(65) Prior Publication Data
US 2017/0149316 A1    May 25, 2017

Related U.S. Application Data

(62) Division of application No. 13/972,914, filed on Aug. 22, 2013, now Pat. No. 9,806,566.

(30) Foreign Application Priority Data

Aug. 30, 2012 (JP) .................................. 2012-190204
Aug. 30, 2012 (JP) .................................. 2012-190205
(Continued)

(51) Int. Cl.
*H02K 1/14* (2006.01)
*B21D 53/00* (2006.01)
(Continued)

(52) U.S. Cl.
CPC ............. *H02K 1/148* (2013.01); *B21D 53/00* (2013.01); *H02K 1/185* (2013.01); *H02K 3/345* (2013.01);
(Continued)

(58) Field of Classification Search
CPC ..................................................... B21D 53/00
See application file for complete search history.

(56) References Cited

U.S. PATENT DOCUMENTS

| 4,894,738 A | 1/1990 | Elsasser et al. |
| 2003/0062795 A1 | 4/2003 | Otsuki et al. |

(Continued)

FOREIGN PATENT DOCUMENTS

| CN | 1411122 A | 4/2003 |
| CN | 102457149 A | 5/2012 |

(Continued)

OTHER PUBLICATIONS

English language translation of the following: Office action dated Jan. 24, 2017 from the JPO in a Japanese patent application No. 2013-159014 corresponding to the instant patent application. This office action translation is submitted now in order to supplement the understanding of the cited reference which is being disclosed in the instant Information Disclosure Statement.

(Continued)

*Primary Examiner* — Pradeep C Battula
(74) *Attorney, Agent, or Firm* — Solaris Intellectual Property Group, PLLC

(57) ABSTRACT

A brushless motor comprising: a rotor; a stator core disposed at a radial direction outside of the rotor, and a stator case. The stator core includes an outer ring shaped section, teeth sections projecting out from the outer ring shaped section toward a radial direction inside, and an inner ring shaped section extending from end portions of the teeth sections.

(Continued)

Protruding portions are formed at the outer ring shaped section so as to project toward a radial direction outside and so as to be disposed at even intervals around a circumferential direction of the outer ring shaped section. The stator case is integrated together with the stator core by a plurality of plastic deformation portions formed at an outer peripheral portion of the stator case at locations facing towards the protruding portions, and the plastic deformation portions are disposed at even intervals along a circumferential direction of the stator case.

5 Claims, 52 Drawing Sheets

(30) Foreign Application Priority Data

| | | | |
|---|---|---|---|
| Jan. 10, 2013 | (JP) | ............................... | 2013-002762 |
| Jan. 10, 2013 | (JP) | ............................... | 2013-002763 |
| Jan. 28, 2013 | (JP) | ............................... | 2013-013504 |
| Jan. 28, 2013 | (JP) | ............................... | 2013-013505 |
| Jul. 31, 2013 | (JP) | ............................... | 2013-159014 |

(51) Int. Cl.
| | |
|---|---|
| *H02K 3/34* | (2006.01) |
| *H02K 15/02* | (2006.01) |
| *H02K 1/18* | (2006.01) |
| *H02K 15/14* | (2006.01) |
| *H02K 5/04* | (2006.01) |
| *H02K 3/52* | (2006.01) |
| *H02K 1/27* | (2006.01) |

(52) U.S. Cl.
CPC ........... *H02K 15/022* (2013.01); *H02K 15/14* (2013.01); *H02K 1/278* (2013.01); *H02K 3/52* (2013.01); *H02K 3/522* (2013.01); *H02K 5/04* (2013.01); *Y10T 29/49009* (2015.01)

(56) References Cited

U.S. PATENT DOCUMENTS

| | | |
|---|---|---|
| 2005/0115055 A1 | 6/2005 | Kimura et al. |
| 2007/0159022 A1 | 7/2007 | Lung et al. |
| 2009/0065233 A1 | 3/2009 | Hansen et al. |
| 2010/0007236 A1 | 1/2010 | Sano et al. |
| 2011/0169367 A1 | 7/2011 | Bourqui et al. |
| 2011/0302769 A1 | 12/2011 | Saito et al. |
| 2012/0098381 A1 | 4/2012 | Seki et al. |
| 2012/0161581 A1 | 6/2012 | Hama |
| 2012/0286593 A1* | 11/2012 | Yokogawa ............. H02K 3/522 310/43 |
| 2012/0286619 A1* | 11/2012 | Tsuiki .................... H02K 3/522 310/215 |
| 2012/0293024 A1* | 11/2012 | Yokogawa ............. H02K 3/522 310/43 |
| 2012/0299432 A1* | 11/2012 | Ishino .................... H02K 3/522 310/215 |

FOREIGN PATENT DOCUMENTS

| | | |
|---|---|---|
| EP | 1499000 A1 | 1/2005 |
| JP | 2001-218429 A | 8/2001 |
| JP | 2003-158833 A | 5/2003 |
| JP | 2003-348801 A | 12/2003 |
| JP | 2004-23872 A | 1/2004 |
| JP | 2007-43845 A | 2/2007 |
| JP | 2009-44803 A | 2/2009 |
| JP | 2009-118680 A | 5/2009 |
| JP | 2010-148329 A | 7/2010 |
| JP | 2011-142811 A | 7/2011 |
| JP | 2012-5198 A | 1/2012 |
| JP | 2012-110212 A | 6/2012 |
| JP | 2012-161237 A | 8/2012 |

OTHER PUBLICATIONS

Japanese Office Action dated Feb. 23, 2016, which was issued in the corresponding Japanese Patent Application No. 2012-190204.
Japanese Office Action dated Feb. 23, 2016, which was issued in the corresponding Japanese Patent Application No. 2012-190205.
Japanese Office Action dated Jun. 14, 2016, which was issued in the corresponding Japanese Patent Application No. 2013-002763.
Japanese Office Action dated Jul. 26, 2016, which was issued in the corresponding Japanese Patent Application No. 2013-002762.
Japanese Office Action (Decision on Refusal) dated Aug. 9, 2016, which was issued in the corresponding Japanese Patent Application No. 2012-190204.
Chinese Office Action dated Oct. 21, 2016, which was issued in the corresponding Chinese Patent Application No. 201310388866.X.
Non-Final Office Action in co-pending U.S. Appl. No. 13/972,914 dated Feb. 11, 2016.
Final Office Action in co-pending U.S. Appl. No. 13/972,914 dated Sep. 9, 2016.
English language translation of the following: Office action dated Sep. 13, 2018 from the SIPO in a Chinese patent application No. 201710074151.5 corresponding to the instant patent application. This office action translation is submitted now in order to supplement the understanding of the cited reference which is being disclosed in the instant Information Disclosure Statement.

\* cited by examiner

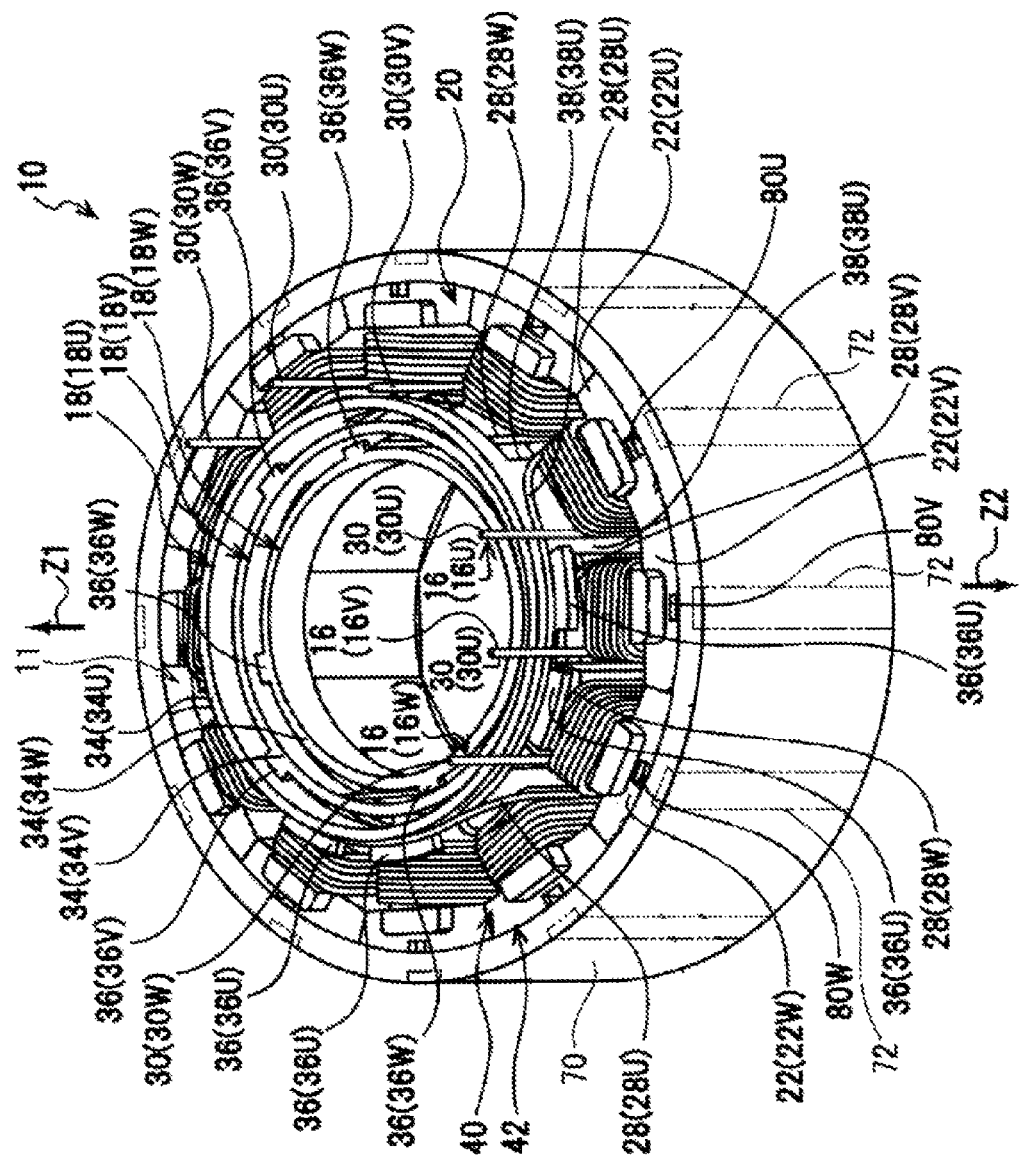

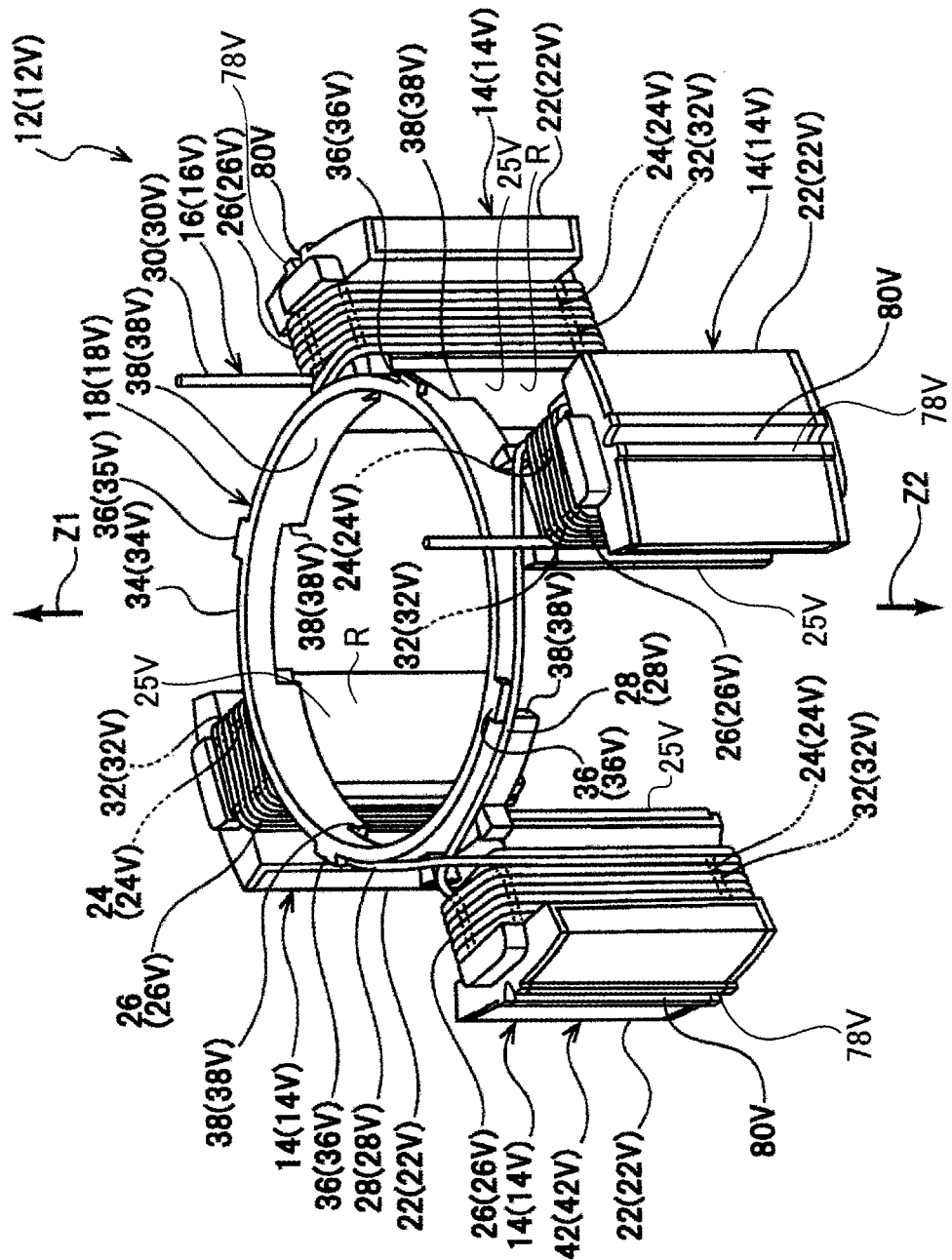

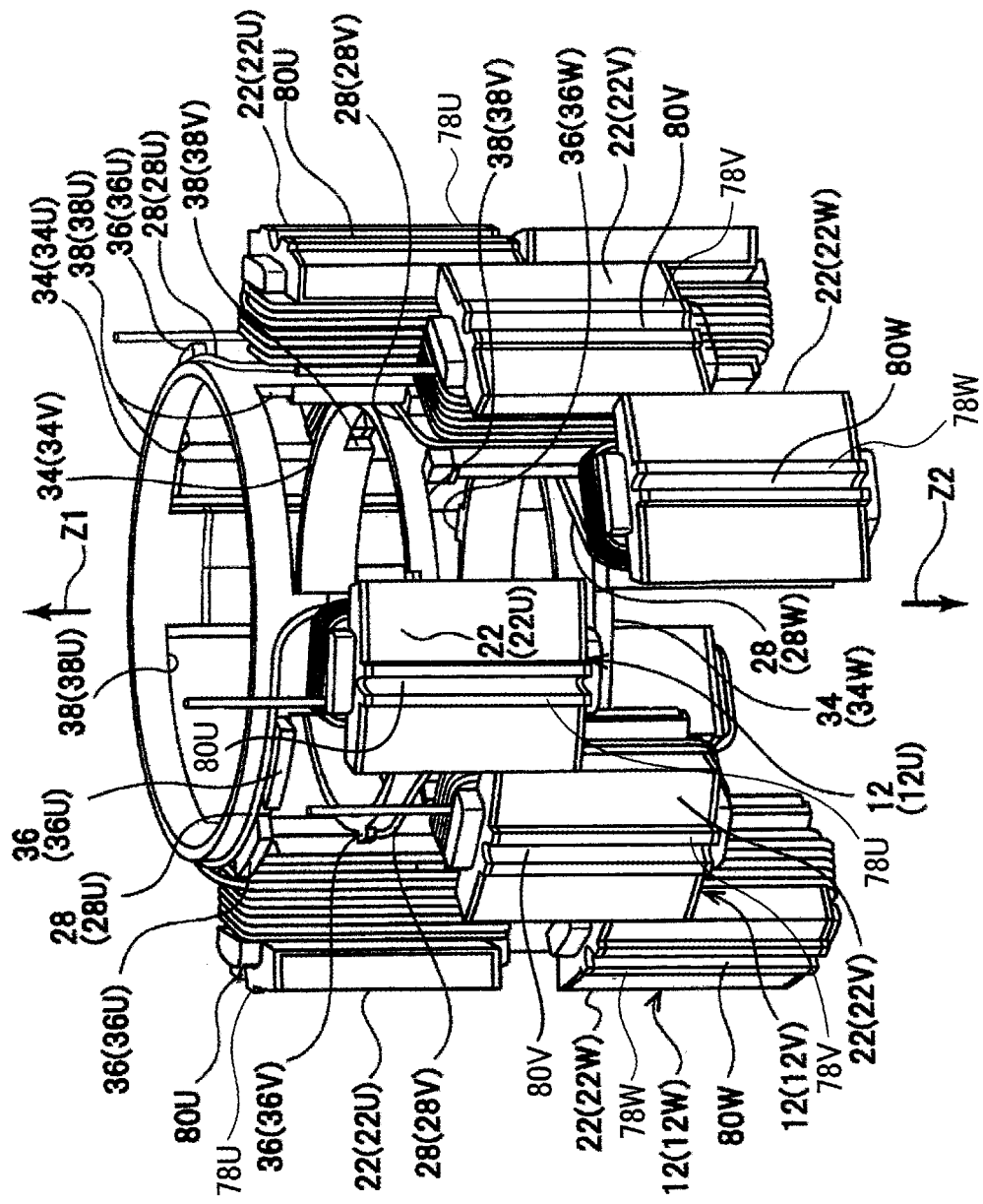

FIG. 4B
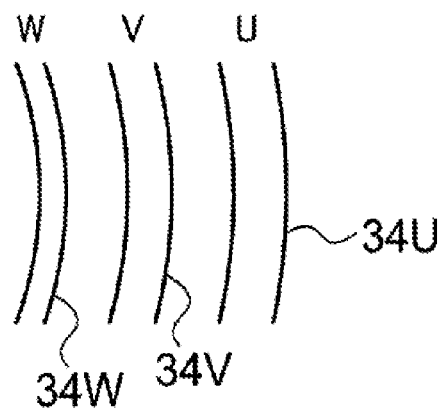
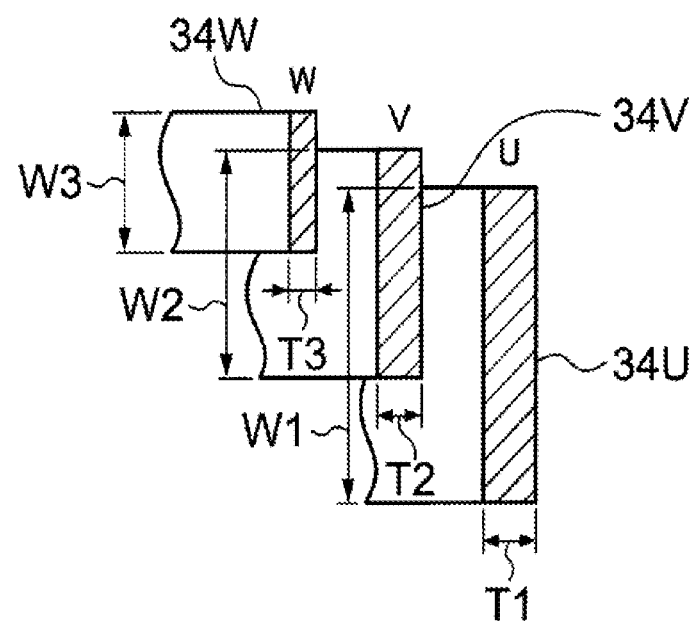

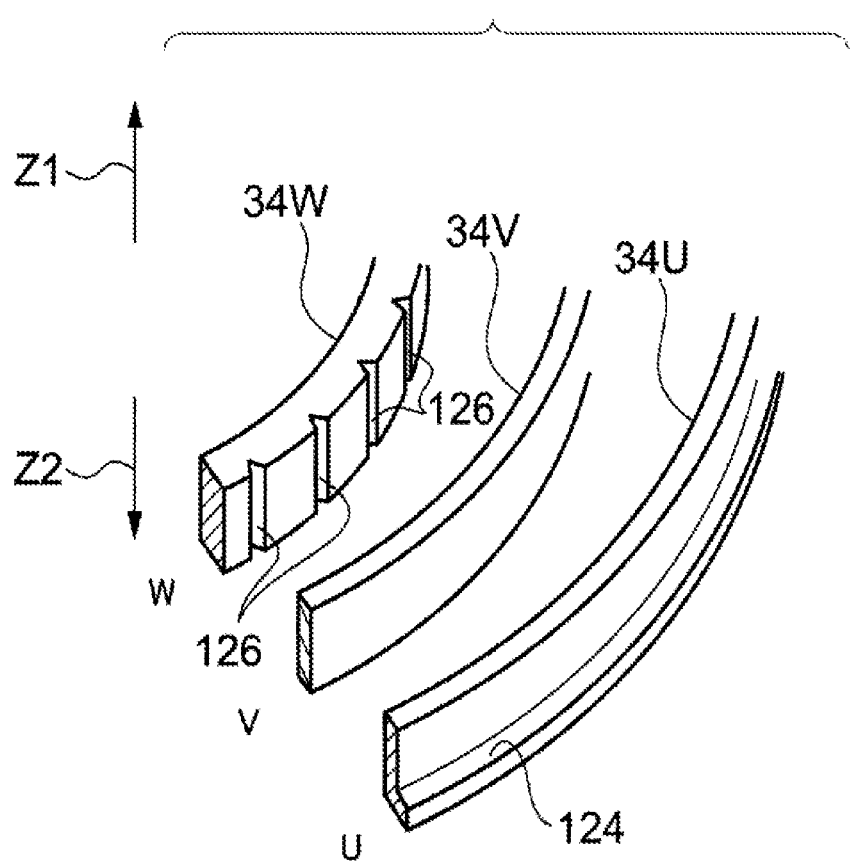

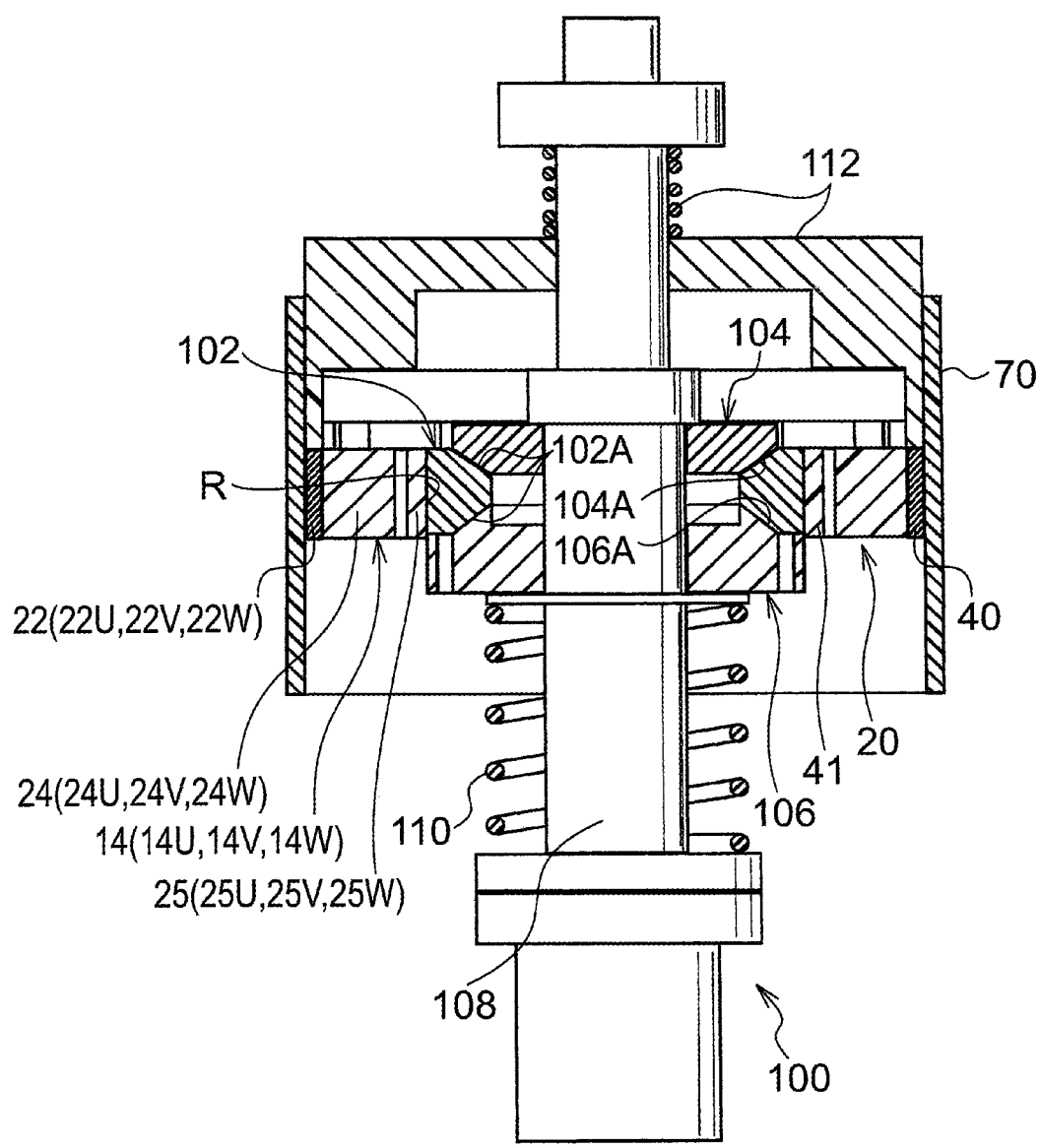

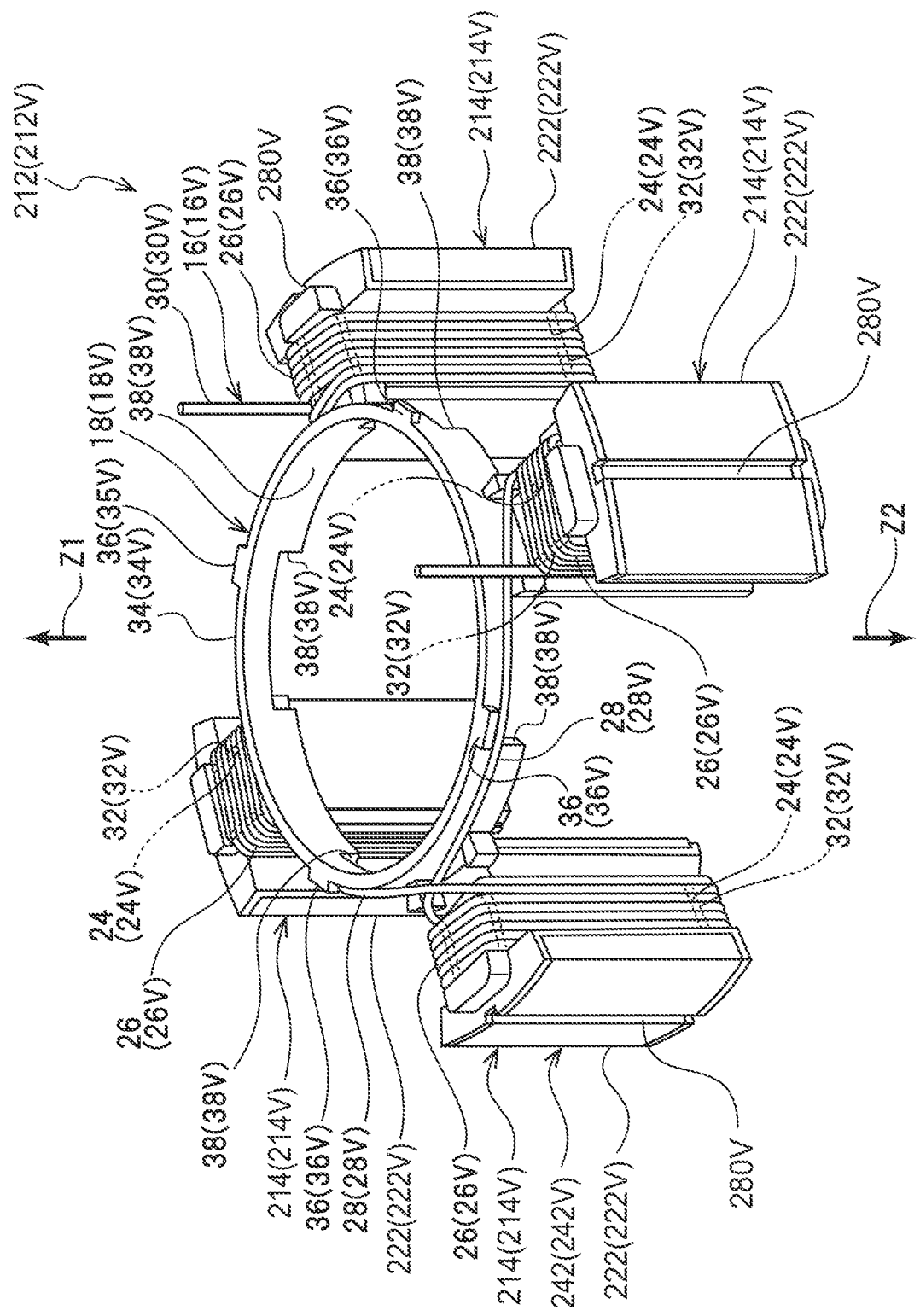

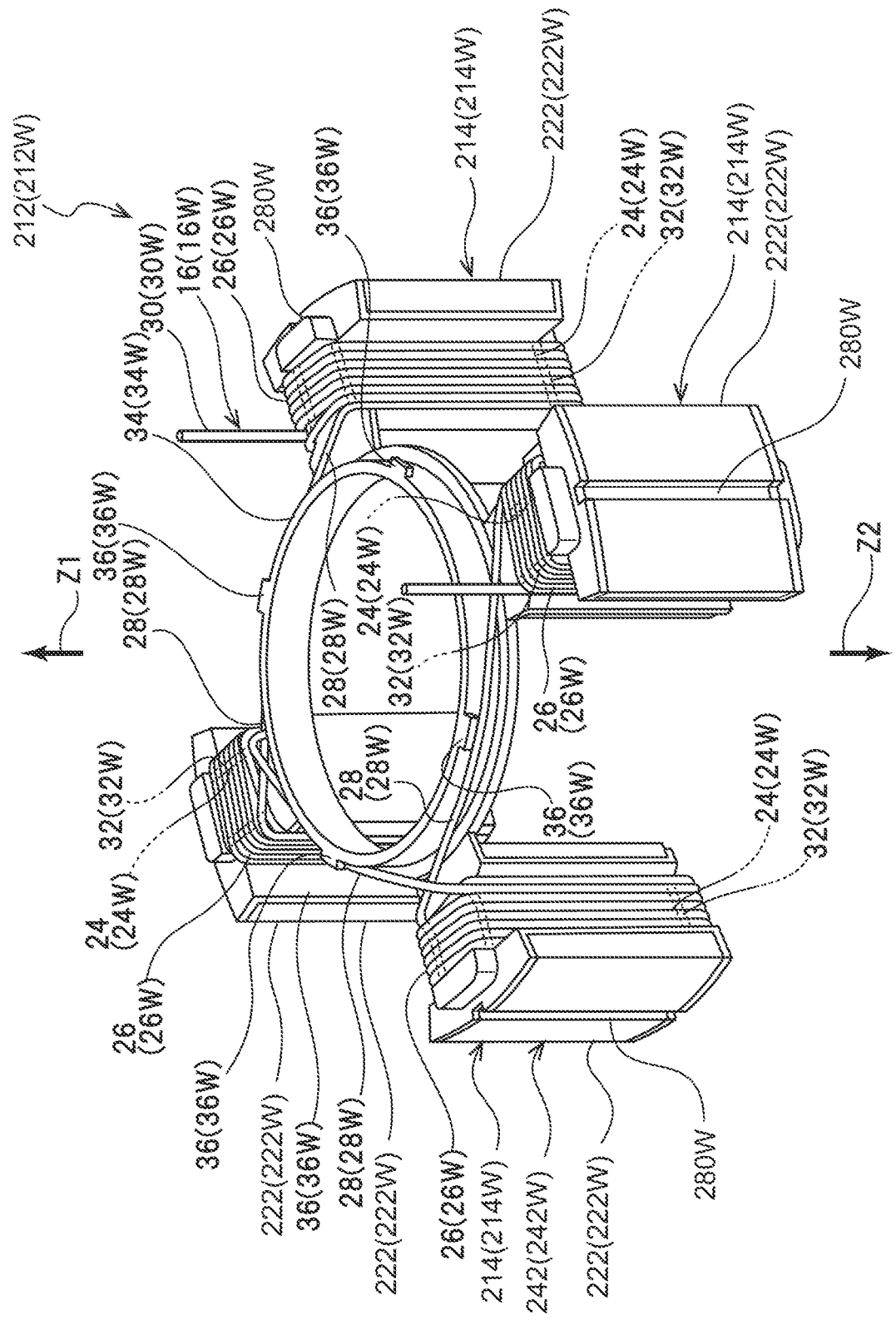

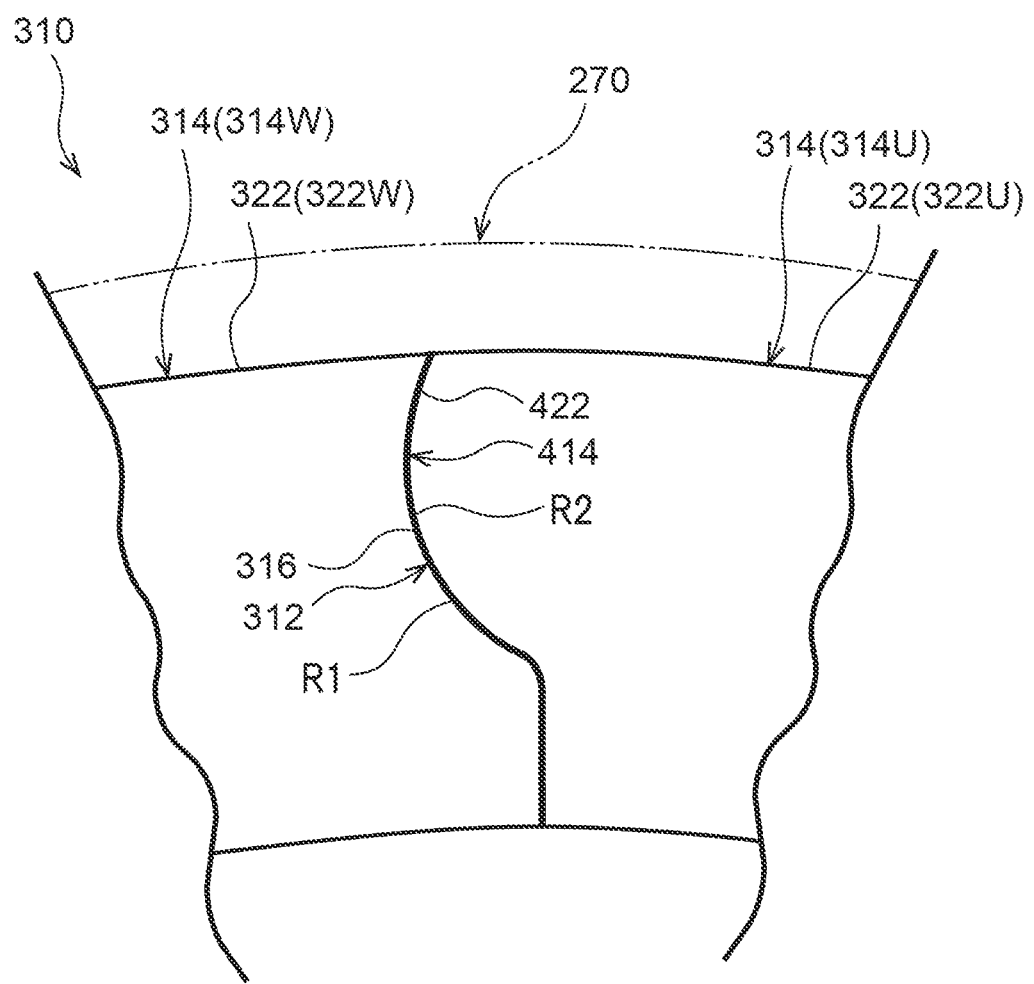

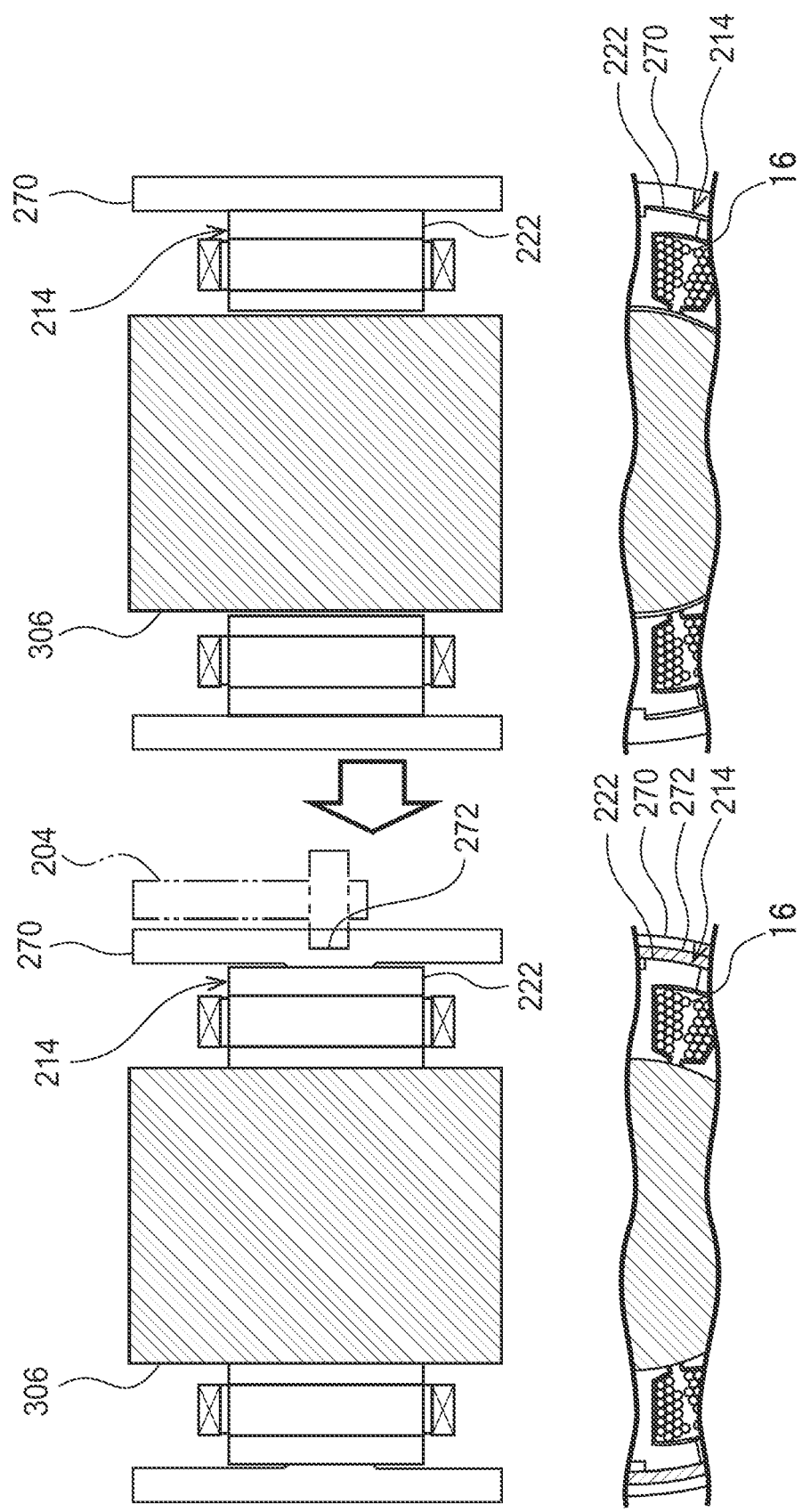

BRUSHLESS MOTOR, STATOR, STATOR MANUFACTURING METHOD AND BRUSHLESS MOTOR MANUFACTURING METHOD

CROSS-REFERENCE TO RELATED APPLICATIONS

This application is a divisional application of U.S. application Ser. No. 13/972,914, filed on Aug. 22, 2013, which claims priority under 35 U.S.C. § 119 from Japanese Patent Applications No. 2012-190204 and No. 2012-190205, filed on Aug. 30, 2012, Japanese Patent Applications No. 2013-002762 and No. 2013-002763, filed on Jan. 10, 2013, Japanese Patent Applications No. 2013-013504 and No. 2013-013505, filed on Jan. 28, 2013, and Japanese Patent Application No. 2013-159014, filed on Jul. 31, 2013. The entire disclosures of all of the applications identified above are incorporated by reference herein.

BACKGROUND OF THE INVENTION

Technical Field

The present invention relates to a brushless motor and a stator.

Related Art

A brushless motor described in Japanese Patent Application Laid-Open (JP-A) No. 2011-142811 is configured including a case (stator housing) formed in a bottomed cylinder shape, a stator core disposed at the radial direction inside of the case and supported by the case, and a rotor disposed at the radial direction inside of the stator core. As a brief explanation of the technology described in this reference document: an indentation portion (dip) extending in the case axial direction is provided at an outer peripheral portion of the stator core, and at a location on the case facing to the indentation portion, a plastic deformation portion is formed towards the indentation portion with a protruding profile towards the case radial direction inside. The internal diameter at the location of the case where the plastic deformation portion is formed is accordingly reduced, thereby integrating the case and the stator core together.

SUMMARY

However, in the configuration described in the above reference document, deterioration of the circularity of the stator core is conceivable when the outer peripheral portion of the stator core is pressed by the portion of the case due to forming the plastic deformation portion on the outer peripheral portion of the case. Moreover, in the configuration described in the above reference document, the fixing force in the circumferential direction between the case and the stator core is high because the location on the case where the plastic deformation portion is formed is engaged with the indentation portion formed at the outer peripheral portion of the stator core, however the fixing force in the axial direction is comparatively low.

In consideration of the above circumstances, the present invention obtains a brushless motor capable of improving the circularity of the stator core and improving the fixing force between the case and the stator core.

A brushless motor of a first aspect of the present invention includes: a rotor that includes a rotation shaft section that is supported so as to be rotatable about its axial line and magnets that are disposed along a circumferential direction of the rotation shaft section; a stator core that is disposed at a radial direction outside of the rotor, and that includes an outer ring shaped section that is formed in a ring shape, teeth sections that project out from the outer ring shaped section toward a radial direction inside of the outer ring shaped section and are wound with conductive wire coils, and an inner ring shaped section that is configured by rotor-side faces that extend from end portions of the teeth sections that are adjacent to the rotor along a rotor circumferential direction and that configure circular arc shaped faces with the rotor as the axial center, wherein protruding portions are formed at the outer ring shaped section so as to project toward a radial direction outside of the outer ring shaped section and so as to be disposed at even intervals around a circumferential direction of the outer ring shaped section as viewed along an axial direction of the outer ring shaped section; and a stator case that is formed in a cylindrical shape so as to cover the stator core from the radial direction outside of the stator core and that is integrated together with the stator core by plural plastic deformation portions formed at an outer peripheral portion of the stator case at locations facing towards the protruding portions, and wherein the plural plastic deformation portions are disposed at even intervals along a circumferential direction of the outer peripheral portion as viewed along the axial direction of the outer ring shaped section.

In the first aspect, the brushless motor is configured with the rotor, stator core and the stator case configured as described above. The rotor with magnets is rotated about the axial center of the rotation shaft section by a rotating magnetic field that occurs in the stator core and the case when a current is passed through the coil wires.

Moreover, in the first aspect, the stator core is configured with the outer ring shaped section, the teeth sections and the inner ring shaped section as described above, and the stator core is integrated together with the case. The rotor-side faces of the inner ring shaped section configure circular arc shaped faces with the rotor as the axial center. It is accordingly possible to form the plastic deformation portions at the outer peripheral portion of the case in a state in which a metal core formed in a circular column shape (or for example a circular cylinder shape) corresponding to an internal diameter of the circular arc shaped faces is disposed at the radial direction inside of the inner ring shaped section. The circularity of the inner ring shaped section of the stator core is accordingly maintained even though locations of the case where the plastic deformation portions are formed press the outer ring shaped section (protruding portions) of the stator core.

Moreover, the protruding portion formed at the outer ring shaped section of the stator core face toward the plastic deformation portion formed at the outer peripheral portion of the case. Hence, when forming the plastic deformation portion at the outer peripheral portion of the case, stress is accordingly concentrated at locations of the case where the plastic deformation portion is formed, and at locations of the outer ring shaped section of the stator core where the protruding portions are formed. The tightness of fit between the locations of the case where the plastic deformation portions are formed and the locations of the outer ring shaped section of the stator core where the protruding portions are formed is accordingly raised, thereby improving the fixing force between the case and the stator core.

Moreover, the protruding portions formed at the outer ring shaped section are disposed at even intervals around the circumferential direction of the outer ring shaped section as viewed along the axial direction of the outer ring shaped section, and the plural plastic deformation portions are disposed at even intervals along the circumferential direction of the outer peripheral portion of the case as viewed along the axial direction of the outer ring shaped section. The outside configuring sections of the stator core are according pressed by the case uniformly around the circumferential direction of the case.

As explained above, the circularity of the stator core and the fixing force between the case and the stator core can accordingly be improved.

A brushless motor of a second aspect of the present invention is the brushless motor of the first aspect, wherein the protruding portions are provided at locations facing towards the teeth sections.

The locations of the case formed with the plastic deformation portions press against the outer ring shaped section (protruding portions) of the stator core and a pressing force by the locations of the case is transmitted through the teeth sections and the inner ring shaped section to the metal core disposed at the radial direction inside of the inner ring shaped section. In the second aspect, the protruding portions at the outer ring shaped section are formed at locations facing towards the teeth sections. The metal core is accordingly able to support the above pressing force perpendicularly. The tightness of fit between the locations of the case where the plastic deformation portions are formed and the locations of the outer ring shaped section of the stator core where the protruding portions are formed is raised thereby. As a result, the fixing force between the case and the stator core can be raised even more.

A brushless motor according to a third aspect of the present invention is the brushless motor of the first aspect or the second aspect, wherein 3×n (n=1, 2, 3, and so on) individual or 4×n (n=1, 2, 3, and so on) individual of the plural plastic deformation portions are formed at the outer peripheral portion of the stator case.

In the third aspect, the plastic deformation portions are formed in a multiple of three individual or a multiple of four individual (locations) on the outer peripheral portion of the case. The support force of the stator core from the case can be made uniform when the plastic deformation portions are formed in a multiple of three individual (locations). The support force of the stator core from the case can be made uniform when the plastic deformation portions are formed in a multiple of four individual (locations), and it is also possible to easily control processing when a tool is made to contact the outer peripheral portion of the case to form the plastic deformation portions.

A brushless motor of the fourth aspect of the present invention is the brushless motor of the first aspect or the second aspect, wherein: the stator core is configured with a segmented structure configured by arraying m individual core configuration sections in a ring shape; and there are m×n (n=1, 2, 3, and so on) individual of the plural plastic deformation portions formed to the outer peripheral portion of the stator case.

In the fourth aspect, the stator core is configured with a segmented structure configured by arraying m individual core configuration sections, and m times an integer of individual plastic deformation portions (locations) are formed at the outer peripheral portion of the case. The support force to the stator core by the case can accordingly be made uniform.

A brushless motor of a fifth aspect of the present invention is the first aspect, wherein: the outer ring shaped section is configured from plural yoke configuration sections that configure a ring shaped yoke and are segmented in a circumferential direction of the yoke, with the teeth sections respectively projecting out from the yoke configuration sections toward inside in the yoke radial direction; each of the plural core configuration sections is equipped with the yoke configuration section and the teeth section; the stator case is integrated together with the plural core configuration sections; the stator core further includes plural insulators, and each of the insulators includes plural insulating portions and connection portions. The insulating portions are integrated to the respective core configuration sections and insulate between the respective teeth sections and the winding portions. Each of the connection portions is formed in a ring shape and connects together the plural insulating portions. The plural insulators are configured such that a rigidity of the connection portion of one of the insulators is substantially the same as rigidities of each of all the other connection portions.

In the fifth aspect, the stator of the brushless motor is, for example, manufactured by the following technique. Namely, first the core configuration sections are integrated to the insulating portions of each of the insulators, forming plural sub-assemblies. Following on from this, coil wires are wound on each of the respective teeth sections of the respective sub-assemblies, forming plural stator configuration sections. In this state, the stator configuration sections are connected together by the connection portions. The plural stator configuration sections are then assembled together. Then the case disposed at the radial direction outside of the yoke is integrated together with the plural core configuration sections (the stator core). The stator of the brushless motor is manufactured by the above technique. In the present invention, the rigidities of the connection portions of the plural insulators are substantially the same as each other. In other words, the support rigidities for the stator configuration sections from the connection portions are substantially the same as each other. The array of the plural stator configuration sections is accordingly suppressed from becoming unbalanced due to differences between the rigidities of the respective connection portions. Thus in the present invention, the circularity of the stator core can be improved.

Note that reference to the rigidities of the respective connection portions being substantially the same as each other is not limited to cases in which the rigidities of the respective connection portions are completely the same as each other. The rigidities of the respective connection portions may slightly vary within a range in which the above operation and advantageous effects are obtained.

A brushless motor of a sixth aspect of the present invention is the brushless motor of the fifth aspect, wherein: the connection portions of the plural insulators are disposed adjacent to each other in a radial direction of the insulator, and the rigidities of the connection portions are adjusted so as to be substantially the same as each other by adjusting at least one factor from the group consisting of wall thickness in the axial direction, wall thickness in the radial direction, and cross-section profile of each of the connection portions.

In the sixth aspect, the rigidities of the respective connection portions may be easily adjusted by adjusting the wall thickness in the axial direction, the wall thickness in the radial direction, or the cross-section profile of each of the connection portions.

A brushless motor of a seventh aspect of the present invention is the brushless motor of the fifth aspect to the sixth aspect, wherein: the rigidities of each of the connection portions are adjusted so as to be substantially the same as each other by selecting materials for the respective connection portions such that Young's modulus of the material of one of the connection portions out of the connection portions is lower than Young's modulus of the material of another of the connection portions that is disposed outside in the radial direction of the one connection portion.

In the seventh aspect, the rigidities of the respective connection portions may be easily adjusted by selecting the materials of each of the connection portions.

A brushless motor of an eighth aspect of the present invention is the brushless motor of any one of the fifth aspect to the seventh aspect, wherein: the rigidities of each of the connection portions are adjusted so as to be substantially the same as each other by providing at least one of the connection portions out of the connection portions with a radial direction extending rib.

In the eighth aspect, the rigidities of the respective connection portions may be easily adjusted by providing the radial direction extending rib at the connection portion.

A brushless motor of a ninth aspect of the present invention is the brushless motor of any one of the fifth aspect to the eighth aspect, wherein: the rigidities of each of the connection portions are adjusted so as to be substantially the same as each other by providing a notch in at least one of the connection portions out of the connection portions.

In the ninth aspect, the rigidities of the respective connection portions may be easily adjusted by providing a notch in the connection portion. A rigidity balance in the circumferential direction, the radial direction and the axial direction of the connection portions can also be easily adjusted by appropriately setting the location and number of the notches provided.

A brushless motor of the tenth aspect of the present invention is the brushless motor of the fifth aspect, wherein: the rigidities of each of the connection portions are adjusted so as to be substantially the same as each other by disposing the connection portions adjacent to each other in an axial direction of the connection portions and making the cross-section profile of each of the connection portions the same as each other.

In the tenth aspect, the respective connection portions are disposed adjacent to each other in the axial direction thereof, and the cross-section profiles of the respective connection portions are made the same as each other, thereby enabling a portion of a brushless motor to be made more compact in the stator radial direction.

A stator of an eleventh aspect of the present invention includes: core configuration sections and a stator case. The core configuration sections include yoke configuration sections that configure a ring shaped yoke and are segmented on a circumferential direction of the yoke, and teeth sections that project out from the yoke configuration sections toward inside in a yoke radial direction. The stator case is formed in a circular cylinder shape with an internal diameter that exceeds an outer diameter of the ring shape-arrayed core configuration sections. The stator case is formed using a soft magnetic metal and is integrated to the core configuration sections by forming a plastic deformation portion on an outer peripheral face of the stator case by applying pressure toward inside in a radial direction of the stator case.

In the eleventh aspect, the stator case is formed in a circular cylinder shape, and a magnetic flux path is secured through the stator case even if the yoke configuration sections of the ring shape-arrayed core configuration sections are not certain to make contact with each other. In the present invention, coil wire is easily wound on the teeth sections due to the yoke being configured in a segmented structure by arraying core configuration sections in a ring shape. Namely, the present invention enables a stator that is easily wound with coil wire whilst still securing the specific magnetic flux path.

A stator manufacturing method of a twelfth aspect of the present invention includes: a core array process in which core configuration sections are arrayed in a ring shape, each of the core configuration sections includes a yoke configuration section and a teeth section, the yoke configuration sections configure a ring shaped yoke and are segmented in a circumferential direction of the yoke and teeth sections project out from the yoke configuration sections toward a radial direction inside of the yoke; a metal core setting process in which a metal core with an outer diameter corresponding to an internal diameter of the ring shape-arrayed core configuration sections is inserted into an inner peripheral portion of the ring shape-arrayed core configuration sections; and a crimping process that integrates a stator case and the core configuration sections together by disposing a metal stator case, formed in a circular cylinder shape with an internal diameter that exceeds an outer diameter of the ring shape-arrayed core configuration sections, along an outer peripheral portion of the core configuration sections and forming a plastic deformation portion along a circumferential direction on an outer peripheral face of the stator case.

In the twelfth aspect, first the core configuration sections are disposed in a ring shape. Then the metal core with the outer diameter corresponding to the internal diameter of the ring shape-arrayed core configuration sections is inserted into the inner peripheral portion of the core configuration sections. Then the metal stator case with the internal diameter that exceeds the outer diameter of the ring shape-arrayed core configuration sections is disposed along the outer peripheral face of the core configuration sections. Then the stator case and the core configuration sections are integrated together by forming a plastic deformation portion along the circumferential direction on an outer peripheral face of the stator case.

The plastic deformation portion is formed at the outer peripheral face of the stator case after inserting the metal core into the inner peripheral portion of the core configuration sections. Consequently, the arraying of the ring shape-arrayed core configuration sections is not disturbed even when the external force for forming the plastic deformation portion is transmitted to the ring shape-arrayed core configuration sections. Namely, the circularity of the ring shape-arrayed core configuration sections can be improved.

A stator manufacturing method of a thirteenth aspect of the present invention is the twelfth aspect, further including: a case measurement process that measures distortion of the stator case; and a metal core selection process that selects a metal core corresponding to distortion of the stator case measured in the case measurement process; and wherein in the crimping process distortion correction and crimping processes are performed to integrate the stator case and the core configuration sections together whilst correcting distortion of the stator case.

In the thirteenth aspect, first the core configuration sections are arrayed in a ring shape. Then distortion of the metal stator case is measured. Then a metal core corresponding to the distortion of the stator case is selected, and this metal core is inserted into the inner peripheral portion of the ring shape-arrayed core configuration sections. Then the stator case is disposed along the outer peripheral face of the ring shape-arrayed core configuration sections, and the plastic deformation portion is formed along the circumferential direction of the outer peripheral face of the stator case. As a result, in the present aspect, the stator case and the core configuration sections can be integrated together whilst correcting distortion of the stator case.

A stator manufacturing method of a fourteenth aspect of the present invention is the twelfth aspect or the thirteenth aspect, wherein: in the metal core setting process, the outer peripheral face of the metal core and the inner peripheral face of the core configuration sections are brought into contact with each other by expanding a diameter of the metal core.

In the fourteenth aspect, the outer peripheral face of the metal core and the inner peripheral face of the core configuration sections are brought into contact with each other by expanding the diameter of the metal core. The stator case and the core configuration sections are then integrated together by forming the plural plastic deformation portions on the outer peripheral face of the case at even intervals along the case circumferential direction. The plastic deformation portions are formed at the outer peripheral face of the case in a state in which the outer peripheral face of the metal core and the inner peripheral portion of the core configuration sections are in contact with each other, namely in a state in which the circularity of the inner peripheral portion of the core configuration sections is secured by the metal core. The circularity of the inner peripheral portion of the core configuration sections is accordingly maintained even though the external force for forming the plastic deformation portion is applied to the outer peripheral face of the case.

Moreover, when the external force for forming the plastic deformation portions is applied to the outer peripheral face of the case, the external force is supported by the metal core. Namely, the diameter of the inner peripheral portion of the core configuration sections does not decrease when the external force for forming the plastic deformation portions is applied to the outer peripheral face of the case. The tightness of fit between the locations of the case where the plastic deformation portions are formed and the outer peripheral portion of the core configuration sections is raised thereby, increasing the fixing force between the case and the core configuration sections.

As explained above, the stator manufacturing method of the present aspect enables the circularity of the core configuration sections and the fixing force between the case and the core configuration sections to be improved.

A stator manufacturing method of a fifteenth aspect of the present invention is the fourteen aspect, wherein: in the metal core setting process, an outer peripheral face of the core configuration sections and an inner peripheral face of the stator case are brought into contact with each other by further expanding the diameter of the metal core; and in the crimping process, plural of the plastic deformation portions are formed on the outer peripheral face of the stator case with the outer peripheral face of the core configuration sections and the inner peripheral face of the stator case in a contacting state.

In the fifteenth aspect, after the outer peripheral face of the metal core and the inner peripheral portion of the core configuration section are brought into contact with each other by expanding the diameter of the metal core, the outer peripheral face of the core configuration sections and the inner peripheral face of the case are then brought into contact with each other by further expanding the diameter of the metal core. Then, the plastic deformation portions are formed on the outer peripheral face of the stator case with the outer peripheral face of the core configuration sections and the inner peripheral face of the stator case in a contacting state. Due to forming the plastic deformation portions to the outer peripheral face of the stator case with the outer peripheral face of the core configuration sections and the inner peripheral face of the stator case in a contacting state, the tightness of fit between the locations of the stator case formed with the plastic deformation portions and outer peripheral face of the core configuration sections is raised even more. As a result, the fixing force between the stator case and the core configuration sections can be raised even higher.

A stator manufacturing method of a sixteenth aspect of the present invention is the stator manufacturing method of the fourteenth or fifteenth aspect, wherein the diameter of the metal core is compressed when a pressing force exceeding a specific value is input to the outer peripheral face of the stator case to form the plastic deformation portion.

In the sixteen aspect, when the external force (pressing force) is applied for forming the plastic deformation portions on the outer peripheral face of the case, the pressing force is supported by the metal core. Moreover, when the pressing force exceeds a specific value, the diameter of the metal core shrinks. The stator case and the core configuration sections can accordingly be integrated together with a desired fixing force.

A brushless motor manufacturing method of a seventeenth aspect of the present invention includes: a case placement process and a crimping process. In the case placement process, a stator case formed in a circular cylinder shape with an internal diameter that exceeds an outer diameter of a stator main body is disposed at outside in a radial direction of the stator main body. The stator main body includes plural core configuration sections, plural teeth sections, plural wire coils, and plural insulators. The plural core configuration sections include plural yoke configuration sections that configure a ring shaped yoke and are segmented in a circumferential direction of the yoke, and each of the plural teeth sections projects out from the respective yoke configuration sections toward inside in a yoke radial direction and are integrated together with the yoke configuration sections. The plural wire coils that form plural winding portions are wound on the respective teeth sections to configure plural phases. In the crimping process, the case and the stator main body are integrated together by forming a plastic deformation portion at an outer peripheral portion of the case by applying a processing force at respective locations, which face toward the respective yoke configuration sections, of the outer peripheral portion of the case. The processing force corresponds to a rigidity of at least one of a rigidity related to a specific position on the stator main body and/or a rigidity of the respective locations of the case, and the circularity of the stator main body is adjusted by integrating together the case and the stator main body.

In the seventeenth aspect, the stator for a brushless motor is manufactured through the case placement process and the crimping process described above. In the crimping process, the processing force is imparted to respective locations of the outer peripheral portion of the case facing towards the plural yoke configuration sections. The pressing force from the locations of the case where the plastic deformation portions are formed to the yoke configuration sections can accordingly be adjusted. Namely, in the present invention, the circularity of the stator main body is adjusted by adjusting the pressing force, thereby enabling the circularity of the stator core to be improved.

A brushless motor manufacturing method of an eighteenth aspect of the present invention is the seventeenth aspect, wherein: the stator main body further includes plural insulators that include plural insulating portions and a connection portion, the plural insulating portions are integrated to the respective core configuration sections and insulate between the teeth section and the winding portion and the connection portion is formed in a ring shape and connects the plural insulating portions together. In the crimping process, the processing force corresponding to the rigidity of the connection portions of the respective plural insulators is applied to the case.

In the eighteenth aspect, the circularity of the stator main body is improved even if the respective rigidities of the connection portions are different from each other.

A brushless motor manufacturing method of an nineteenth aspect of the present invention is the eighteenth aspect, wherein: the respective connection portions of the plural insulators are disposed adjacent to each other in a radial direction of the insulators; and in the crimping process, a weaker processing force is applied to the locations of the case, that face towards the yoke configuration sections of the core configuration sections that are connected to the connection portion disposed on the radial direction outside, than a processing force applied to locations of the face, that face towards the yoke configuration sections of the core configuration sections that are connected to the connection portion disposed on the radial direction inside.

In the nineteenth aspect, the pressing force is adjusted stronger or weaker in consideration of a reaction force from deformation of each of the connection portions when the locations of the stator case where the plastic deformation portions are formed press against the respective core configuration sections. Thus the array of the core configuration sections can be suppressed from being disturbed when the stator case and the stator core are integrated together, thereby enabling the circularity of the stator core to be improved.

A brushless motor manufacturing method of a twentieth aspect of the present invention is the brushless motor manufacturing method of the seventeenth aspect, wherein the rigidities of the respective connection portions of each of the plural insulators are substantially the same as each other.

In the twentieth aspect, in the crimping process, the stator main body, in which the rigidities of the respective connection portions of the plural insulators are substantially the same as each other, is integrated together with the stator case. Thus the processing force input to the stator case when one of the plastic deformation portions is formed can be made the same as the processing force input to the stator case when another of the plastic deformation portions is formed. The present invention accordingly enables easy process control of the crimping process.

A brushless motor manufacturing method of a twenty-first aspect of the present invention includes: a case placement process, a metal core setting process, and a crimping process. In the case placement process, a stator case formed in a circular cylinder shape with an internal diameter that exceeds an outer diameter of a stator main body is disposed at outside in a radial direction of the stator main body. The stator main body includes plural core configuration sections, plural teeth sections, plural wire coils, and plural insulators. The plural core configuration sections include plural yoke configuration sections that configure a ring shaped yoke and are segmented in a circumferential direction of the yoke, and each of the plural teeth sections projects out from the respective yoke configuration sections toward inside in a yoke radial direction and are integrated together with the yoke configuration sections. The plural wire coils that form plural winding portions are wound on the respective teeth sections to configure plural phases. In the metal core setting process, a metal core provided with sensors for detecting contact pressure against each of the core configuration sections is inserted at a radial direction inside of the stator main body. In the crimping process, the case and the stator main body are integrated together by forming a plastic deformation portion at an outer peripheral portion of the case by applying a processing force at respective locations, which face toward the plural yoke configuration sections, at an outer peripheral portion of the case. The processing force corresponds to output values of the sensors, and the circularity of the stator main body is adjusted by integrating together the case and the stator main body.

In the twenty-first aspect, the stator for a brushless motor is manufactured through the case placement process, the metal core setting process and the crimping process described above. In the present aspect, when the core configuration sections make contact with metal core, the sensors provided to the metal core output the contact pressure against each of the core configuration sections. The circularity of the stator main body is adjusted by adjusting the processing force to the outer peripheral portion of the case based on these output values, thereby enabling the circularity of the stator core to be improved.

A brushless motor manufacturing method of a twenty-second aspect of the present invention includes: a case placement process and a crimping process. In the case placement process, a stator case formed in a circular cylinder shape with an internal diameter that exceeds an outer diameter of a stator main body is disposed at outside in a radial direction of the stator main body. The stator main body includes plural core configuration sections, plural teeth sections, plural wire coils, and plural insulators. The plural core configuration sections include plural yoke configuration sections that configure a ring shaped yoke and are segmented in a circumferential direction of the yoke, and each of the plural teeth sections projects out from the respective yoke configuration sections toward inside in the yoke radial direction and are integrated together with the yoke configuration sections. The plural wire coils that form plural winding portions are wound on the respective teeth sections to configure plural phases. In the crimping process, the case and the stator main body is integrated together by forming a plastic deformation portion at an outer peripheral portion of the case by applying a processing force to the outer peripheral portion of the case at respective locations facing towards the plural yoke configuration sections. The processing force corresponds to an alignment of the plural core configuration sections, and the circularity of the stator main body is adjusted by integrating together the case and the stator main body.

In the twenty-second aspect, the stator for a brushless motor is manufactured through the case placement process and the crimping process described above. In the present aspect, the processing force corresponding to the alignment of the plural core configuration sections is applied to the outer peripheral portion of the case. The circularity of the stator main body is adjusted by adjusting this processing force, thereby enabling the circularity of the stator core to be raised.

BRIEF DESCRIPTION OF THE DRAWINGS

Embodiments of the present invention will be described in detail based on the following figures, wherein:

FIG. 1B is a perspective view illustrating a stator according to the first exemplary embodiment;

FIG. 2B is a perspective view illustrating a V-phase stator configuration section;

FIG. 3A is a perspective view illustrating a process in which the plural stator configuration sections illustrated in FIG. 2A to FIG. 2C are being assembled together;

FIG. 4B is an enlarged plan view and an enlarged cross-section illustrating connection sections of insulators according to a first modified exemplary embodiment;

FIG. 4D is an enlarged perspective view illustrating connection sections of insulators according to a third modified exemplary embodiment;

FIG. 6A is a vertical cross-section illustrating a state in which an outer peripheral face of a variable core retention section has been abutted against a circular arc shaped inner ring shaped section by expanding the diameter of the variable core retention section of the metal core;

FIG. 18B is a perspective view illustrating a V-phase stator configuration section illustrated in FIG. 17;

FIG. 18C is a perspective view illustrating a W-phase stator configuration section illustrated in FIG. 17;

FIG. 27B is an enlarged plan view corresponding to FIG. 27A illustrating the core configuration sections according to the modified exemplary example after forming the plastic deformation groove to the outer peripheral face of the stator case;

FIG. 28A is a side cross-section and a horizontal cross-section illustrating a process of inserting a metal core into an inner peripheral portion of the ring shape-arrayed core configuration sections and a process of forming a plastic deformation groove on the outer peripheral face of the stator case;

DETAILED DESCRIPTION OF THE INVENTION

Explanation follows regarding a first exemplary embodiment of the present invention.

Figure 1A:
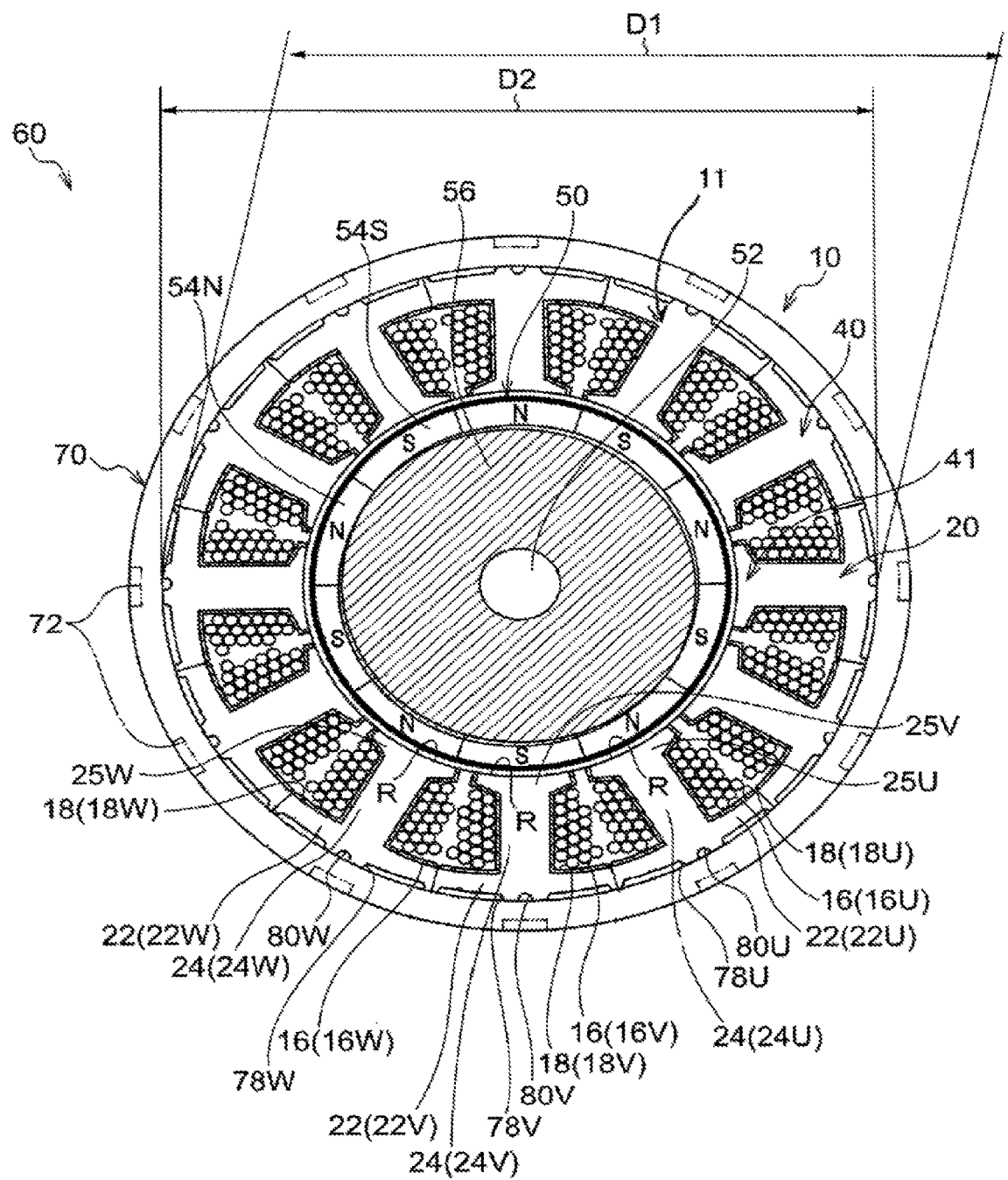
FIG. 1A is a plan view illustrating a brushless motor according to a first exemplary embodiment.

As illustrated in FIG. 1A, a brushless motor 60 of the first exemplary embodiment is an inner rotor type of brushless motor and is configured including a stator 10 that generates a rotating magnetic field and a rotor 50 that is rotated by the rotating magnetic field of the stator 10. As illustrated in FIG. 1B, the stator 10 is configured including a stator case 70 serving as a case, and a stator main body 11. In the following, first explanation is given regarding the stator case 70, then explanation follows regarding the stator configuration sections and the rotor 50, and finally explanation is given regarding a manufacturing method of the stator 10 and the brushless motor 60.

Stator Case 70

As illustrated in FIG. 1A and FIG. 1B, the stator case 70 is formed in a thin walled circular cylinder shape, and is integrally formed along its circumferential direction using a soft magnetic metal (such as for example "copper", "aluminum alloy" or "copper alloy"). An internal diameter D1 of the stator case 70 prior to forming plastic deformation portions 72 is defined so as to exceed an outer diameter D2 of a stator core 20.

Moreover, plural plastic deformation portions 72 are disposed on an outer peripheral face of the stator case 70 at even intervals along a circumferential direction of the stator case 70 (plastic deformation portions 72 at 12 locations in the present exemplary embodiment). Forming the plastic deformation portions 72 at the stator case 70 results in the internal diameter of the stator case 70 being reduced at locations where the plastic deformation portions 72 are formed, and in the locations formed with the plastic deformation portions 72 abutting the stator core 20. The stator case 70 and the stator core 20 are accordingly integrated together, namely the stator case 70 and the stator main body 11 become as an integrated configuration.

Moreover, the plastic deformation portions 72 are formed at locations that face towards protruding portions 78U, 78V, 78W respectively formed at yoke configuration sections 22U, 22V 22W, described in detail later.

Stator Configuration Sections 12U, 12V, 12W

Figure 2A:
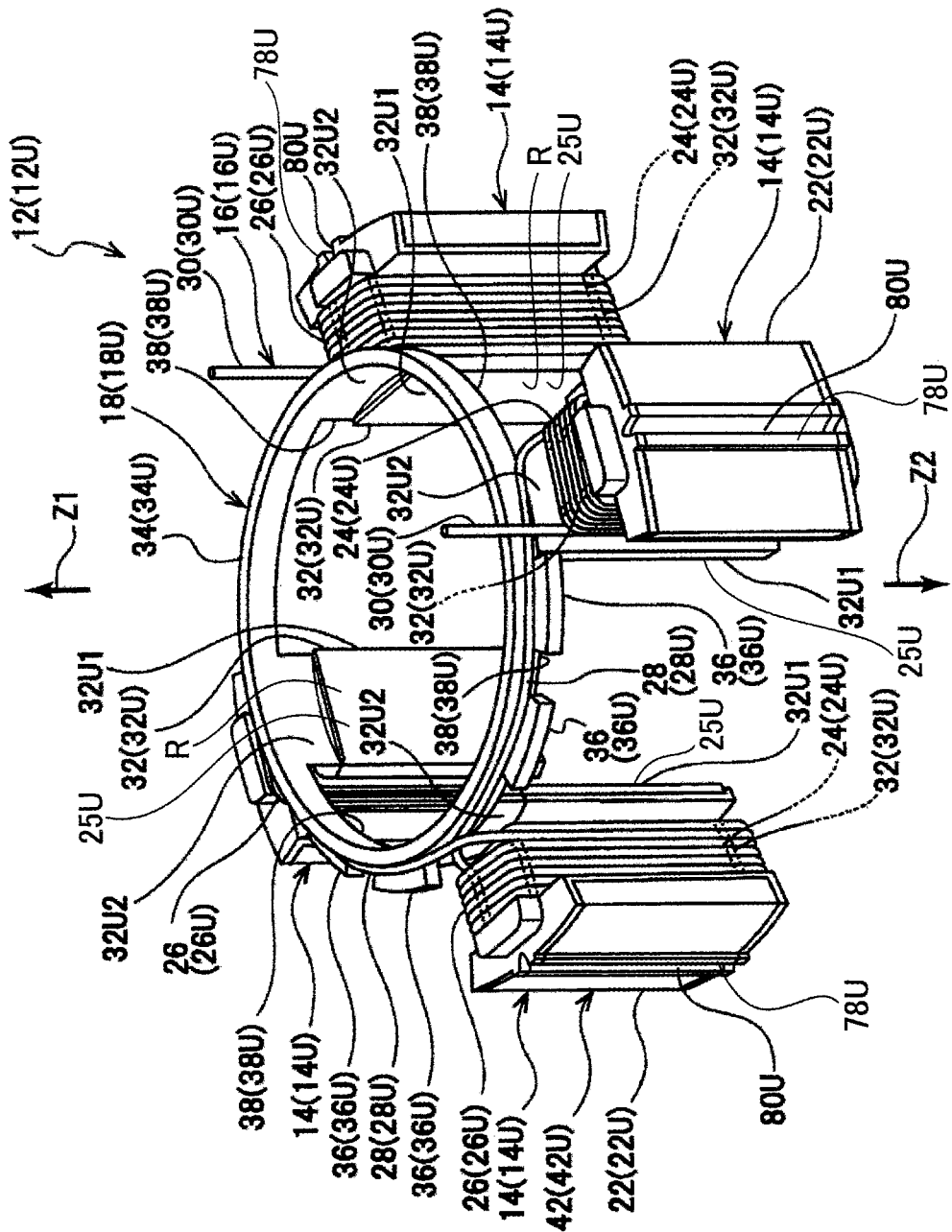
FIG. 2A is a perspective view illustrating a U-phase stator configuration section.

As illustrated in FIG. 2A, the U-phase stator configuration section 12U is configured with plural core configuration sections 14U, a coil wire 16U, and an insulator 18U. The plural core configuration sections 14U configure a core 20, together with plural V-phase core configuration sections 14V and plural W-phase core configuration sections 14W, described later (see FIG. 1A for each). The core configuration sections 14U respectively include plural yoke configuration sections 22U, plural teeth sections 24U and plural metal core contact portions 25U.

Figure 2C:
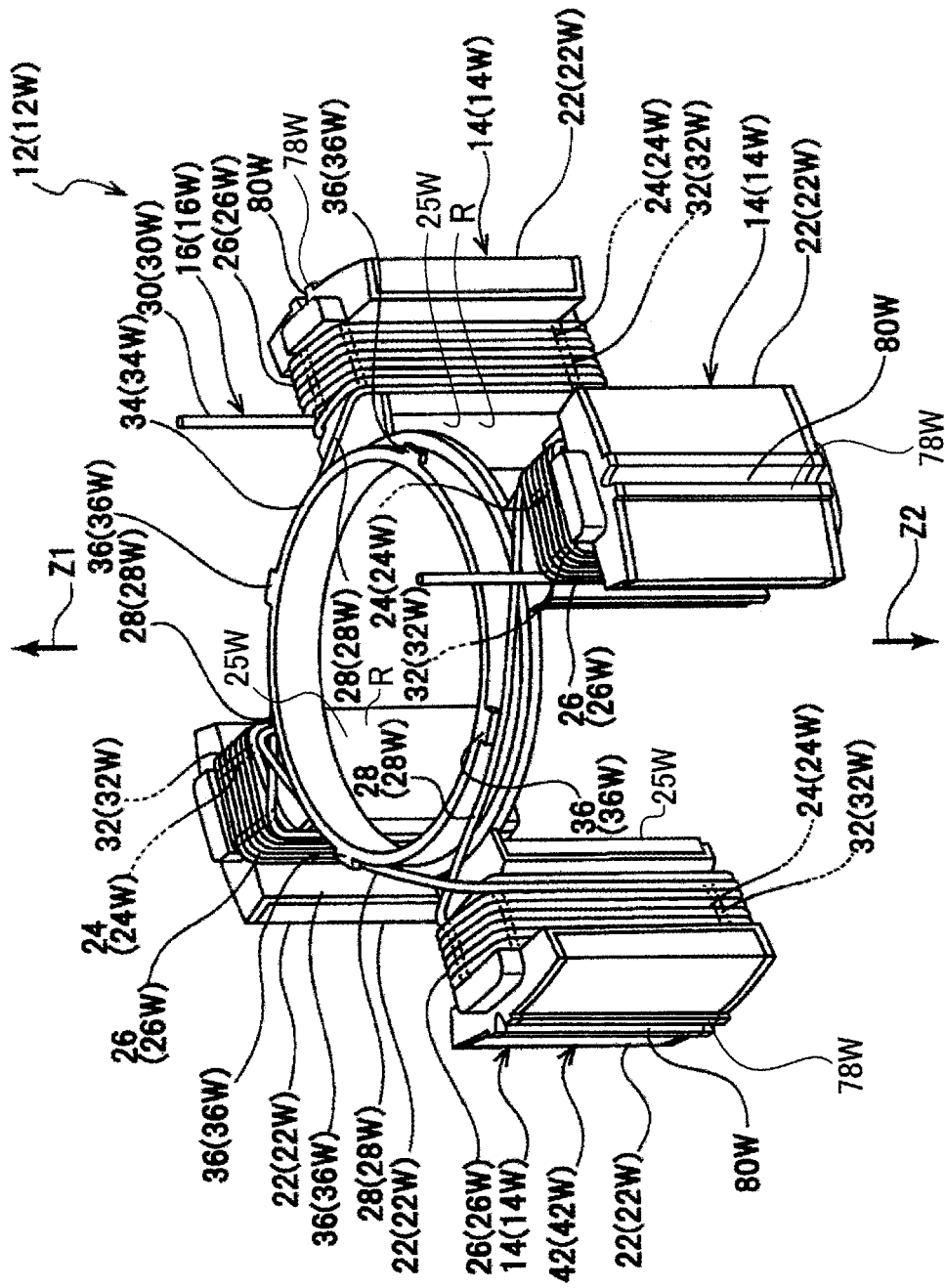
FIG. 2C is a perspective view illustrating a W-phase stator configuration section.
Figure 2D:
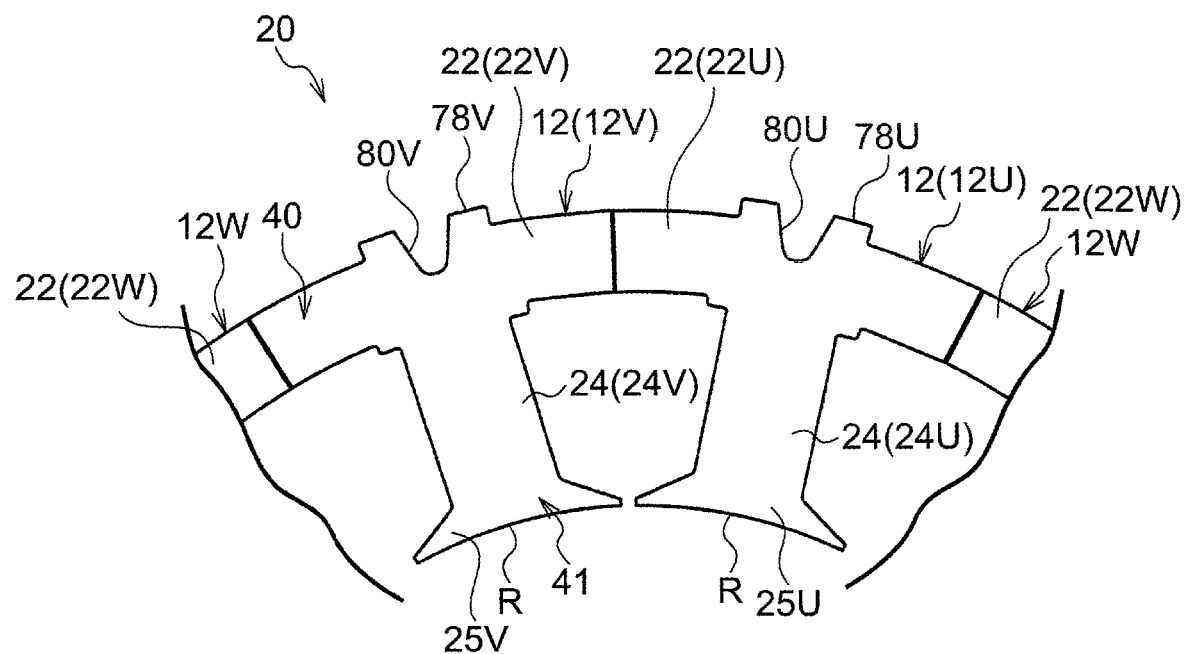
FIG. 2D is an enlarged plan view illustrating a portion of ring shape-arrayed core configuration sections.

As illustrated in FIG. 2A and FIG. 2D, the plural yoke configuration sections 22U configure a yoke 40, together with plural V-phase yoke configuration sections 22V and plural W-phase yoke configuration sections 22W, described later, and are respectively circular arc shaped. The plural teeth sections 24U are integrally formed to the respective yoke configuration sections 22U, and project from the yoke configuration sections 22U towards a radial direction inside of the yoke 40.

Moreover, at locations of the yoke configuration sections 22U facing towards the teeth sections 24U, protruding portions 78U are formed projecting toward outside in a radial direction of the yoke configuration sections 22U and extending along an axial direction of the yoke configuration sections 22U. Moreover, at intermediate portions of the protruding portions 78U (intermediate portions in the circumferential direction of the yoke configuration sections 22U), U-shaped grooved indentation portions 80U are formed opening towards the radial direction outside of the yoke configuration sections 22U and extending along the axial direction of the yoke configuration sections 22U.

At an end portion of the teeth sections 24U in the vicinity of the rotor 50 (see FIG. 1A), the metal core contact portions 25U are provided extending out along the circumferential direction of the rotor 50 (along ring shape-arrayed magnets 54S, 54N). The metal core contact portions 25U, together with V-phase metal core contact portions 25V and W-phase metal core contact portions 25W, described later, configure an inner ring shaped section 41, and faces of the metal core contact portions 25U, 25V, 25W on the rotor 50 side respectively configure circular arc shaped faces R.

As illustrated in FIG. 2A, the coil wire 16U configures the U-phase and includes plural winding portions 26U and plural crossing wires 28U. The plural winding portions 26U are wound concentrically on the teeth sections 24U, with insulator portions 32U, described later, disposed therebetween. The winding portions 26U are mutually connected to each other by the plural crossing wires 28U. The crossing wires 28U are laid out (wrapped) around an outer peripheral face of a connection portion 34U formed in the insulator 18U, described later. Terminal portions 30U at both end sides of the coil wire 16U lead out from the teeth sections 24U to a first axial direction side (the arrow Z1 side) of the stator 10.

The insulator 18U is made from a resin, and includes the plural insulator portions 32U and the connection portion 34U integrated together. The number of plural insulator portions 32U provided is the same as the number of the plural teeth sections 24U mentioned above. Each of the plural insulator portions 32U includes an insulator main body portion 32U1 and an extending portion 32U2. The insulator main body portions 32U1 are integrated to the respective surfaces of the plural core configuration sections 14U mentioned above, for example by integral molding or interlock mounting. The insulator main body portions 32U1 insulate between the teeth sections 24U formed at the core configuration sections 14U and the winding portions 26U. The extending portions 32U2 are positioned further to a radial direction inside than the core configuration sections 14U, and extend from the insulator main body portion 32U1 to the first axial direction side (the arrow Z1 side) of the yoke 40.

The connection portion 34U is provided at the first axial direction side of the plural insulator portions 32U (the Z1 side). The connection portion 34U is formed in a ring shape, and connects together the plural insulator portions 32U (or more specifically, extension end portions on the Z1 side of the extending portions 32U2), and is positioned further to the radial direction inside than the core configuration sections 14U. Plural projection shaped retaining portions 36U are formed between the plural insulator portions 32U on an outer peripheral face of the connection portion 34U and project out toward the radial direction outside of the insulator 18. The retaining portions 36U retain the crossing wires 28U mentioned above from a second axial direction side (arrow Z2 side) at the connection portion 34U. Plural notches 38U opening towards the second axial direction side (arrow Z2 side) are formed between the plural insulator portions 32U at the connection portion 34U.

The V-phase stator configuration section 12V illustrated in FIG. 2B has basically the same configuration as the U-phase stator configuration section 12U mentioned above. Namely, the V-phase stator configuration section 12V is configured including the plural V-phase yoke configuration sections 22V, plural teeth sections 24V, the plural metal core contact portions 25V, a coil wire 16V and an insulator 18V. The plural yoke configuration sections 22V, the plural teeth sections 24V, the metal core contact portions 25V, the coil wire 16V and the insulator 18V correspond to the above mentioned plural yoke configuration sections 22U, the plural teeth sections 24U, the plural metal core contact portions 25U, the coil wire 16U and the insulator 18U (see FIG. 2A for each). Protruding portions 78V and indentation portions 80V also correspond to the protruding portions 78U and the indentation portions 80U mentioned above. Note that in the V-phase stator configuration section 12V, a connection portion 34V is formed in a ring shape, and formed with a smaller diameter than the U-phase connection portion 34U mentioned above (see FIG. 2A). Moreover, retaining portions 36V retain the crossing wires 28V from the first axial direction side (the arrow Z1 side) at the connection portion 34V, and are positioned further to the radial direction inside than the core configuration sections 14V.

The W-phase stator configuration section 12W illustrated in FIG. 2C has basically the same configuration as the U-phase stator configuration section 12U mentioned above. Namely, the W-phase stator configuration section 12W is configured including the plural W-phase yoke configuration sections 22W, plural teeth sections 24W, the plural metal core contact portions 25W, a coil wire 16W and an insulator 18W. The plural yoke configuration sections 22W, the plural teeth sections 24W, the plural metal core contact portions 25W, the coil wire 16W and the insulator 18W correspond to the above mentioned plural yoke configuration sections 22U, the plural teeth sections 24U, the plural metal core contact portions 25U, the coil wire 16U and the insulator 18U (see FIG. 2A for each). Protruding portions 78W and indentation portions 80W also correspond to the protruding portions 78U and the indentation portions 80U mentioned above. Note that in the W-phase stator configuration section 12W, a connection portion 34W is formed in a ring shape, and formed with a smaller diameter than the V-phase connection portion 34V mentioned above (see FIG. 2B). The above mentioned notches (see the notches 38U in FIG. 2A) are omitted from the connection portion 34W. Moreover, retaining portions 36W retain the crossing wires 28W from the first axial direction side (the arrow Z1 side) at the connection portion 34W, and are positioned further to the radial direction inside than the core configuration sections 14W.

As illustrated in FIG. 1A, after assembling the plural stator configuration sections 12U, 12V, 12W together, as explained in detail later, they are retained from outer peripheral portions thereof by the stator case 70 so as to configure the stator 10. Moreover, in the stator 10, the ring shaped yoke 40 is configured by the plural yoke configuration sections 22U, 22V, 22W.

The protruding portions 78U, 78V, 78W formed at the respective yoke configuration sections 22U, 22V, 22W configuring the yoke 40 are disposed at even intervals along the circumferential direction as viewed from the axial direction of the yoke 40.

Figure 3B:
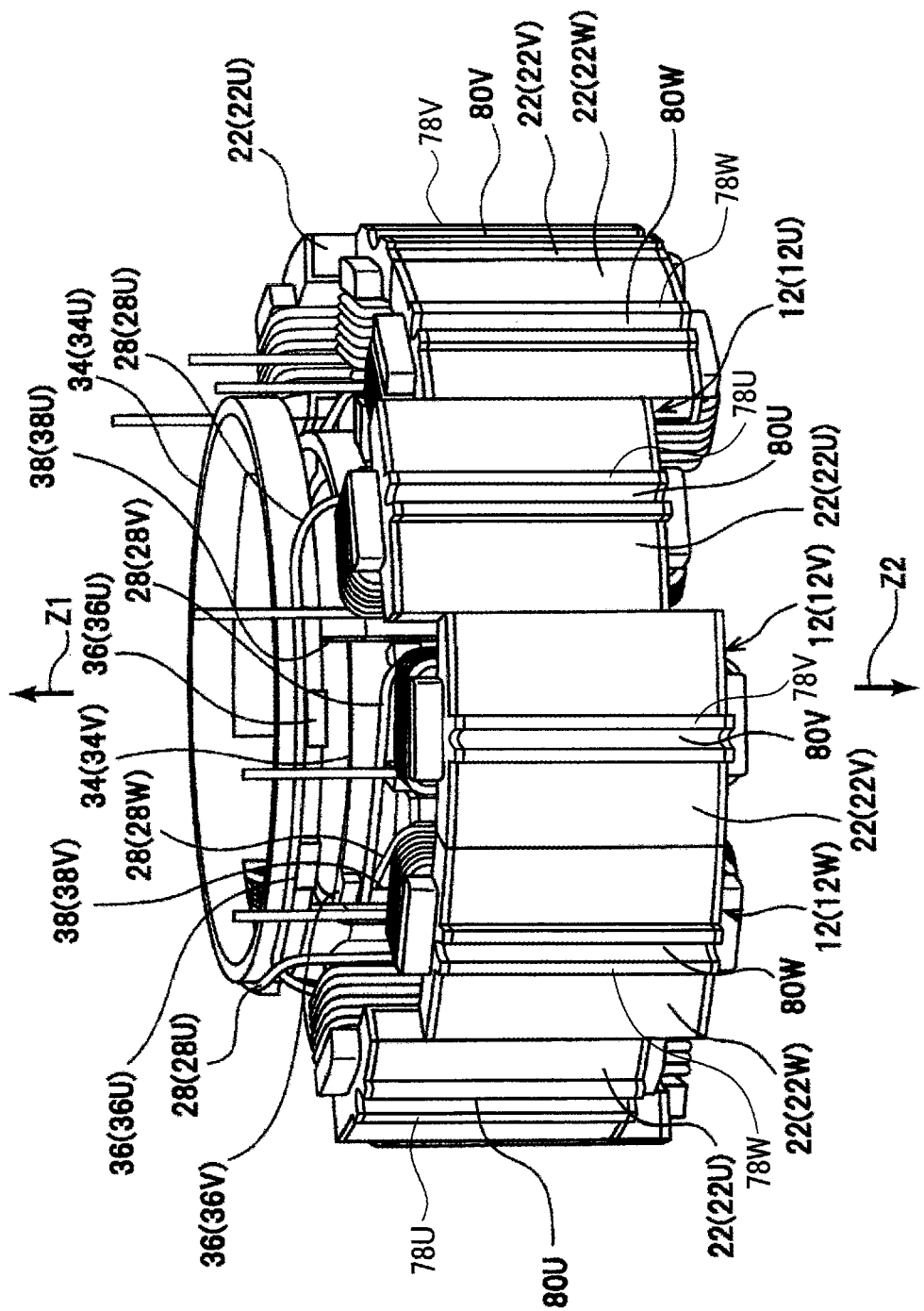
FIG. 3B is a perspective view illustrating a state in which assembly has progressed further than in FIG. 3A.
Figure 4A:
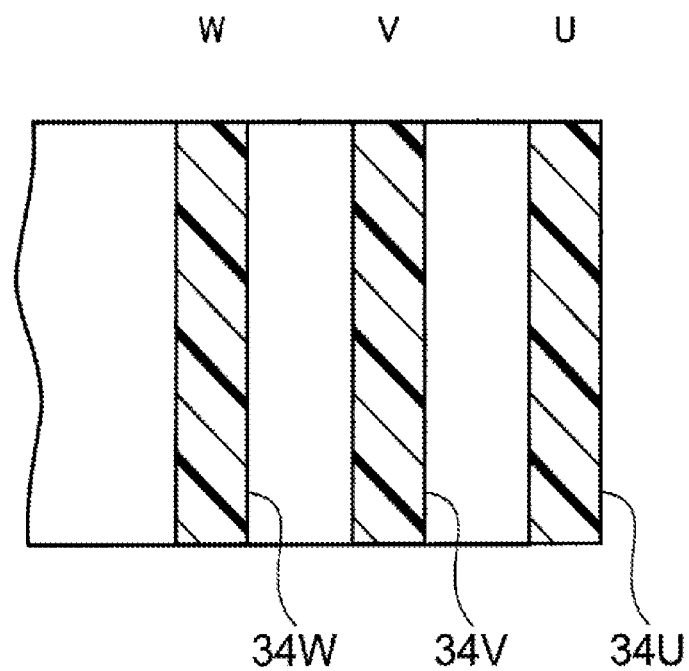
FIG. 4A is an enlarged cross-section illustrating connection sections of insulators according to the first exemplary embodiment.

As illustrated in FIGS. 3A, 3B and 4A, the plural connection portions 34U, 34V, 34W are disposed at the radial direction inside of the yoke 40 with radial direction gaps present, and are provided coaxially to the yoke 40. The V-phase retaining portions 36V are fitted against the inner peripheral face of the U-phase connection portion 34U, and the W-phase retaining portions 36W are fitted against the inner peripheral face of the V-phase connection portion 34V. The plural connection portions 34U, 34V, 34W are thus retained in a state separated from each other in the radial direction. Namely, the retaining portions 36U, 36V, 36W are provided between the plural connection portions 34U, 34V, 34W in the radial direction, and take on the role of projection shaped spacers to retain the plural connection portions 34U, 34V, 34W in a state separated from each other in the radial direction.

A cross-sectional area, as viewed in the stator axial direction, at locations where the retaining portions 36U and the notches 38U are not formed of the U-phase connection portion 34U, a cross-sectional area, as viewed in the stator axial direction, at locations where the retaining portions 36V and the notches 38V are not formed of the V-phase connection portion 34V, and a cross-sectional area, as viewed in the stator axial direction, at locations where the retaining portions 36W are not formed of the W-phase connection portion 34W, are the same as each other. The rigidity of the V-phase connection portion 34V is accordingly higher than the U-phase connection portion 34U, and the rigidity of the W-phase connection portion 34W is accordingly higher than the rigidity of the V-phase connection portion 34V.

Moreover, as described above, in the state in which the plural connection portions 34U, 34V, 34W are disposed such that gaps are present therebetween in the yoke 40 radial direction, the V-phase crossing wires 28V pass through inside the notches 38U formed at the U-phase connection portion 34U (are housed inside the notches 38U), and the W-phase crossing wires 28W pass through inside the notches 38U formed to the U-phase connection portion 34U and the notches 38V formed to the V-phase connection portion 34V (are housed inside the notches 38U and the notches 38V).

Rotor 50

As illustrated in FIG. 1A, the rotor 50 is configured including a rotation shaft section 52 that is disposed at the radial direction inside of the stator 10, and that is supported so as to be rotatable about a shaft axis, and magnets 54S, 54N that are disposed along a circumferential direction of the rotation shaft section 52. Specifically, the rotation shaft section 52 is formed by performing surface treatment such as carbon immersion processing to a bar shaped steel member. The rotation shaft section 52 is also rotatably supported by a shaft bearing member, not illustrated in the drawings. South pole magnets 54S and north pole magnets 54N are disposed alternately along the circumferential direction around the rotation shaft section 52. The magnets 54S, 54N are fixed to the rotation shaft section 52 through a support member 56.

Manufacturing Method of the Stator 10 and the Brushless Motor 60

Explanation next follows regarding a manufacturing method of the stator 10 and the brushless motor 60 configured as described above.

First, as illustrated in FIG. 2A, the core configuration sections 14U are integrated to the insulator portions 32U of the insulator 18U to form a U-phase sub-assembly 42U. Similarly, as illustrated in FIG. 2B, the core configuration sections 14V are integrated to the insulator portions 32V of the insulator 18V to form a V-phase sub-assembly 42V. Moreover, as illustrated in FIG. 2C, the core configuration sections 14W are integrated to the insulator portions 32W of the insulator 18W to form a W-phase sub-assembly 42W. The sub-assemblies 42U, 42V, 42W are thus formed for each of the U-phase, the V-phase and the W-phase (the sub-assembly forming process).

Next, as illustrated in FIG. 2A, a flyer machine (not illustrated in the drawings) is employed to wind the coil wire 16U on each of the teeth sections 24U of the U-phase sub-assembly 42U from the radial direction outside, forming the U-phase stator configuration section 12U with plural winding portions 26U formed on the sub-assembly 42U.

Similarly, as illustrated in FIG. 2B, the flyer machine mentioned above is employed to wind the coil wire 16V on each of the teeth sections 24V of the V-phase sub-assembly 42V from the radial direction outside, forming the V-phase stator configuration section 12V with plural winding portions 26V formed on the sub-assembly 42V. Moreover, as illustrated in FIG. 2C, the flyer machine mentioned above is employed to wind the coil wire 16W on each of the teeth sections 24W of the W-phase sub-assembly 42W from the radial direction outside, forming the W-phase stator configuration section 12W with plural winding portions 26W formed on the sub-assembly 42W.

When the above is performed, as illustrated in FIG. 2A, the plural crossing wires 28U are laid out along the outer peripheral face of the connection portion 34U. The plural crossing wires 28U are also retained by the projection shaped retaining portions 36U from the second axial direction side (arrow Z2 side) at the connection portion 34U. Similarly, as illustrated in FIG. 2B, the plural crossing wires 28V are laid out along the outer peripheral face of the connection portion 34V. The plural crossing wires 28V are also retained by the projection shaped retaining portions 36V from the first axial direction side (the arrow Z1 side) at the connection portion 34V. Moreover, as illustrated in FIG. 2C, the plural crossing wires 28W are laid out along the outer peripheral face of the connection portion 34W. The plural crossing wires 28W are also retained by the projection shaped retaining portions 36W from the first axial direction side (the arrow Z1 side) at the connection portion 34W.

As illustrated in FIG. 2A, the terminal portions 30U at the two end sides of the coil wire 16U lead out from the teeth sections 24U to the first axial direction side (the arrow Z1 side) of the stator 10. Similarly, as illustrated in FIG. 2B, the terminal portions 30V at the two end sides of the coil wire 16V lead out from the teeth sections 24V towards the first axial direction side of the stator 10. Moreover, as illustrated in FIG. 2C, the terminal portions 30W at the two end sides of the coil wire 16W lead out from the teeth sections 24W towards the first axial direction side of the stator 10. The stator configuration sections 12U, 12V, 12W are thus formed for each of the U-phase, the V-phase and the W-phase (the stator configuration section forming process).

Then, as illustrated in FIG. 3A and FIG. 3B, in a state in which the core configuration sections 14V of the V-phase stator configuration section 12V are displaced by a specific angle in the circumferential direction with respect to the core configuration sections 14W of the W-phase stator configuration section 12W, the V-phase stator configuration section 12V is assembled to the W-phase stator configuration section 12W from the first axial direction side (the arrow Z1 side). Then, in a state in which the core configuration sections 14U of the U-phase stator configuration section 12U is displaced by a specific angle in the circumferential direction with respect to the core configuration sections 14V of the V-phase stator configuration section 12V, the U-phase stator configuration section 12U is assembled to the V-phase stator configuration section 12V and the W-phase stator configuration section 12W from the first axial direction side (the arrow Z1 side).

When the above is performed, the plural core configuration sections 14U, 14V, 14W are arrayed in a ring shape, and, as illustrated in FIG. 2D, both of the inner peripheral ends of each of the plural yoke configuration sections 22U, 22V, 22W make contact with the inner peripheral ends of the adjacent yoke configuration sections 22U, 22V, 22W on both sides (core array process).

Moreover, as illustrated in FIG. 3A and FIG. 3B, the V-phase retaining portions 36V are fitted against the inner peripheral face of the U-phase connection portion 34U, and the W-phase retaining portions 36W are fitted against the inner peripheral face of the V-phase connection portion 34V. The plural connection portions 34U, 34V, 34W are accordingly retained separated from each other in the radial direction by the projection shaped retaining portions 36U, 36V, 36W.

Moreover, the V-phase crossing wires 28V pass through inside the notches 38U formed at the U-phase connection portion 34U, and the W-phase crossing wires 28W pass through inside the notches 38U and inside the notches 38V formed at the V-phase connection portion 34V.

Explanation follows regarding a process for integrating together the stator case 70 and the stator core 20 (the stator main body 11).

Figure 5:
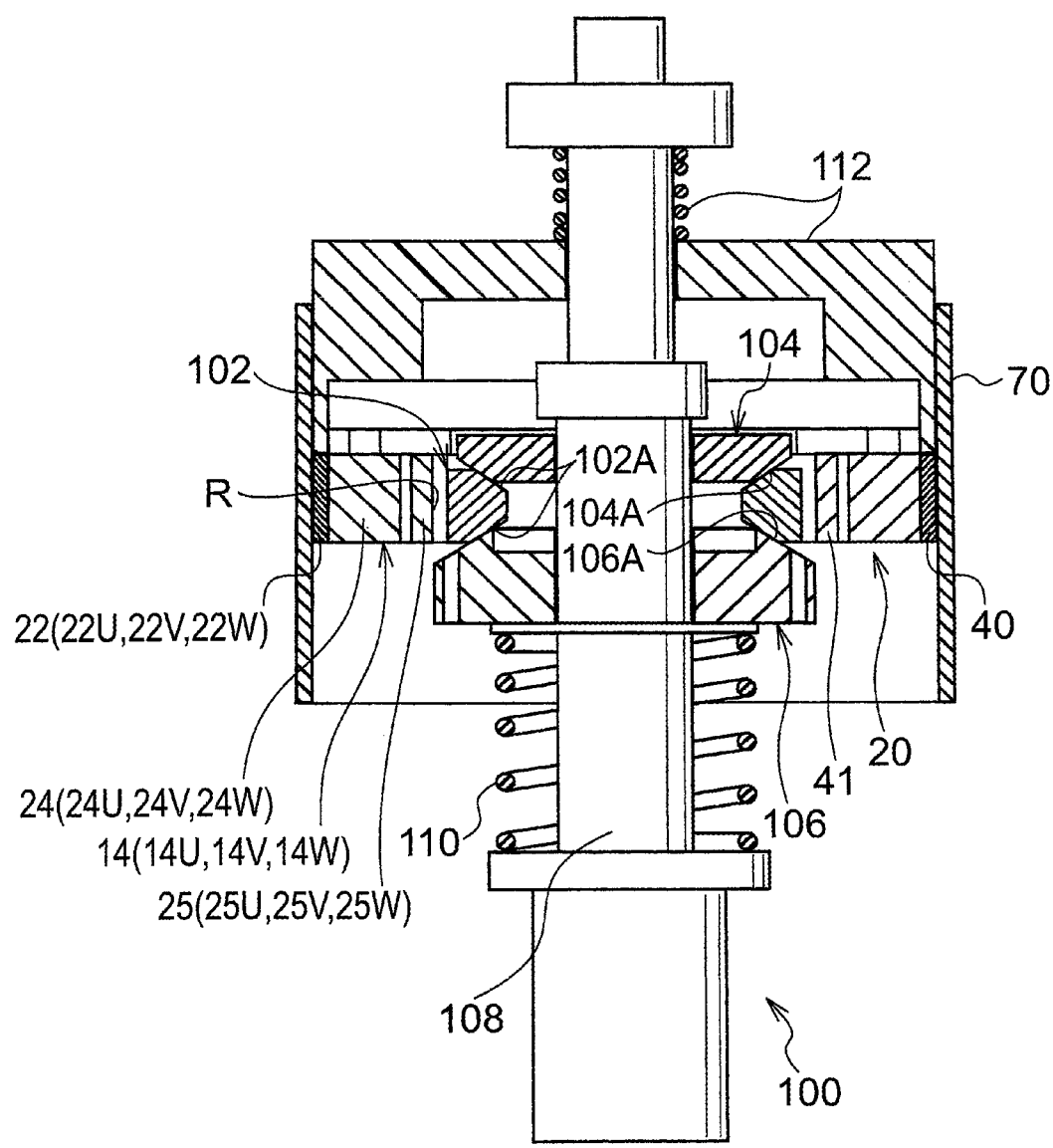
FIG. 5 is a vertical cross-section illustrating a state in which a metal core has been inserted at the radial direction inside of the stator core.

As illustrated in FIG. 5, the stator case 70 is disposed at the radial direction outside of the stator core 20, namely the stator case 70 is disposed along the yoke 40 of the stator core 20 (case placing process). Note that, the internal diameter D1 of the stator case 70 prior to forming the plastic deformation portions 72 (see FIG. 1A) exceeds the outer diameter D2 of the stator core 20 (see FIG. 1A), however there is only a slight difference between D1 and D2. Thus in FIG. 5, the internal diameter D1 of the stator case 70 and the outer diameter D2 of the stator core 20 appear to match each other.

Figure 6B:
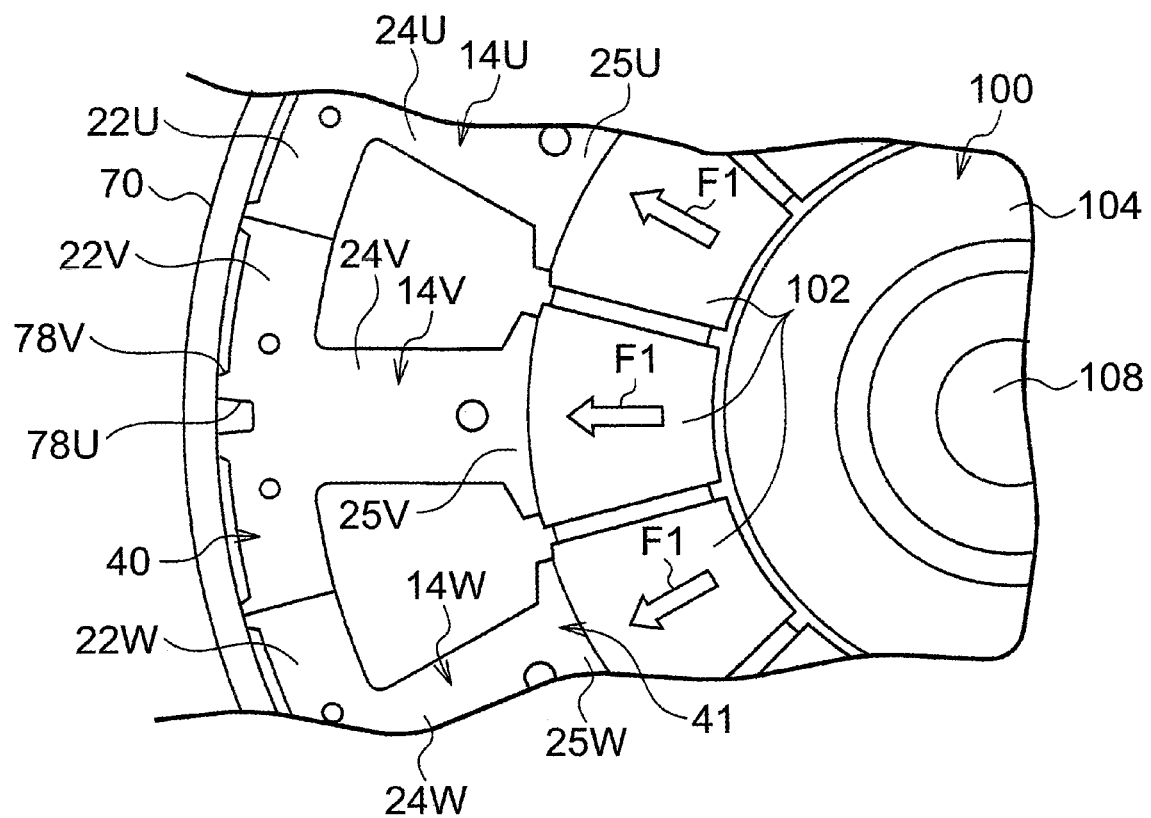
FIG. 6B is a plan view illustrating a state in which an outer peripheral face of the variable core retention section has been abutted against the circular arc shaped of the inner ring shaped section by expanding the diameter of the variable core retention section of the metal core.

Next, variable core retention sections 102 of a metal core 100 is inserted at the inner peripheral side of the inner ring shaped section 41 of the stator core 20, and, as illustrated in FIG. 6A and FIG. 6B, by expanding a diameter of respective variable core retention sections 102, outer peripheral faces of the variable core retention sections 102 make contact with the circular arc shaped faces R of the metal core contact portions 25U, 25V, 25W. Then by expanding the diameter of the respective variable core retention sections 102 further, the outer peripheral face of the yoke 40 (the protruding portions 78U, 78V, 78W formed at the yoke configuration sections 22U, 22V, 22W) makes contact with the inner peripheral face of the stator case 70 (metal core setting process). Note that in order to insert the variable core retention sections 102 into the inner ring shaped section 41, the outer diameter of the variable core retention sections 102 is contracted sufficiently so as to correspond to the internal diameter of the inner ring shaped section 41.

As a brief explanation regarding the configuration of the metal core 100, the metal core 100 has principle configuration elements of the twelve individual variable core retention sections 102 that are disposed in a ring shape, and an upper side retaining portion 104 and a lower side retaining portion 106. The upper side retaining portion 104 and the lower side retaining portion 106 support the variable core retention sections 102, and allow the twelve individual variable core retention sections 102 to expand out to the outer diameter side. The outer peripheral faces of the variable core retention sections 102 are formed as circular arc shapes to correspond to the circular arc shaped faces R of the metal core contact portions 25U, 25V, 25W, and cam portions 102A are formed at the inner peripheral portions of the variable core retention sections 102. Moreover, the upper side retaining portion 104 and the lower side retaining portion 106 are formed in circular disk shapes, and are formed with sloping faces 104A, 106A on respective outer peripheral portions thereof. The cam portions 102A of the variable core retention sections 102 are nipped between the sloping face 104A of the upper side retaining portion 104 and the sloping face 106A of the lower side retaining portion 106. There is moreover a through hole formed through a radial direction central portion of the upper side retaining portion 104 and the lower side retaining portion 106, and a shaft portion 108 is inserted into the through hole. The upper side retaining portion 104 and the lower side retaining portion 106 are accordingly able to slide along the shaft portion 108. A configuration is accordingly achieved in which the twelve individual ring shape-arrayed variable core retention sections 102 move in the radial direction so as to expand the diameter thereof by the upper side retaining portion 104 and the lower side retaining portion 106 sliding along the shaft portion 108 and narrowing the separation between the upper side retaining portion 104 and the lower side retaining portion 106.

Moreover, a spring 110 is inserted into the shaft portion 108, and the spring 110 biases the lower side retaining portion 106 towards the upper side retaining portion 104 side. The variable core retention sections 102 thereby press the core configuration sections 14U, 14V, 14W with a specific pressing force F1. The pressing force F1 (impetus of the spring 110) is set such that the variable core retention sections 102 are compressed in the radial direction inside when the pressing force input to the outer peripheral portion of the stator case 70 exceeds a specific value when the plastic deformation portions 72 are formed at the stator case 70. Note that, a positioning jig 112 is attached to the shaft portion 108 to perform positioning of the variable core retention sections 102 with respect to the stator core 20 and the stator case 70.

Figure 7:
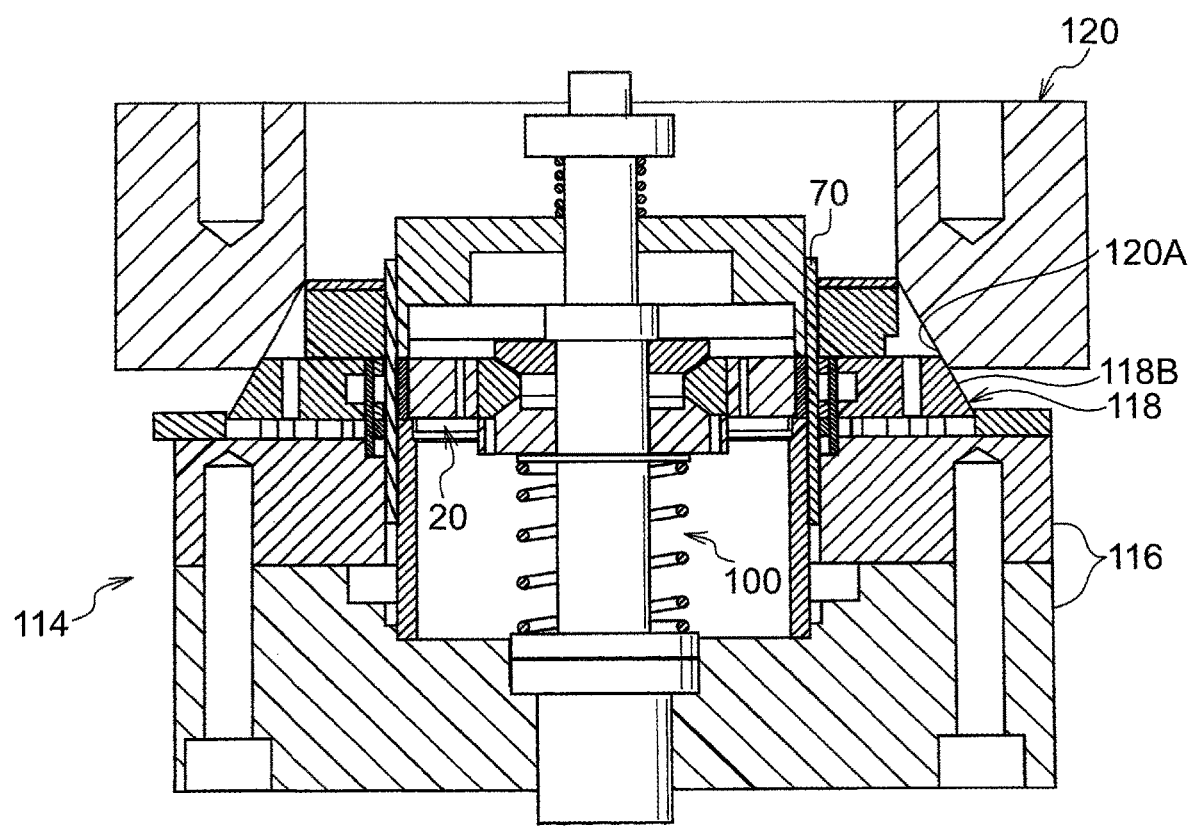
FIG. 7 is a vertical cross-section illustrating a state in which the metal core has been inserted, and the stator core and a stator case set with a crimping tool.
Figure 8:
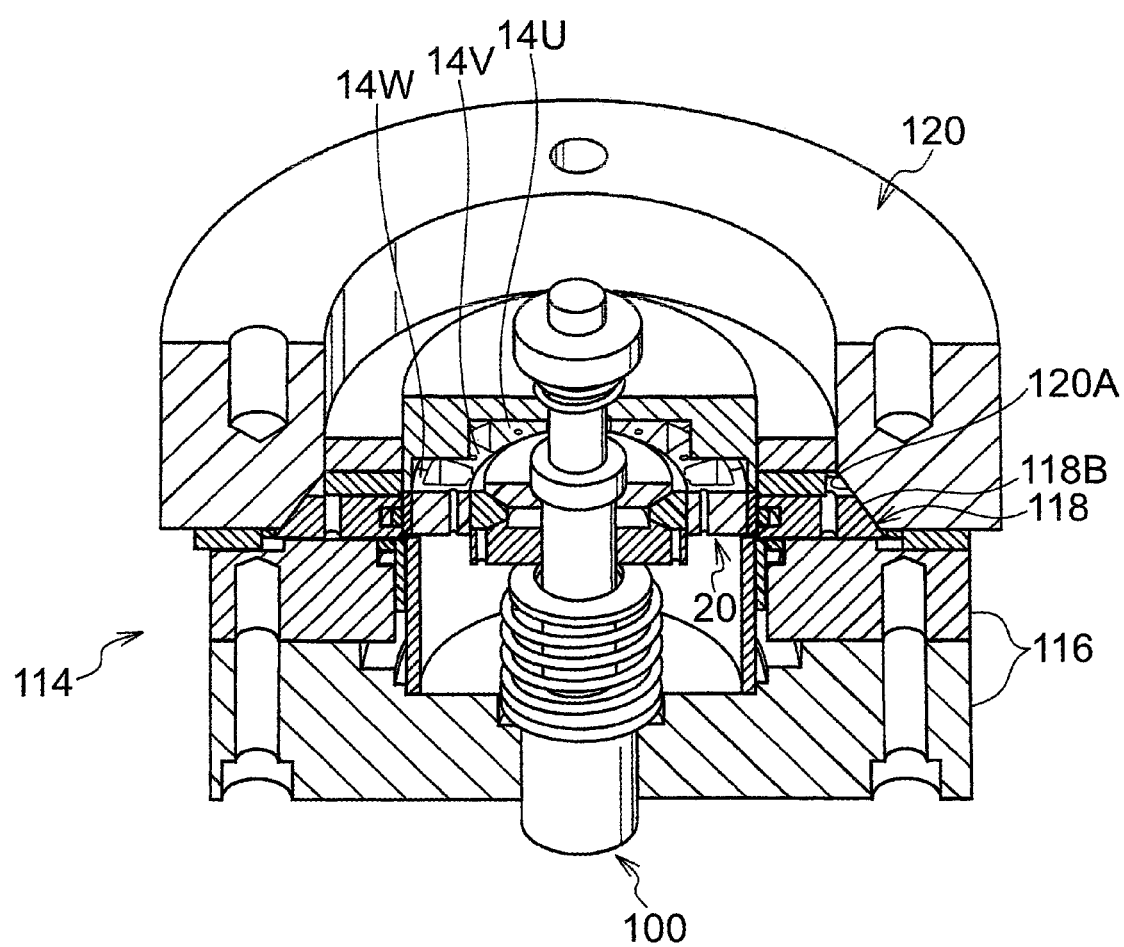
FIG. 8 is a perspective cross-section of the metal core, the stator core, the stator case and the crimping tool illustrated in FIG. 7 as viewed from one axial direction side of the stator core.

Next, as illustrated in FIG. 7 and FIG. 8, the stator case 70, the stator core 20 and the metal core 100 are set in a crimping tool 114.

A brief explanation follows regarding the crimping tool 114. The crimping tool 114 is configured with principle elements of a circular cylinder shaped base section 116 that supports the stator core 20 and the metal core 100, twelve individual punches 118 that are disposed at even intervals along the circumferential direction of the base section 116 and a press section 120. The punches 118 are supported so as to be capable of moving along the radial direction of the upper end portion of the base section 116. The press section 120 moves the punches 118 to the radial direction inside of the base section 116. Twelve individual indented grooves (not illustrated in the drawings) are formed at a top end portion of the base section 116, disposed at even intervals around the circumferential direction, extending along the radial direction of the base section 116. By housing the punches 118 in these indented grooves, the punches 118 are rendered capable of sliding in the radial direction of the base section 116. The punches 118 are formed with rectangular block shapes and one end of each of the punches 118 is configured as a contact portion that makes contact with the outer peripheral face of the stator case 70. Moreover, as illustrated in FIG. 10B, a pair of projection portions 118A are provided at the contact portion so as to project towards the radial direction inside of the stator case 70 and the stator core 20 as viewed along the axial direction of the stator case 70 and the stator core 20. Moreover, each of the pairs of projection portions 118A is disposed, through the stator case 70, so as to face towards the respective protruding portion 78U, 78V, 78W and straddle the respective indentation portion 80U, 80V, 80W formed at the protruding portion 78U, 78V, 78W provided at the core configuration section 14U, 14V, 14W. As illustrated in FIG. 7 and FIG. 8, the other end of each of the punches 118 is configured by a sloping face 118B that slopes towards one end (the contact portion) side of the punch 118 on progression towards the press section 120 side. Moreover, the press section 120 is formed in a circular cylinder shape, and a tapered face 120A is configured at a position on the inner peripheral face of the press section 120 at the base section 116 side. An inner diameter of the tapered face 120A expands towards the base section side. The tapered face 120A makes contact with the sloping face 118B formed at the other end of the punches 118, in a configuration such that twelve individual punches 118 are caused to slide towards the radial direction inside of the base section 116 by making the separation between the press section 120 and the base section 116 narrower.

Figure 9:
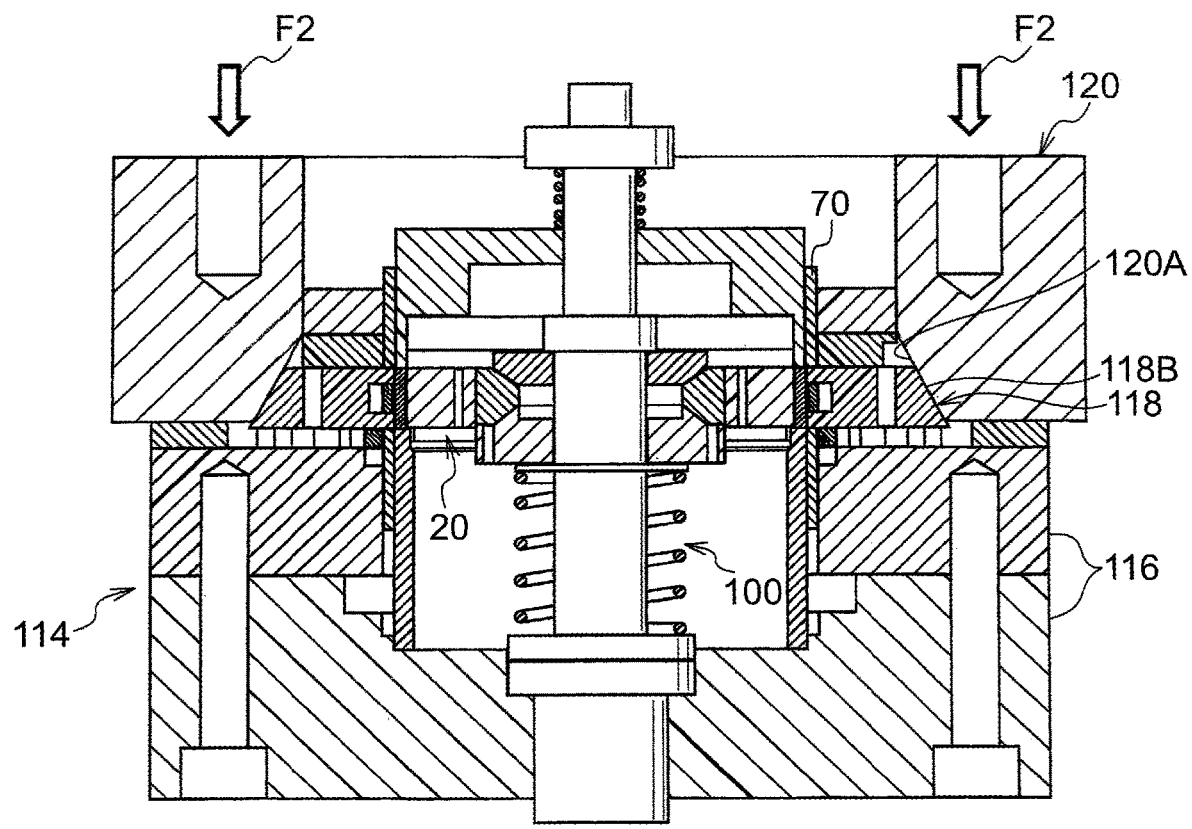
FIG. 9 is a vertical cross-section illustrating the metal core, the stator core, the stator case and the crimping tool when the crimping tool is operated by processing force of a press.
Figure 10A:
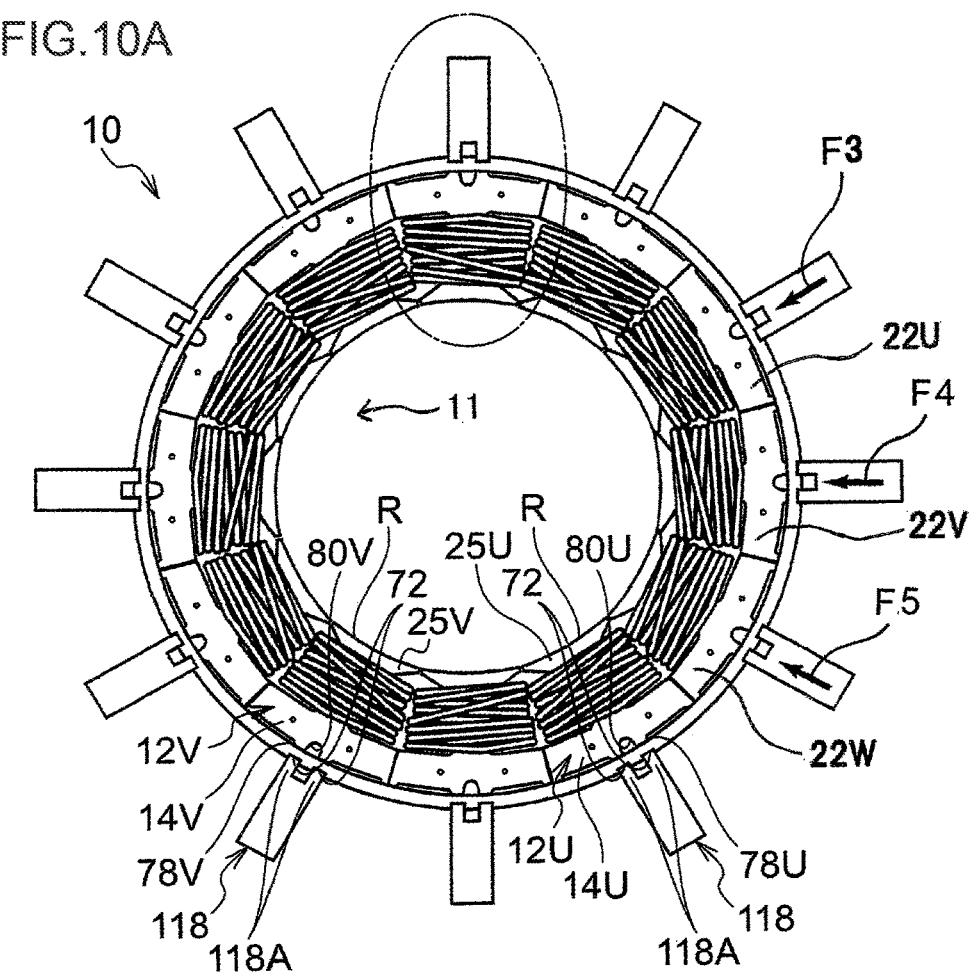
FIG. 10A is a plan view illustrating the stator core and the stator case when the crimping tool is operated by processing force of a press.
Figure 10B:
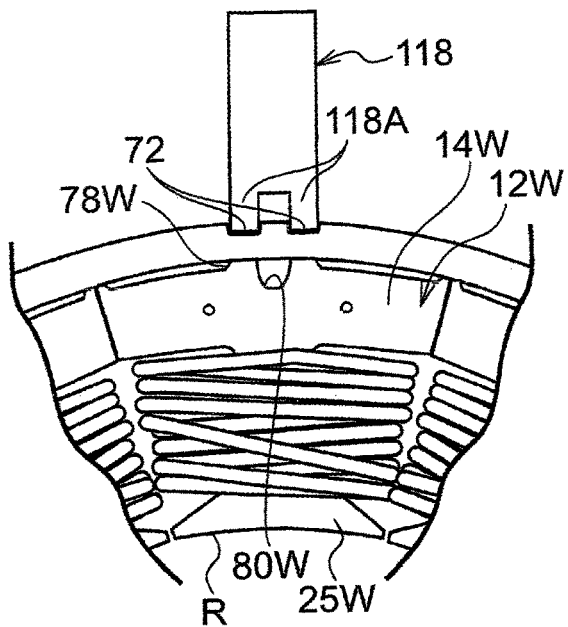
FIG. 10B is an enlarged plan view illustrating a portion surrounded by the single-dot broken line in FIG. 10A.

As illustrated in FIG. 9, FIG. 10A and FIG. 10B, an processing force F2 is input to the press section 120 by a press, and the projection portions 118A of the punches 118 are pressed against the outer peripheral portion of the stator case 70. The twelve individual plastic deformation portions 72 are thereby formed at the outer peripheral portion of the stator case 70 at even intervals around the circumferential direction (crimping process). The diameter of the stator case 70 is accordingly decreased at the locations where the plastic deformation portions 72 are formed, and these locations press against each of the core configuration sections 14U, 14V, 14W. As a result, the stator case 70 and the stator core 20 (the stator main body 11 (see FIG. 1B)) are integrated together.

In the present exemplary embodiment, adjustment is made such that, according to the rigidity of the connection portions 34U, 34V, 34W of the insulators 18U, 18V, 18W (see FIG. 1B) an processing force F3 is input from the projection portions 118A of the punches 118 to the stator case 70 when forming the plastic deformation portions 72 at locations facing towards the U-phase yoke configuration sections 22U, an processing force F4 is input from the projection portions 118A to the stator case 70 when forming the plastic deformation portions 72 at locations facing towards the V-phase yoke configuration sections 22V, and an processing force F5 is input from the projection portions 118A to the stator case 70 when forming the plastic deformation portions 72 at locations facing towards the W-phase yoke configuration sections 22W. More specifically, F3, F4 and F5 are set such that when each of the core configuration sections 14U, 14V, 14W are pressed at locations on the stator case 70 where the plastic deformation portions 72 are to be formed, each of the core configuration sections 14U, 14V, 14W moves by the same distance as each other towards the radial direction inside. More specifically, in consideration of a reaction forces due to deforming each of the connection portions 34U, 34V, 34W having different rigidities, the processing force F4 is set greater than the processing force F3, and the processing force F5 is set greater than the processing force F4. Note that processing forces F3, F4, F5 may be determined by computation or by performing testing.

When the stator case 70 and the stator core 20 are integrated together using the processing forces F3, F4, F5, distortion in the placement of the core configuration sections 14U, 14V, 14W (the stator configuration sections 12U, 12V, 12W) is suppressed, and hence the circularity of the stator core 20 (the stator main body 11) is improved. In other words, the stator case 70 functions as an adjustment member to adjust the circularity of the stator core 20 (the stator main body 11) when the stator case is formed with the plastic deformation portions 72 by imparting the processing forces F3, F4, F5 as described above.

Figure 11:
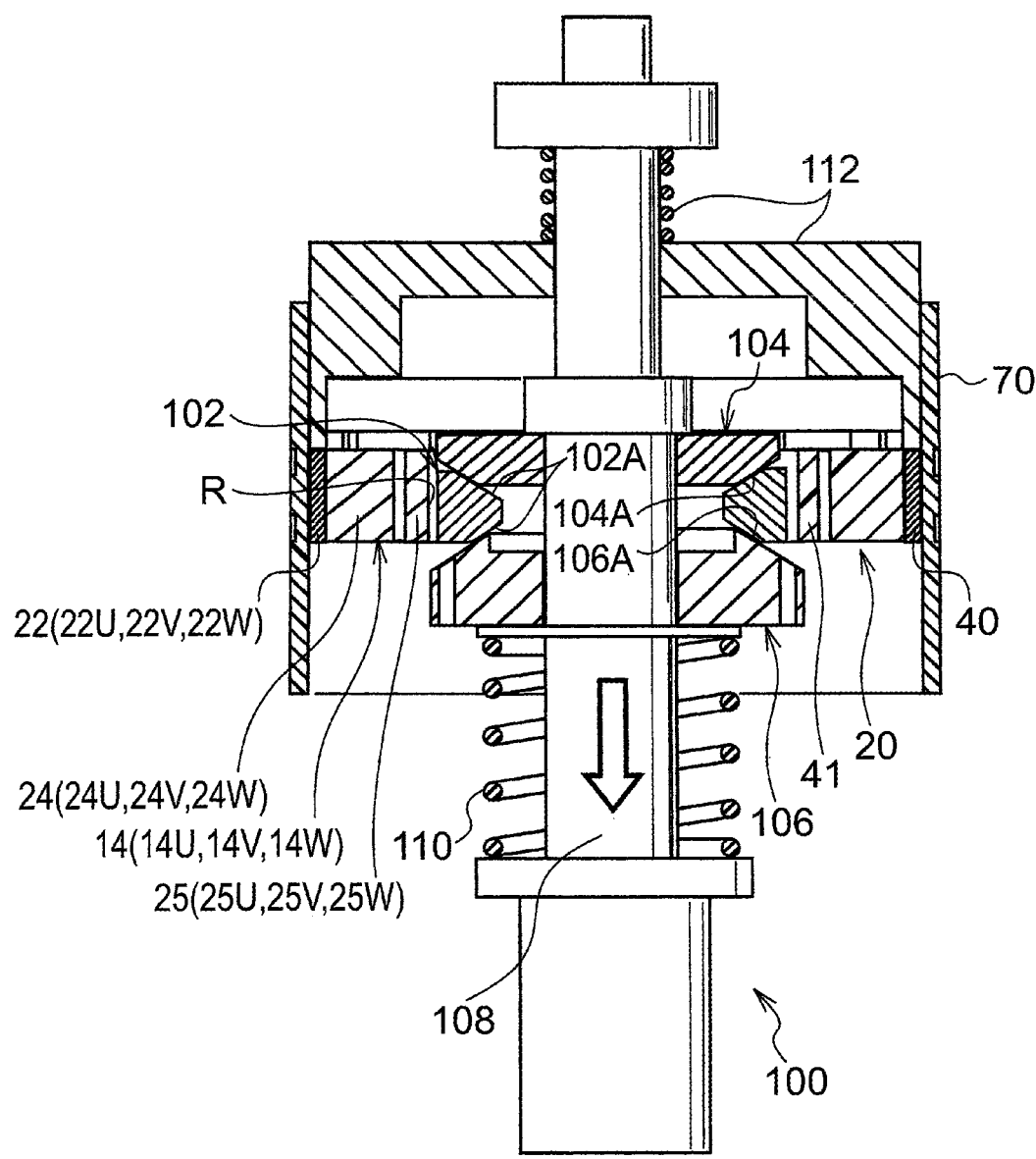
FIG. 11 is a vertical cross-section illustrating the metal core, stator core and stator case when the metal core is being removed.

Next, as illustrated in FIG. 11, the crimping tool 114 is removed from the stator case 70, the stator core 20 and the metal core 100. Then the diameter of the variable core retention sections 102 is compressed by releasing the tension of the spring 110, and the metal core 100 that was inserted into the stator core 20 is removed from the stator core 20.

The stator case 70 and the stator core 20 (the stator main body 11) are integrated together through the above processes, thereby configuring the stator 10. The brushless motor 60 is manufactured by disposing a rotor at the radial direction inside of the stator 10 (rotor placement process).

Operation and Advantageous Effects of the Present Exemplary Embodiment

Explanation follows regarding operation and advantageous effect of the present exemplary embodiment.

As illustrated in FIG. 1A, the brushless motor 60 of the present exemplary embodiment is configured as described above including the rotor 50, the stator core 20 and the stator case 70. Current is passed through the coil wires 16, and the rotor 50 that includes the magnets 54S, 54N is rotated about the rotation shaft section 52 as the center axis by the rotating magnetic field generated in the stator core 20 and the stator case 70.

Moreover, in the present exemplary embodiment, the stator core 20 is configured to include the yoke 40, the teeth sections 24 and the inner ring shaped section 41, and the stator core 20 is integrated to the stator case 70. The face of the inner ring shaped section 41 on the rotor 50 side (the inner peripheral faces of the metal core contact portions 25U, 25V, 25W) is formed with the circular arc shaped faces R that are centered on the axis of the rotor 50. Thus, in the process to integrate together the stator case 70 and the stator core 20 (the stator main body 11), it is possible to dispose the metal core 100 having a diameter corresponding to an internal diameter of the circular arc shaped faces R at the radial direction inside of the inner ring shaped section 41 (see FIG. 5) whereby the plastic deformation portions 72 are formed at the outer peripheral portions of the stator case 70. Consequently, the circularity of the inner ring shaped section 41 of the stator core 20 is maintained even though the yoke 40 of the stator core 20 (the protruding portions 78U, 78V, 78W) is pressed at locations of the stator case 70 where the plastic deformation portions 72 are formed.

Moreover, in the present exemplary embodiment, the protruding portions 78U, 78V, 78W formed at the yoke configuration sections 22U, 22V, 22W of the stator core 20 face towards the plastic deformation portions 72 at the outer peripheral portions of the stator case 70. Thus when the plastic deformation portions 72 are formed to outer peripheral portions of the stator case 70, a reaction force is concentrated at the locations on the stator case 70 where the plastic deformation portions 72 are formed and at locations where the protruding portions 78U, 78V, 78W at the yoke configuration sections 22U, 22V, 22W of the stator core 20. The tightness of fit between the locations where the plastic deformation portions 72 are formed and the locations of the yoke configuration sections 22U, 22V, 22W where the protruding portions 78U, 78V, 78W are formed is accordingly raised, thereby improving the fixing force between the stator case 70 and the stator core 20.

Moreover, in the present exemplary embodiment, the protruding portions 78U, 78V, 78W are disposed at even intervals around the circumferential direction of the yoke 40 as viewed along the axial direction of the yoke 40, and the plastic deformation portions 72 of the stator case 70 are disposed at even intervals around the circumferential direction of the yoke 40 as viewed along the axial direction of the yoke 40. The yoke 40 is accordingly pressed by the stator case 70 uniformly around the circumferential direction of the yoke 40.

To summarize the above, the brushless motor 60 of the present exemplary embodiment improves the circularity of the stator core 20 and improves the fixing force between the stator case 70 and the stator core 20.

Moreover, according to the present exemplary embodiment, the protruding portions 78U, 78V, 78W formed at the yoke configuration sections 22U, 22V, 22W are disposed at locations facing towards the teeth sections 24. The variable core retention sections 102 (see FIG. 5) are accordingly able to support pressing force input from the punches 118 through the stator case 70 perpendicularly with respect to the yoke configuration sections 22U, 22V, 22W. The tightness of fit between the locations where the plastic deformation portions 72 are formed at the stator case 70 and the locations where the protruding portions 78U, 78V, 78W are formed of the stator core 20 is accordingly raised. As a result, in the present exemplary embodiment, the fixing force between the stator case 70 and the stator core 20 can be raised even more.

Moreover, in the present exemplary embodiment, the plastic deformation portions 72 are formed at the outer peripheral portion of the stator case 70 at multiples of 3 or multiples of 4 (twelve individual (locations)). The support force for the stator core 20 by the stator case 70 can thereby be made uniform around the circumferential direction of the stator case 70, and manufacturing process control can be facilitated when the punches 118 are caused to contact the outer peripheral portion of the stator case 70 to form the plastic deformation portions 72.

Moreover, in the present exemplary embodiment, the stator core 20 is configured with a segmented structure by the twelve individual core configuration sections 14U, 14V, 14W, and the plastic deformation portions 72 are formed at the twelve individual (locations) of the outer peripheral portion of the stator case 70. The support force for the core configuration sections 14U, 14V, 14W by the stator case 70 can accordingly be made uniform.

Moreover, in the manufacturing method of the stator 10 of the present exemplary embodiment, the stator case 70 formed in a circular cylinder shape with an internal diameter that exceeds the outer diameter of the stator core 20 is disposed along the yoke 40 of the stator core 20 through the case placement process. Generation of burrs caused due to sliding contact between the inner peripheral face of the stator case 70 and the outer peripheral face of the stator core 20 (the protruding portions 78U, 78V, 78W) can accordingly be suppressed. It is accordingly possible to suppress problems such as motor rocking and circuit shorting.

Moreover, as illustrated in FIG. 6A to FIG. 11, the metal core setting process is performed. Then the stator case 70 and the stator core 20 are integrated together through the crimping process by forming the plural plastic deformation portions 72 at the outer peripheral portion of the stator case 70. Thus, the plastic deformation portions 72 are formed at the outer peripheral face of the stator case 70 in a state in which the circularity of the inner ring shaped section 41 (the metal core contact portions 25U, 25V, 25W) is secured by the variable core retention sections 102 in contact state between the outer peripheral face of the variable core retention sections 102 and the circular arc shaped faces R of the metal core contact portions 25U, 25V, 25W. The circularity of the inner ring shaped section 41 is accordingly maintained even external force is imparted to the stator case 70 to form the plastic deformation portions 72.

Moreover, in the present exemplary embodiment, the external force to the outer peripheral portion of the stator case 70 to form the plastic deformation portions 72 is input from the punches 118, and this external force is supported by the variable core retention sections 102 of the metal core 100. Namely, the inner ring shaped section 41 of the stator core 20 is not compressed in the radial direction when external force is imparted to the outer peripheral face of the stator case 70. The tightness of fit is accordingly increased between the locations on the stator case 70 where the plastic deformation portions 72 are formed, and the yoke 40 of the stator core 20 (the protruding portions 78U, 78V, 78W), and the fixing force between the stator case 70 and the stator core 20 is raised.

To summarize the above, the manufacturing method of the stator of the present exemplary embodiment enables the circularity of the stator core 20 to be improved, and the fixing force between the stator case 70 and the stator core 20 to be increased.

Moreover, after the outer peripheral face of the variable core retention sections 102 and the circular arc shaped faces R of the metal core contact portions 25U, 25V, 25W have been placed in contact by expanding the diameter of the variable core retention sections 102, the outer peripheral face of the yoke 40 of the stator core 20 (the protruding portions 78U, 78V, 78W) is placed in contact with the inner peripheral face of the stator case 70 by further expanding the variable core retention sections 102. The plastic deformation portions 72 are then formed at the outer peripheral face of the stator case 70 in a contacting state of the outer peripheral face of the yoke 40 (the protruding portions 78U, 78V, 78W) and the inner peripheral face of the stator case 70. The tightness of fit between the locations on the stator case 70 where the plastic deformation portions 72 are formed and the yoke 40 of the stator core 20 (the protruding portions 78U, 78V, 78W) is accordingly improved even further. As a result, in the present exemplary embodiment, the fixing force between the stator case 70 and the stator core 20 can be raised even more.

Moreover, in the present exemplary embodiment, the impetus of the spring 110 is set such that the variable core retention sections 102 contract in the radial direction when the external force (pressing force) on the outer peripheral face of the stator case 70 for forming the plastic deformation portions 72 exceeds a specific value. Thus, the stator case 70 and the stator core 20 can be integrated together by a desired fixing force.

Explanation follows regarding distinctive operation and advantageous effects of the present exemplary embodiment.

As illustrated in FIG. 10A, in the present exemplary embodiment, the processing forces F3, F4, F5 are set in consideration of the reaction force caused by deformation of the connection portions 34U, 34V, 34W (see FIG. 1B) when each of the core configuration sections 14U, 14V, 14W are pressed by the locations on the stator case 70 where the plastic deformation portions 72 are formed. Thus distortion in the placement of the core configuration sections 14U, 14V, 14W (the stator configuration sections 12U, 12V, 12W) can be suppressed when the stator case 70 and the stator core 20 are being integrated together, thereby enabling the circularity of the stator core 20 (the stator main body 11) to be improved.

Figure 12A:
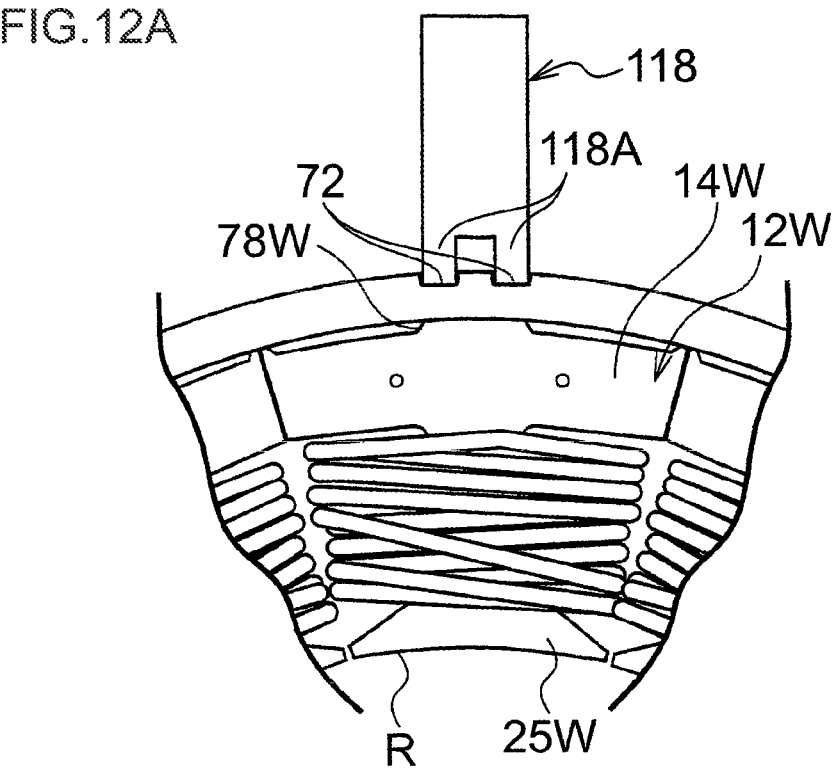
FIG. 12A is an enlarged plan view corresponding to FIG. 10B and illustrating a location where a plastic deformation portion is formed in a stator according to a modified example.

Note that, in the present exemplary embodiment, explanation has been given of a case in which the indentation portions 80U, 80V, 80W are formed at the protruding portions 78U, 78V, 78W of the yoke configuration sections 22U, 22V, 22W, however the present invention is not limited thereto. For example, as illustrated in FIG. 12A, the indentation portions 80U, 80V, 80W may not be formed at the protruding portions 78U, 78V, 78W. Consequently, regarding whether or not to form the indentation portions 80U, 80V, 80W at the protruding portions 78U, 78V, 78W, this may be appropriately set in consideration of such factors as a contact pressure between the protruding portions 78U, 78V, 78W and the stator case 70.

Figure 12B:
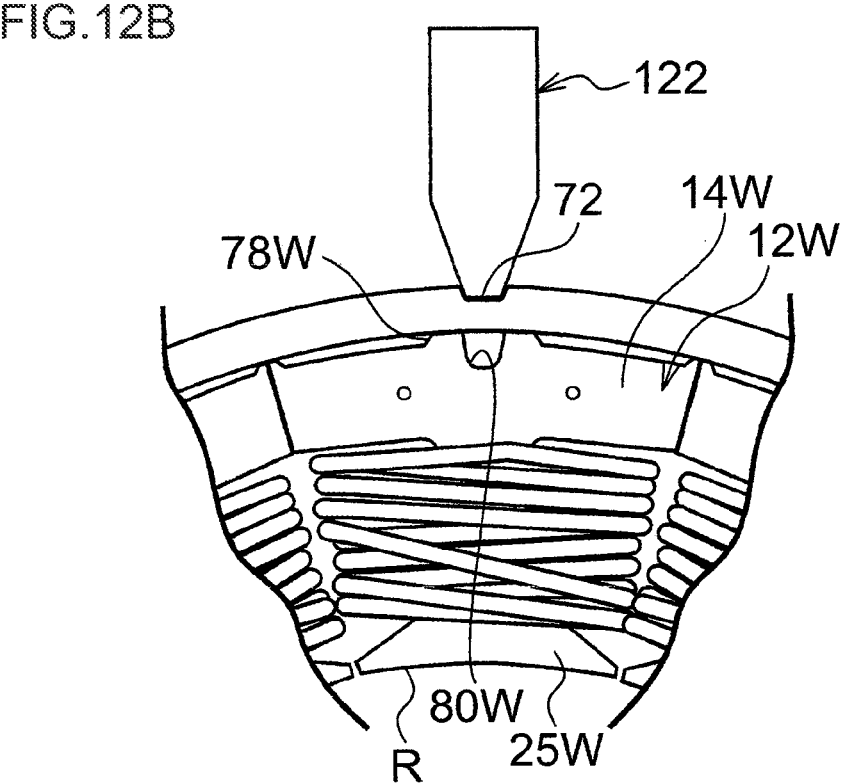
FIG. 12B is an enlarged plan view corresponding to FIG. 10B and illustrating a location where a plastic deformation portion is formed in a stator according to another modified example.

Moreover, in the present exemplary embodiment, explanation has been given of an example in which the punches 118 including the pair of projection portions 118A are employed to form the plastic deformation portions 72 on the outer peripheral portion of the stator case 70, however the present invention is not limited thereto. For example, as illustrated in FIG. 12B, plastic deformation portions 72 may be formed by a configuration in which punches 122 that are formed so as to narrow towards the leading end side are pressed against the stator case 70 at locations facing towards the indentation portions 80U, 80V, 80W. In such cases, the fixing force between the stator case 70 and the stator core 20 is raised even further.

Modified Examples

Explanation now follows regarding stators according to modified examples of the above exemplary embodiment. Note that, basically similar configuration to that of the above exemplary embodiment is allocated the same reference numerals to those of the configuration of the exemplary embodiment explained above, and further explanation is omitted.

As illustrated in FIG. 4B, the stator according the present modified example has the characteristic that the rigidities of each of the connection portions 34U, 34V, 34W of insulators are the same as each other. Specifically, the U-phase connection portion 34U that is formed with the largest internal diameter and outer diameter out of the plural connection portions 34U, 34V, 34W is configured with a plate thickness (a wall thickness) in the radial direction as T1. Moreover, a width in the axial direction of the U-phase connection portion 34U where the retaining portions 36U and the notches 38U are not formed is W1.

A plate thickness in the radial direction of the connection portion 34V disposed at the radial direction inside of the U-phase connection portion 34U is T2 that is thinner than the T1, and a width in the axial direction of the V-phase connection portion 34V where the retaining portions 36V and the notches 38V are not formed is W2 that is narrower than width W1.

Moreover, a plate thickness in the radial direction of the connection portion 34W disposed at the radial direction inside of the V-phase connection portion 34V is T3 that is thinner than T2, and a width in the axial direction of the W-phase connection portion 34W where the retaining portions 36W are not formed is W3 that is narrower than width W2.

By adjusting the plate thicknesses T1, T2, T3 and the widths W1, W2, W3 of the connection portions 34U, 34V, 34W in the manner explained above, the respective rigidities of each of the connection portions 34U, 34V, 34W are made similar to each other.

Figure 4C:
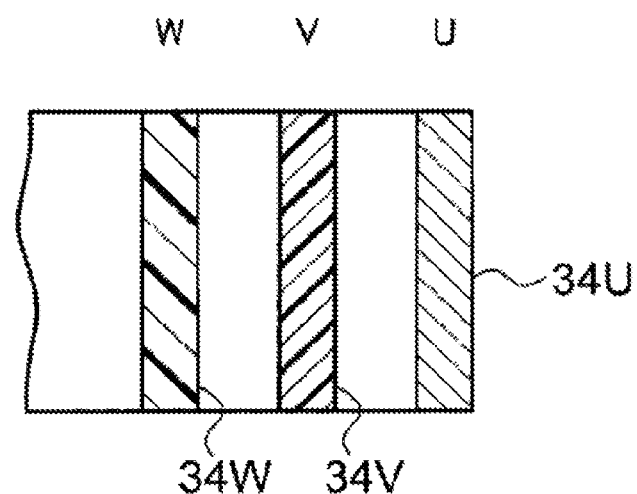
FIG. 4C is an enlarged cross-section illustrating connection sections of insulators according to a second modified exemplary embodiment.

Moreover, in the modified examples described above, explanation has been given of an example in which the rigidities of each of the connection portions 34U, 34V, 34W are made substantially the same as each other by adjusting the plate thicknesses T1, T2, T3 and the widths W1, W2, W3 of the connection portions 34U, 34V, 34W, however the rigidities of the connection portions 34U, 34V, 34W may be made similar to each other by using another method. For example, as in a second modified example illustrated in FIG. 4C, the rigidity of each of the connection portions 34U, 34V, 34W can be adjusted so as to be the same as each other by varying the materials of the connection portions 34U, 34V, 34W. In the second modified example, the rigidities of each of the connection portions 34U, 34V, 34W are adjusted by for example employing an aluminum alloy as the material of the U-phase connection portion 34U, employing polyacetal as the material for the V-phase connection portion 34V, and moreover employing a polyamide fiber composite as the material of the W-phase connection portion 34W. In other words, the rigidity of the connection portions 34U, 34V, 34W is adjusted by using materials such that the nearer the respective connection portion is disposed to the radial direction inside the material having a lower Young's modulus is used.

Moreover, in a third modified example as illustrated in FIG. 4D, the rigidities of each of the connection portions 34U, 34V, 34W can be adjusted by providing a rib 124 extending towards the radial direction outside of the connection portion 34U at a second axial direction side (arrow Z2 side) end portion of the U-phase connection portion 34U, and by providing plural notches 126 in the outer peripheral portion of the W-phase connection portion 34W, namely by adjusting the cross-section profile of each of the connection portions 34U, 34V, 34W.

Figure 4E:
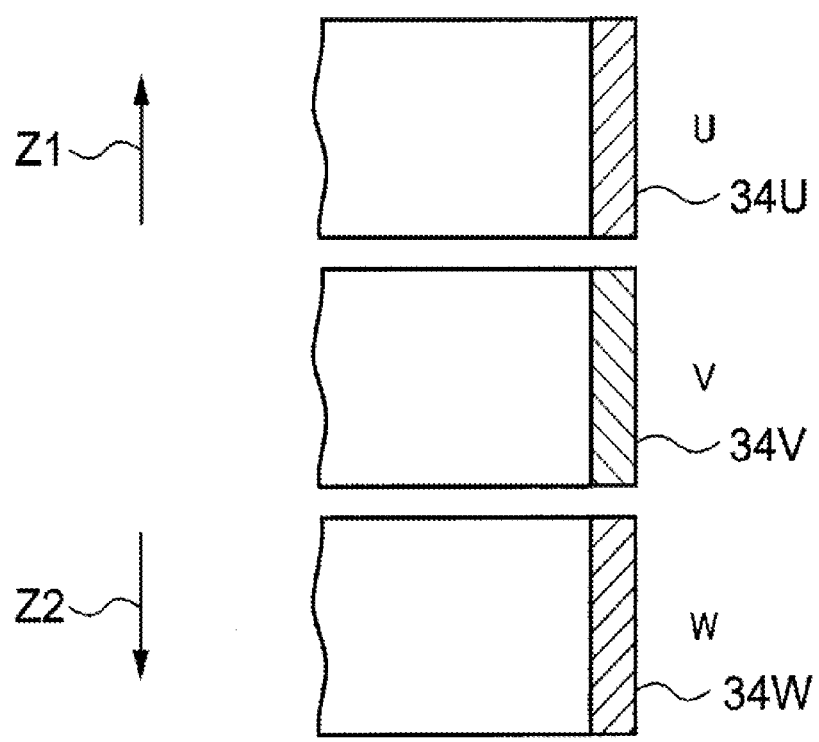
FIG. 4E is an enlarged cross-section illustrating connection section of insulators according to a fourth modified exemplary embodiment.

Moreover, in a fourth modified example as illustrated in FIG. 4E, the rigidities of each of the connection portions 34U, 34V, 34W can be adjusted be the same as each other by setting the internal and external diameters of each of the connection portions 34U, 34V, 34W the same as each other, disposing each of the connection portions 34U, 34V, 34W so as to be adjacent to each other in their axial directions, and in addition setting the cross-section profile of each of the connection portions 34U, 34V, 34W the same as each other. Moreover, cases in which the connection portions 34U, 34V, 34W are thus disposed also achieve a more compact stator 10 in the radial direction.

Operation and Advantageous Effects of the Modified Examples

In the stators according to the modified examples described above, due to the rigidities of each of the connection portions 34U, 34V, 34W of the insulators being set the same as each other, the processing forces F3, F4, F5, as illustrated in FIG. 10A, required to form the plastic deformation portions 72 at the outer peripheral portions of the stator case 70 can be made the same processing force as each other. The modified examples can accordingly easily control processing when integrating together the stator core 20 (the stator main body 11) and the stator case 70.

Note that although the configurations illustrated in FIG. 4B to FIG. 4E have been given in the above modified examples as ways to make the rigidities of each of the connection portions 34U, 34V, 34W of the plural insulators the same as each other, the present invention is not limited thereto. Other methods may be employed to make rigidities of each of the connection portions 34U, 34V, 34W the same as each other, or the configurations illustrated in FIG. 4B to FIG. 4E may be appropriately combined.

Moreover, explanation has been given in the above exemplary embodiment and in the modified examples of examples in which the U-phase stator configuration section 12U is supported by the connection portion 34U, the V-phase configuration section 12V is supported by the connection portion 34V, and the W-phase configuration section 12W is supported by the connection portion 34W, the present invention is not limited thereto. For example, configuration may be made such that one connection portion supports the U-phase stator configuration section 12U, the V-phase configuration section 12V, and the W-phase configuration section 12W. Namely, there is no requirement for a connection portion to be provided for each of the phases.

Other Manufacturing Method of Stator 10

Explanation follows regarding another manufacturing method of the stator 10, with reference to FIG. 13 to FIG. 16.

Figure 13:
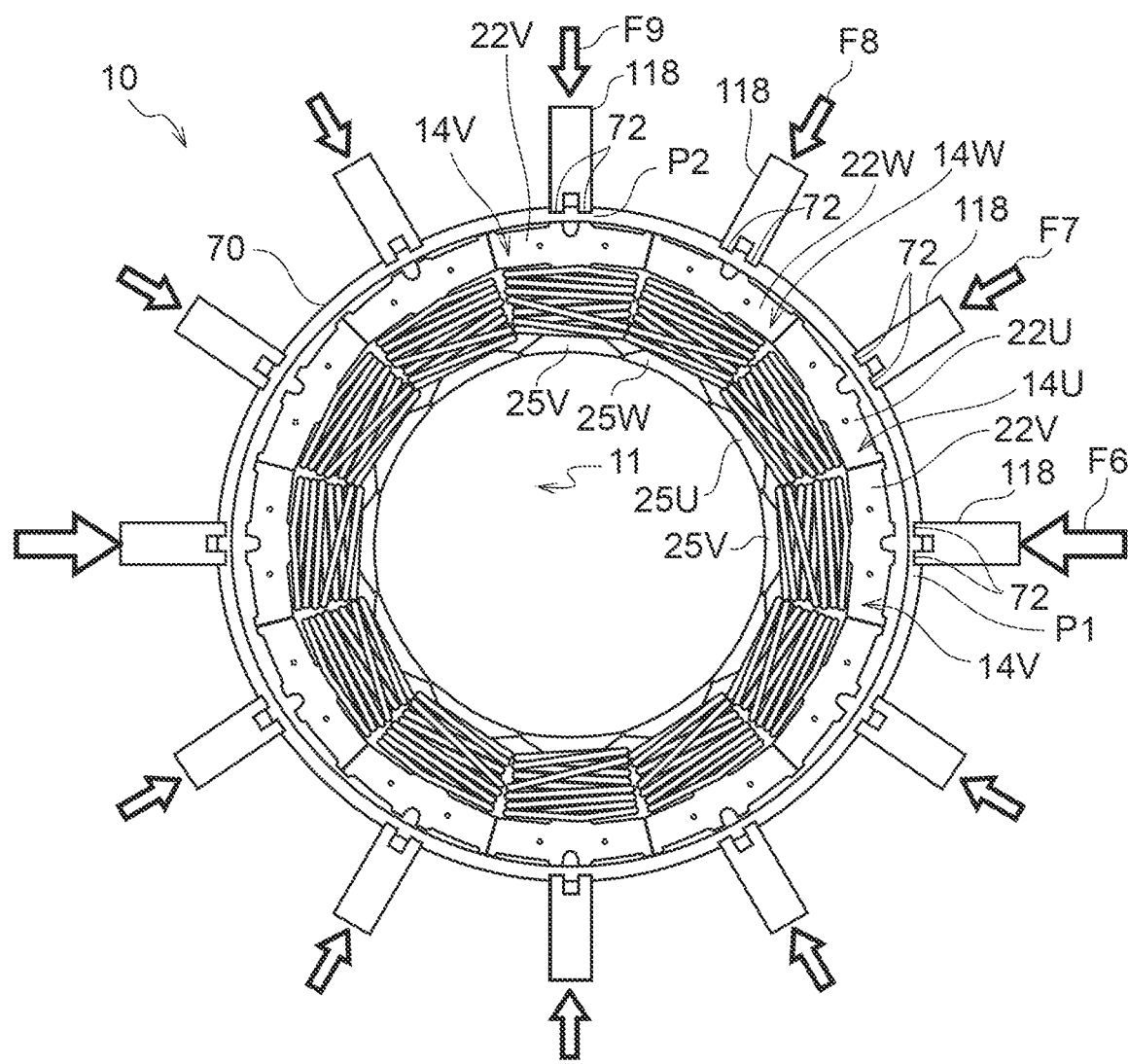
FIG. 13 is a plan view corresponding to FIG. 10A and illustrating a stator core and a slightly distorted stator case when a crimping tool is operated by processing force of a press.
Figure 14:
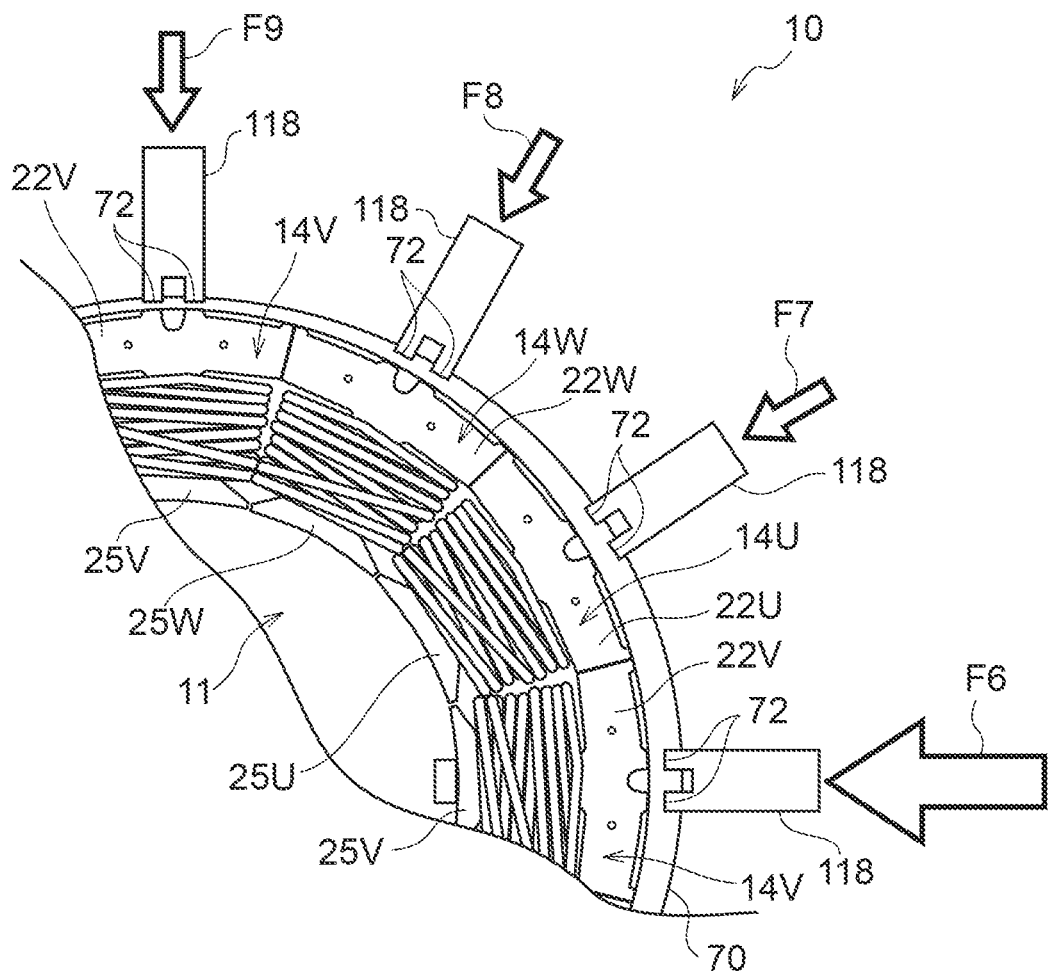
FIG. 14 is an enlarged plan view corresponding to FIG. 10A and illustrating a stator core and a stator case of varying thickness when a crimping tool is operated by processing force of a press.

The manufacturing method illustrated in FIG. 13 and FIG. 14 has a crimping process with a feature of considering the rigidity of locations on the stator case 70 pressed by the punches 118, and adjusting the processing force applied from each of the punches 118 to the outer peripheral portion of the stator case 70.

As illustrated in FIG. 13, in situations in which the stator case 70 has an elliptical shaped distortion in its profile as viewed along the axial direction, the deformation at pressed location P1 when the outer peripheral portion of the stator case 70 is pressed from outside towards inside in a long radial direction is smaller than the deformation at location P2 when the outer peripheral portion of the stator case 70 is pressed from outside towards inside in a short radial direction. In other words, the rigidity of the location P1 on the long radial direction of the stator case 70 is higher than the rigidity of the location P2 on the short radial direction of the stator case 70. A processing force F6 pressing the location P1 is accordingly set larger than the processing force F9 pressing the location P2. Moreover, adjustment is made such that an intermediate portion between the location P1 and the location P2 of the stator case 70 is pressed by processing forces F7, F8 which are smaller than processing force F6 but larger than processing force F9. Note that processing forces F6, F7, F8, F9 are determined based on data of the profile of the stator case 70.

As illustrated in FIG. 14, in cases in which the wall thickness of the stator case 70 is not constant along the circumferential direction and plural locations at the stator case 70 are pressed towards the radial direction inside, the deformation is smaller at pressed locations where the stator case 70 is thick walled than at pressed locations where the stator case 70 is thin walled. In other words, the rigidity of the thick walled locations is higher than that of the thin walled locations of the stator case 70. Therefore the processing force F6 pressing the thick walled locations of the stator case 70 is set higher than the processing forces F7, F8, F9 pressing thinner walled locations of the stator case 70. Note that processing forces F6, F7, F8, and F9 are determined based on data of the thickness of each portion of the stator case 70.

Figure 15:
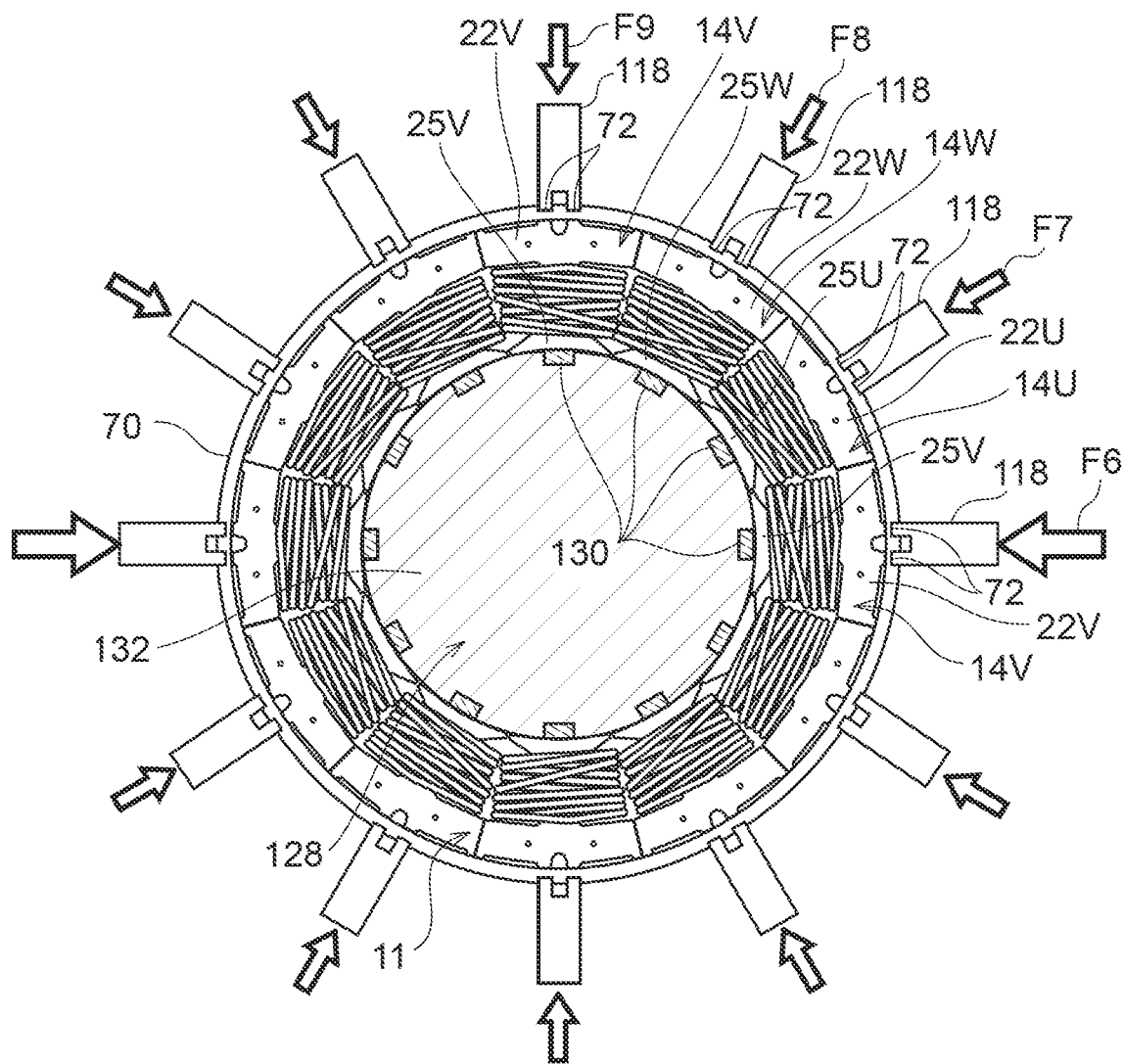
FIG. 15 is a plan view corresponding to FIG. 10A and illustrating a stator core, a stator case and a metal core when a crimping tool is operated by processing force of a press.

In the manufacturing method illustrated in FIG. 15, the stator 10 is manufactured employing a metal core 128 equipped with sensors 130 that detect contact pressure against the metal core contact portions 25U, 25V, 25W of the core configuration sections 14U, 14V, 14W. First, explanation is given for a configuration of the metal core 128, the metal core 128 is configured including a base portion 132 formed in a circular bar shape, and twelve individual sensors 130 fixed to outer peripheral portions of the base portion 132. The twelve individual sensors 130 are disposed at even intervals along a circumferential direction of the base portion 132. Note that the sensors 130 are pressure sensors that output a signal on being pressed towards the radial direction inside of the base portion 132. After carrying out the case placement processes described above, the above metal core 128 is inserted at the radial direction inside of the stator main body 11, namely into a region surrounded by the metal core contact portions 25U, 25V, 25W (metal core setting process). Then the twelve individual plastic deformation portions 72 of the stator case 70 are formed at even intervals along the circumferential direction of the stator case 70 by the projection portions 118A of the punches 118 pressing the outer peripheral portion of the stator case 70 (crimping process). Locations of the stator case 70 where the plastic deformation portions 72 are formed are thereby contracted in diameter, and when these locations press against each of the core configuration sections 14U, 14V, 14W, the metal core contact portions 25U, 25V, 25W of each of the core configuration sections 14U, 14V, 14W press the respective sensors 130. Moreover, in the present exemplary embodiment, the processing forces F6, F7, F8, F9 applied from the punches 118 to the outer peripheral portion of the stator case 70 are adjusted based on output values of each of the sensors 130. Note that in the present exemplary embodiment, the processing forces F6, F7, F8, F9 are adjusted such that the output values of the respective sensors 130 become the same as each other.

Figure 16:
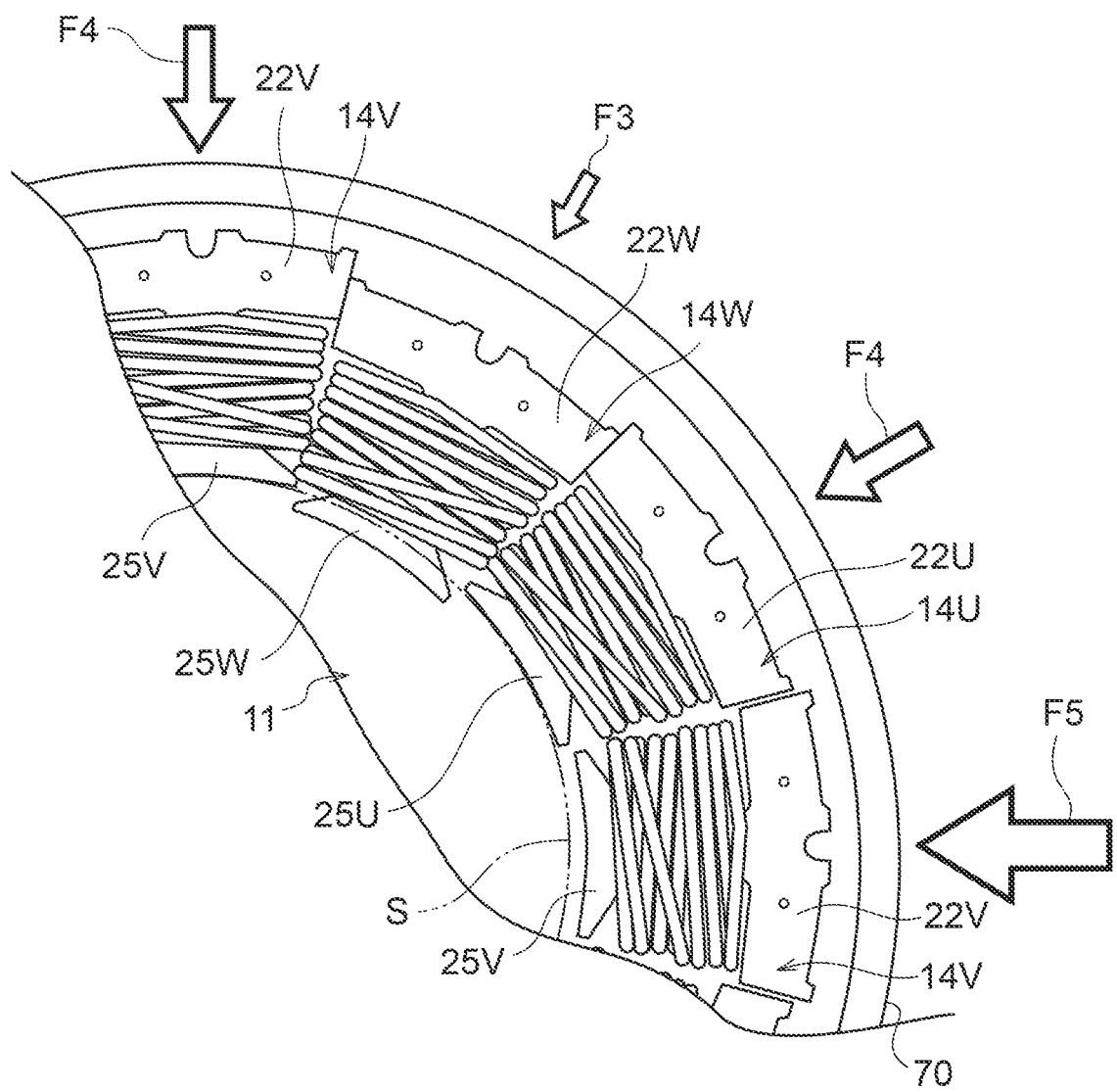
FIG. 16 is an enlarged plan view illustrating an enlargement of plural core configuration sections with variation in positioning in a peripheral direction.

In the manufacturing method illustrated in FIG. 16, a feature of the above crimping process is to adjust the processing force applied from each of the punches 118 to the outer peripheral portions of the stator case 70 in consideration of the alignment of the core configuration sections 14U, 14V, 14W. More specifically, a processing force F5 input to locations on the stator case 70 facing towards the core configuration sections 14U, 14V, 14W which offset further to the radial direction outside than a reference circle S is set greater than a processing force F3 input to locations on the stator case 70 facing towards the core configuration sections 14U, 14V, 14W which offset further to the radial direction inside than the reference circle S. Note that a processing force F4 input to locations on the stator case 70 facing towards the core configuration sections 14U, 14V, 14W that are not offset with respect to the reference circle S is a processing force smaller than processing force F5 and larger than processing force F3.

According to the manufacturing method as explained above, the circularity of the stator core 20 can be improved by adjusting processing force applied from the punches 118 to the stator case 70 in consideration of the rigidity of each portion of the stator case 70, the output values from the sensors 130, and/or the alignment of the core configuration sections 14U, 14V, 14W.

Explanation follows regarding a second exemplary embodiment of the present invention, with reference to the drawings.

Figure 17:
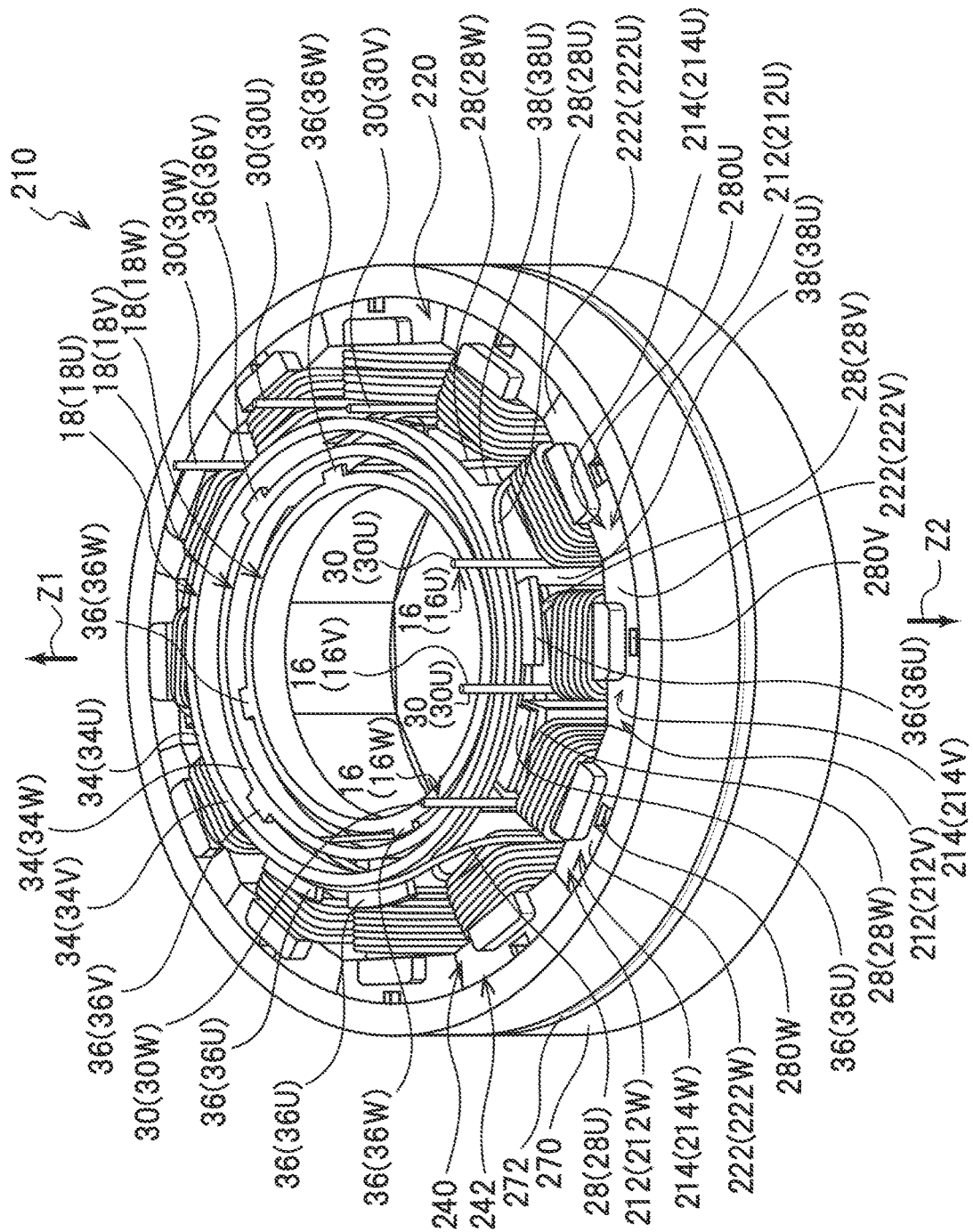
FIG. 17 is a perspective view illustrating a stator according to a second exemplary embodiment.
Figure 18A:
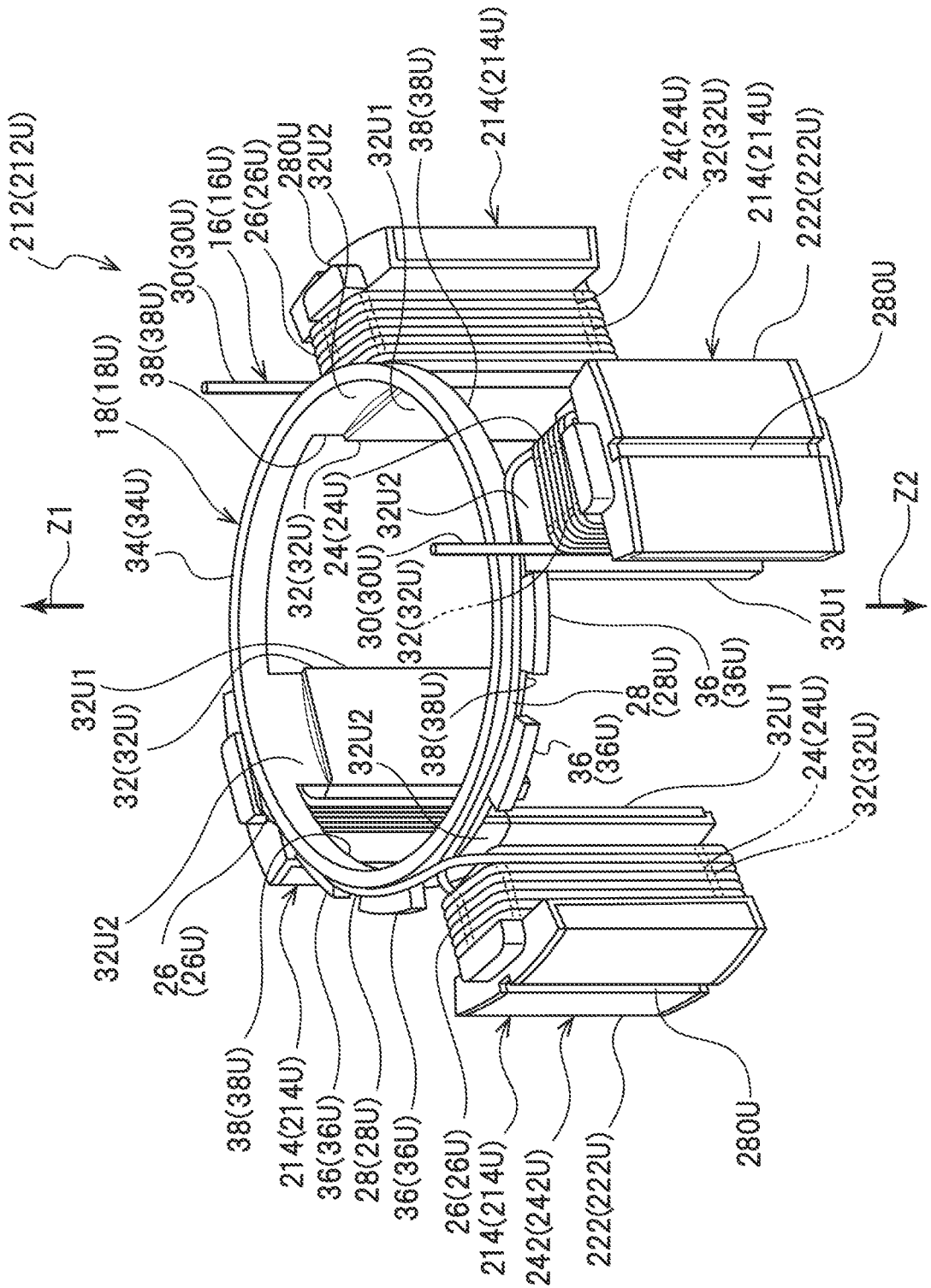
FIG. 18A is a perspective view illustrating a U-phase stator configuration section illustrated in FIG. 17.

As illustrated in FIG. 17, a stator 210 of the second exemplary embodiment is for use in an inner rotor type of brushless motor and is configured including a stator case 270, and a U-phase stator configuration section 212U, a V-phase stator configuration section 212V and a W-phase stator configuration section 212W as illustrated in FIG. 18A to FIG. 18C.

As illustrated in FIG. 17, the stator case 270 is formed in a thin walled circular cylinder shape, and is integrally formed along its circumferential direction using a soft magnetic metal (such as for example "iron" or the like). As illustrated in FIG. 19C, an internal diameter D1 of the stator case 270 exceeds an outer diameter D2 of core configuration sections 214U, 214V, 214W disposed in a ring shape, described in detail later. Moreover, as illustrated in FIG. 17, a plastic deformation groove 272 is formed on an outer peripheral face of the stator case 270 as a plastic deformation portion, by continuous forming around the circumferential direction of the stator case 270 (in the present exemplary embodiment there is a single plastic deformation groove 272 formed around the circumferential direction of the stator case 270). Due to forming the plastic deformation groove 272, the internal diameter of the stator case 270 is reduced (to less than the internal diameter D1) at the location where the plastic deformation groove 272 is formed. As a result, the core configuration sections 214U, 214V, 214W (the stator configuration sections 212U, 212V, 212W) that are disposed in a ring shape are integrated to the stator case 270.

As illustrated in FIG. 18A, the U-phase stator configuration section 212U is configured similarly to the stator configuration section 12U of the first exemplary embodiment, and so similar configuration parts are allocated the same reference numerals, and further explanation is omitted.

Figure 23:
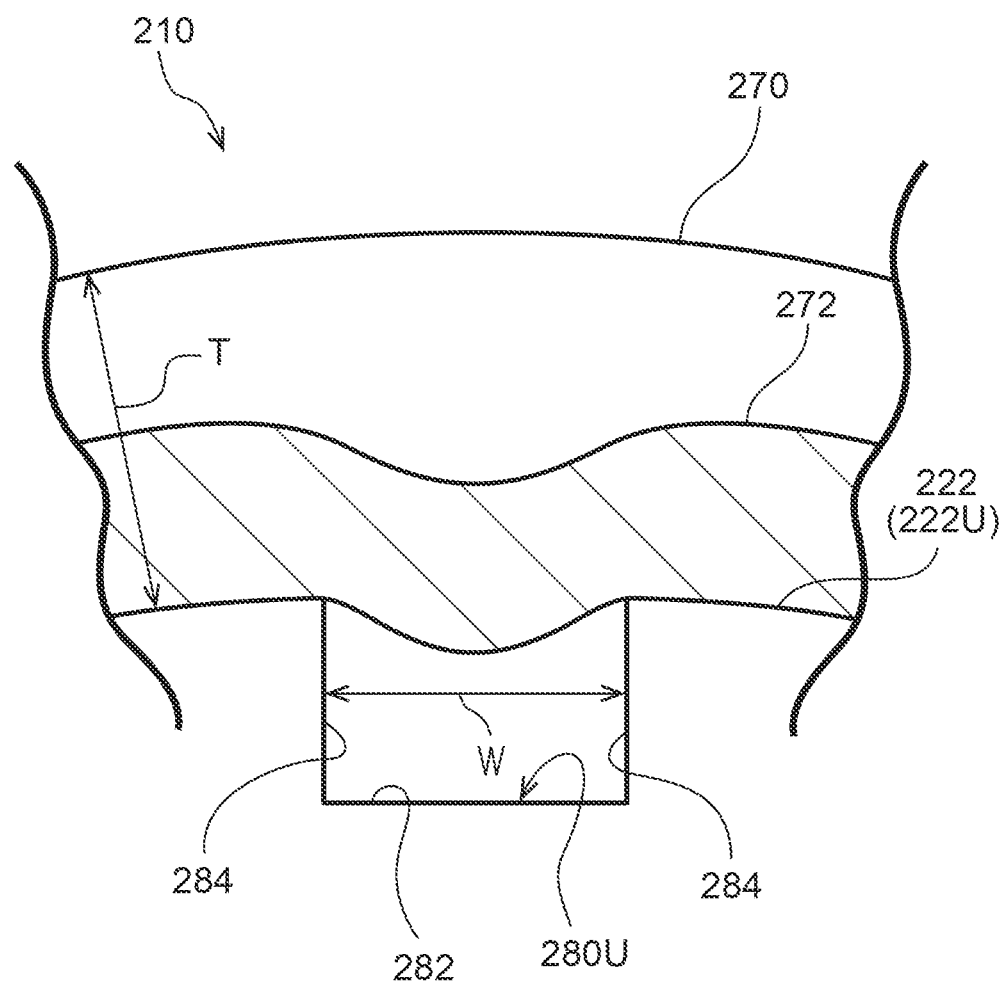
FIG. 23 is an enlarged horizontal cross-section illustrating a stator case and an indention portion formed at a core configuration section.

At locations of the yoke configuration sections 222U facing towards the teeth sections 24U, U-shaped grooved indentation portions 280U are formed opening toward a radial direction outside of the yoke configuration sections 222U and extending along an axial direction of the yoke configuration sections 222U. As illustrated in FIG. 23, the indentation portions 280U are configured with bottom faces 282 and pairs of side walls 284. The bottom faces 282 face toward the radial direction outside of the yoke configuration sections 222U, and the pairs of side walls 284 extend out in the radial direction of the yoke configuration sections 222U from two end portions of the bottom face 282, the two end portions are positioned in a circumferential direction of the yoke configuration sections 222U of the bottom face 282. The depth of the indentation portions 280U is set such that the stator case 270 formed with the plastic deformation groove 272 (the location of the stator case 270 where the plastic deformation groove 272 is formed) does not make contact with the bottom face 282. Moreover, a circumferential direction width W of the indentation portions 280U (a width dimension of the opening) is set smaller than a wall thickness T of the stator case 270 prior to forming the plastic deformation groove 272.

Figure 24:
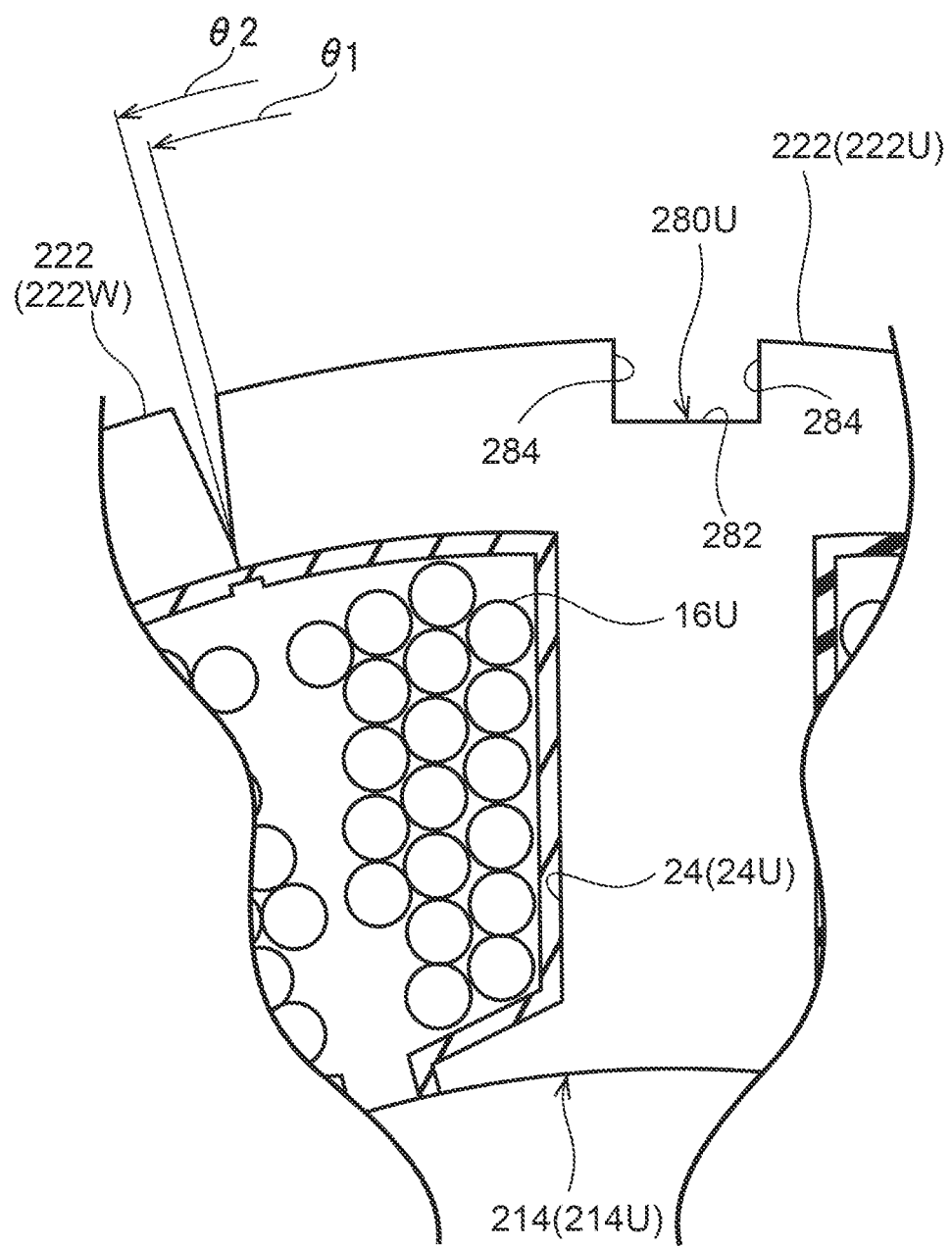
FIG. 24 is an enlarged plan view illustrating ring shape-arrayed core configuration sections.
Figure 25:
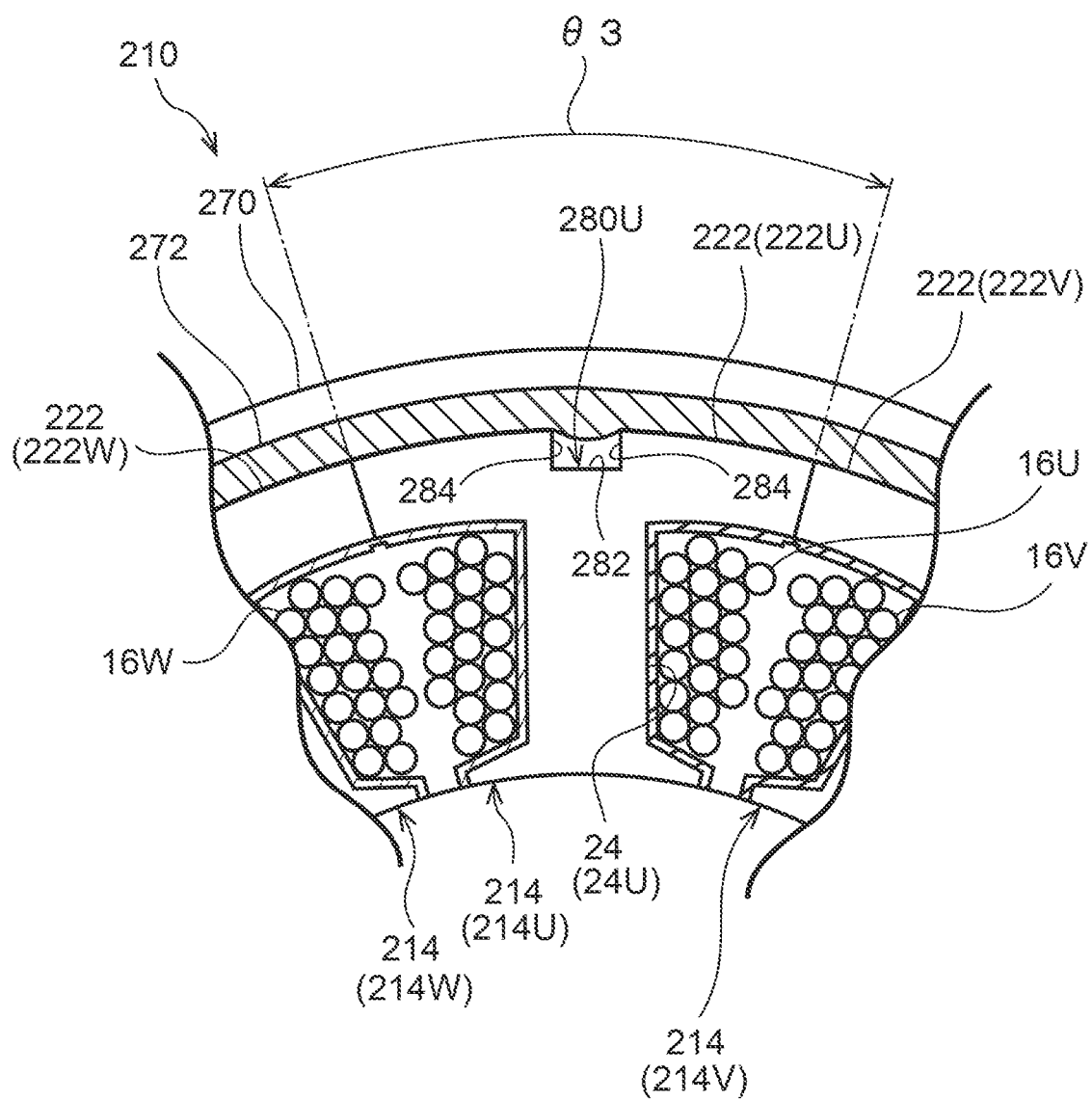
FIG. 25 is an enlarged plan view illustrating the core configuration sections and a stator case after a plastic deformation groove has been formed to the outer peripheral face of the stator case.

As illustrated in FIG. 24, prior to be retained by the stator case 270, an angle θ1 formed between one end and the other end in the circumferential direction of an outer peripheral portion of the yoke configuration sections 222U is set at a more acute angle than an angle θ2 formed between one end and the other end in the circumferential direction of an inner peripheral portion of the yoke configuration sections 222U. Namely, the circumferential direction end portions of the yoke configuration sections 222U, 222V, 222W are set to abut each other at respective inner periphery. Moreover, as illustrated in FIG. 24 and FIG. 25, the angle θ1 and the angle θ2 of the yoke configuration sections 222U are set at more acute angles (about 30° or less in the present exemplary embodiment) than a θ3 (360°/the number of teeth (twelve in the present exemplary embodiment)).

The V-phase stator configuration section 212V illustrated in FIG. 18B is configured similarly to the stator configuration section 12V of the first exemplary embodiment, and so further explanation of similar configuration parts is omitted. Indentation portions 280V provided to the yoke configuration sections 222V correspond to the indentation portions 280U described above.

The W-phase stator configuration section 212W illustrated in FIG. 18C is configured similarly to the stator configuration section 12W of the first exemplary embodiment, and so further explanation of similar configuration parts is omitted. Indentation portions 280W provided to the yoke configuration sections 222W correspond to the indentation portions 280U described above.

Then, as illustrated in FIG. 17, after assembling together the plural stator configuration sections 212U, 212V, 212W, as described in detail later, the stator 210 is configured such that the outer peripheral portion thereof is retained by the stator case 270. The plural yoke configuration sections 222U, 222V, 222W are respectively fitted between pairs of adjacent yoke configuration sections at both sides thereof.

The placement and configuration of the plural connection portions 34U, 34V, 34W is similar to that of the first exemplary embodiment.

Figure 20A:
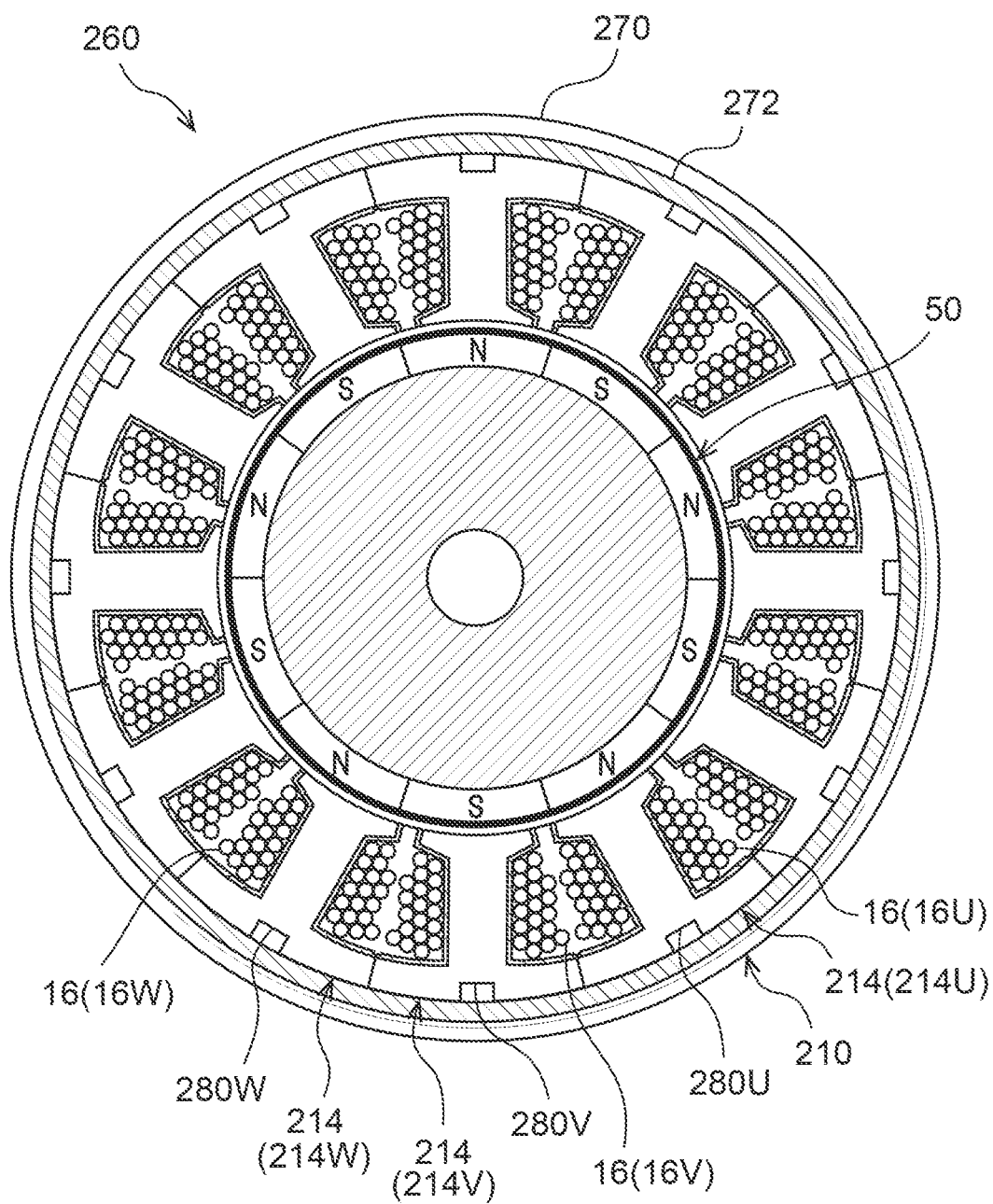
FIG. 20A is a horizontal cross-section illustrating a brushless motor equipped with the stator illustrated in FIG. 17.
Figure 20B:
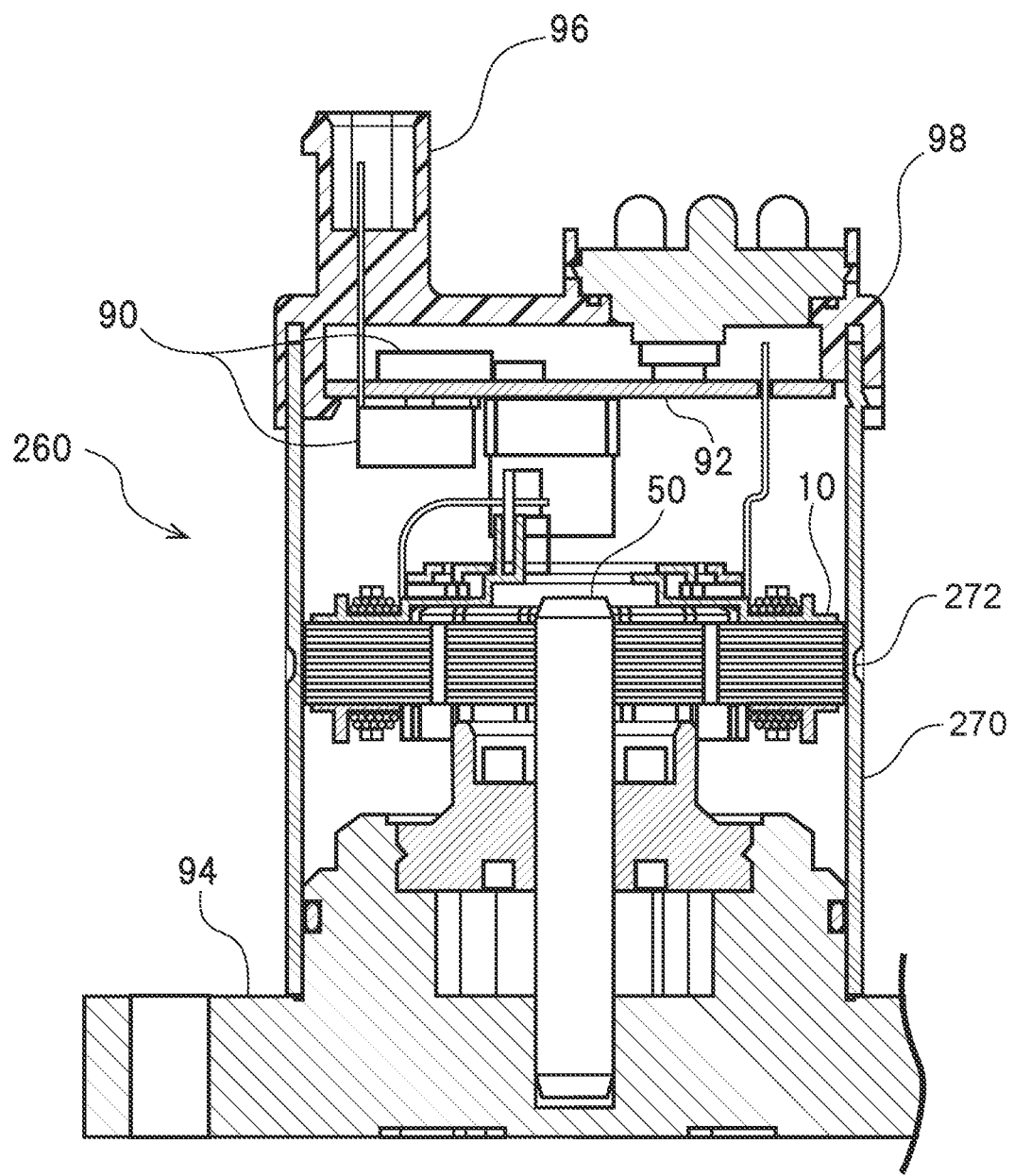
FIG. 20B is a vertical cross-section illustrating a brushless motor equipped with the stator illustrated in FIG. 17.

The stator 210 configured as described above, as illustrated in FIG. 20A and FIG. 20B, configures an inner rotor type of brushless motor 260 together with a rotor 50. The brushless motor 260 is configured such that the rotor 50 rotates when a rotating magnetic field is generated by the stator 210. Note that the brushless motor 260 is for example an 8-pole 12 slot motor. Circuit devices 90 for controlling rotation of the brushless motor 260 are provided to a circuit board 92 inside the stator case, and the two ends of the stator case are closed off by a base member 94 and a cover 98 equipped with a connector section 96 to which an external connector, not illustrated in the drawings, is connected.

Explanation follows regarding a manufacturing method of the stator 210 configured as described above.

Similarly to in the first exemplary embodiment, the sub-assemblies 242U, 242V, 242W are formed for each of the U-phase, the V-phase and the W-phase (the sub-assembly forming process).

Figure 21:
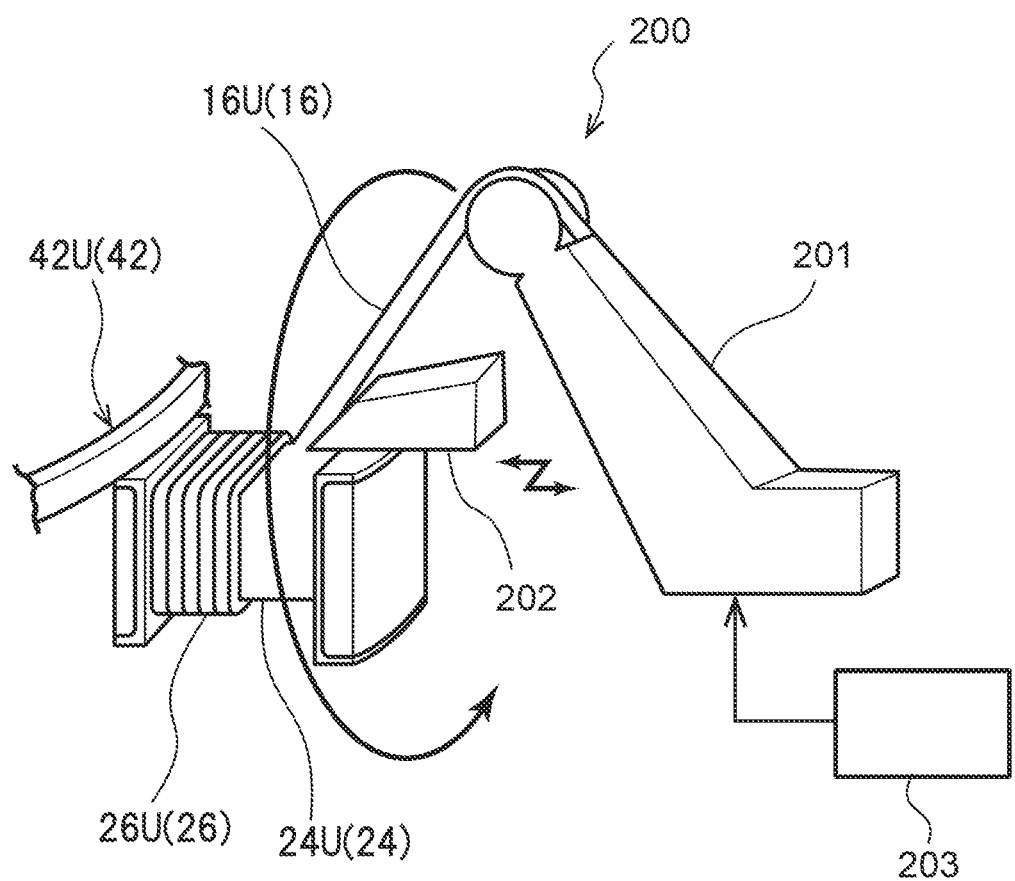
FIG. 21 is a drawing to explain a manner in which wire is wound as a coil by a flyer machine.

Next, as illustrated in FIG. 18A, a flyer machine 200 (see FIG. 21) is employed to wind the coil wire 16U on each of the teeth sections 24U of the U-phase sub-assembly 242U from the radial direction outside, forming the U-phase stator configuration section 212U with plural of the winding portions 26U formed at the sub-assembly 242U. Note that the flyer machine 200, as illustrated in FIG. 21, includes a flyer 201 that winds the coil wires 16 in a circular motion so as to circulate around the periphery of the teeth sections 24, a variable former 202 that straightens alignment of the coil wires 16 wound on the teeth sections 24, and a drive circuit 203 that controls the other members.

Similarly, as illustrated in FIG. 18B, the V-phase stator configuration section 212V is formed with plural of the winding portions 26V formed on the V-phase sub-assembly 242V. As illustrated in FIG. 18C, the W-phase stator configuration section 212W is also formed with plural of the winding portions 26W formed on the W-phase sub-assembly 242W.

When the above is performed, similarly to in the first exemplary embodiment, plural crossing wires 28U are laid out along the outer peripheral face of the connection portion 34U. The plural crossing wires 28U are also retained from the second axial direction side (arrow Z2 side) of the connection portion 34U by the projection shaped retaining portions 36U. Similarly, plural crossing wires 28V are laid out along the outer peripheral face of the connection portion 34V. The plural crossing wires 28V are also retained from the first axial direction side (the arrow Z1 side) of the connection portion 34V by the projection shaped retaining portions 36V. Moreover, plural crossing wires 28W are laid out along the outer peripheral face of the connection portion 34W. The plural crossing wires 28W are also retained from the first axial direction side (the arrow Z1 side) of the connection portion 34W by the projection shaped retaining portions 36W.

Moreover, as illustrated in FIG. 18A, the terminal portions 30U at the two ends of the coil wire 16U are led out from the teeth sections 24U to the first axial direction side (the arrow Z1 side) of the stator 210. Similarly, as illustrated in FIG. 18B, the terminal portions 30V at the two ends of the coil wire 16V are led out from the teeth sections 24V towards the first axial direction side of the stator 210. Moreover, as illustrated in FIG. 18C, the terminal portions 30W at the two ends of the coil wire 16W are lead out from the teeth sections 24W towards the first axial direction side of the stator 210. The stator configuration sections 212U, 212V, 212W are thus formed for each of the U-phase, the V-phase and the W-phase (the stator configuration section forming process).

Figure 19A:
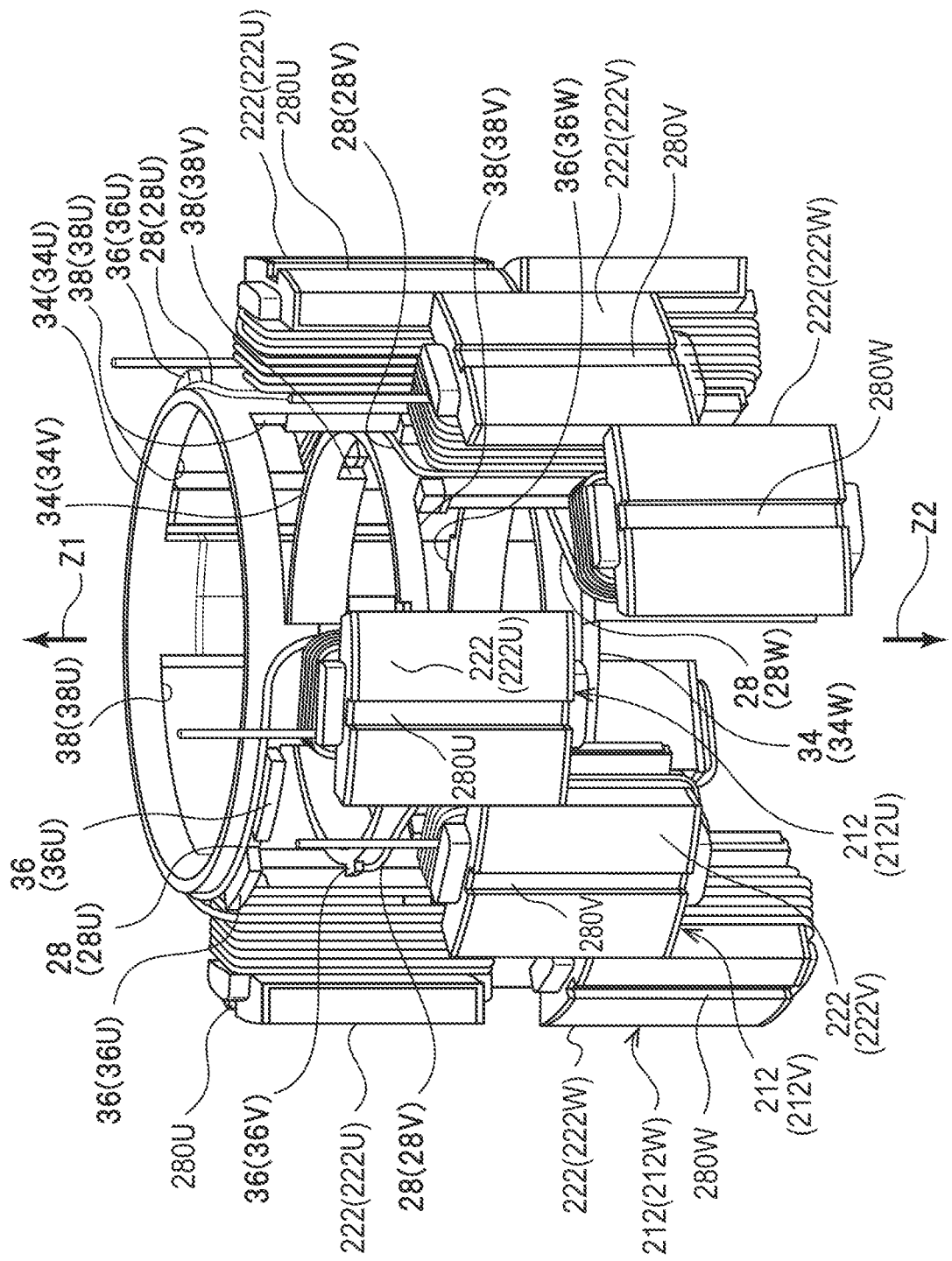
FIG. 19A is a perspective view illustrating a process in which the plural stator configuration sections illustrated in FIG. 17 are being assembled together.
Figure 19B:
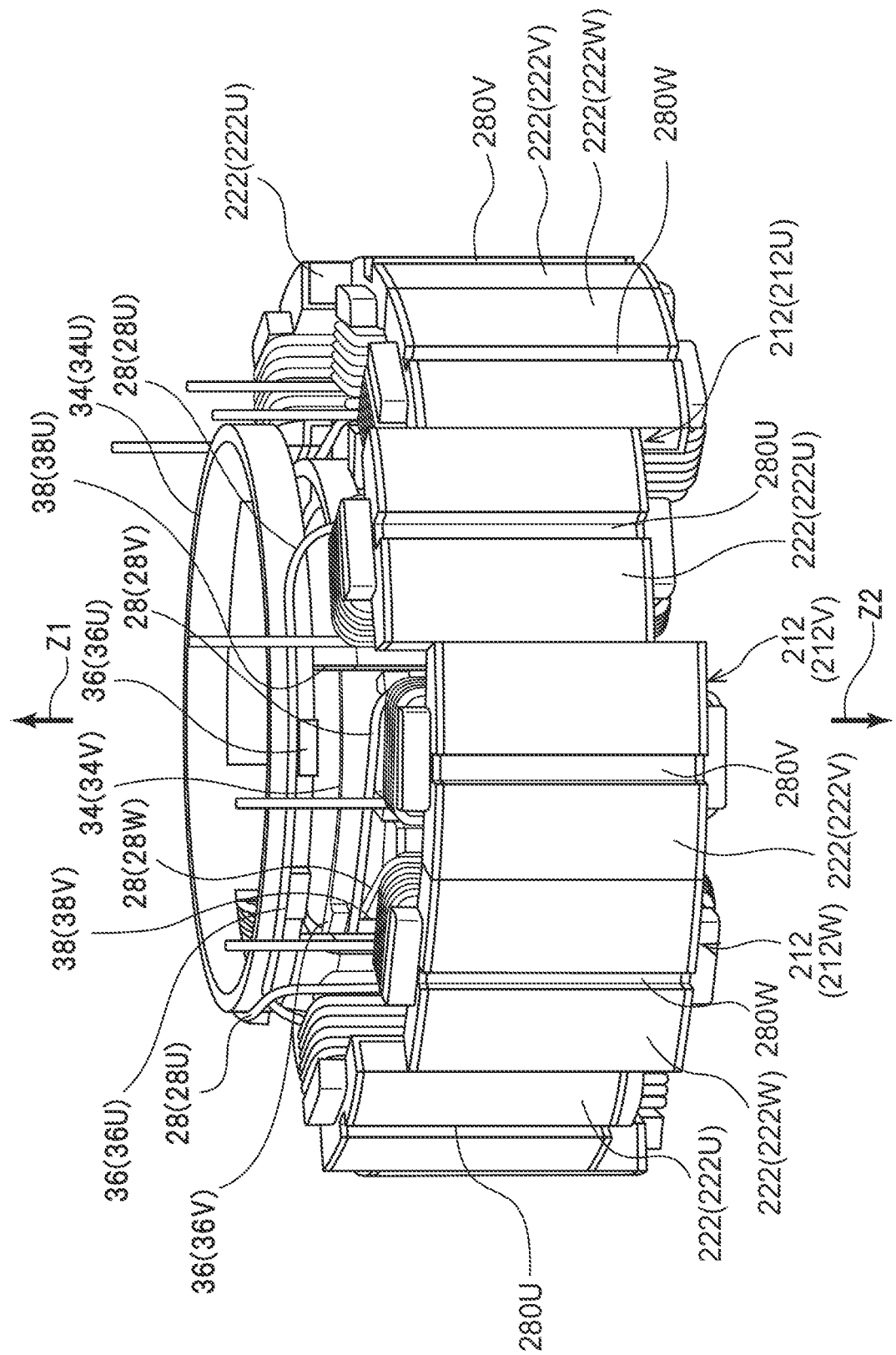
FIG. 19B is a perspective view illustrating a state in which assembly has progressed further than in FIG. 19A.
Figure 19C:
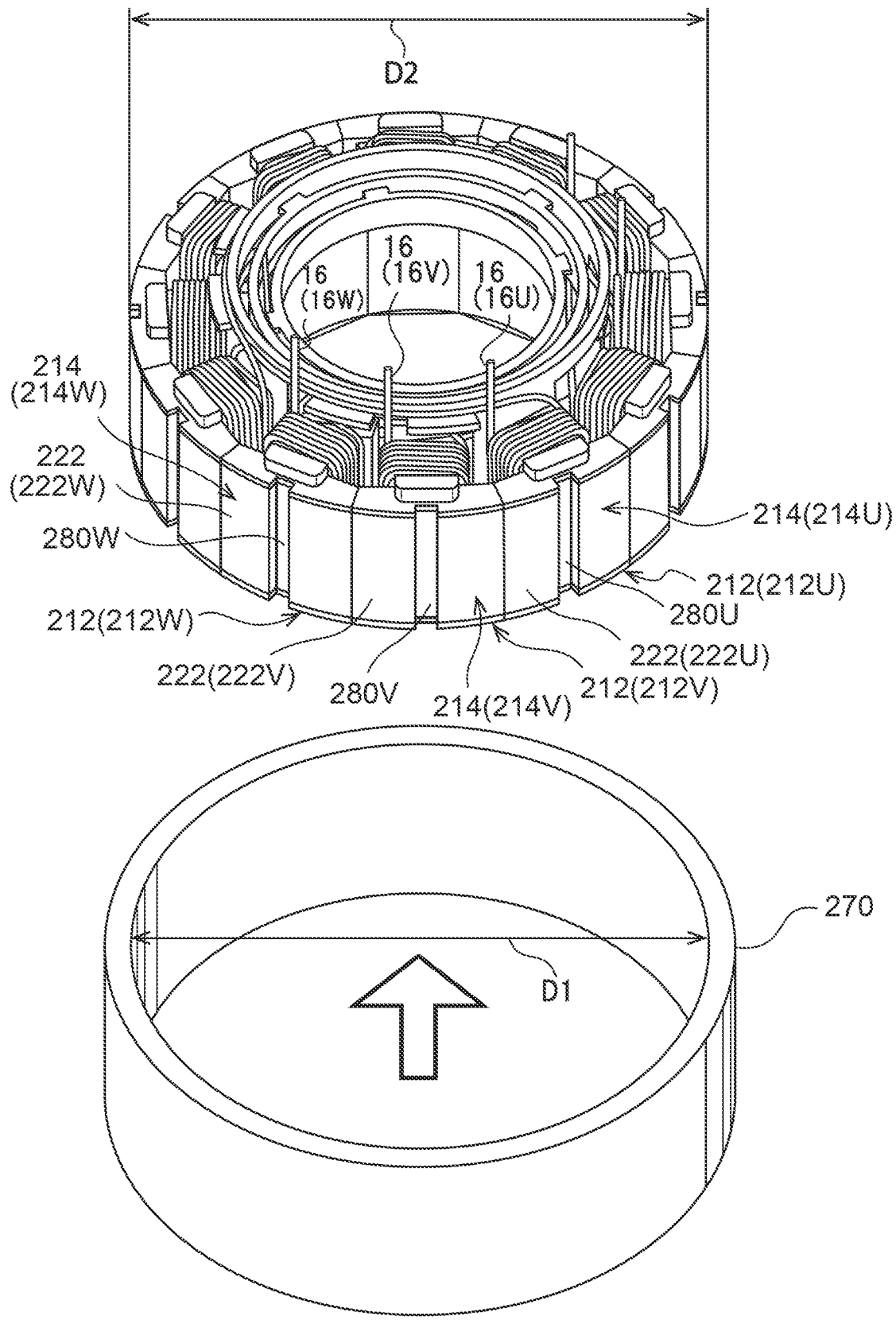
FIG. 19C is a perspective view illustrating a process in which a stator case is disposed at the outer peripheral side of ring shape-arrayed core configuration sections.

Then, as illustrated in FIG. 19A and FIG. 19B, similarly to in the first exemplary embodiment, the V-phase stator configuration section 212V is assembled to the W-phase stator configuration section 212W from the first axial direction side (the arrow Z1 side). Then, the U-phase stator configuration section 212U is assembled to the V-phase stator configuration section 212V and the W-phase stator configuration section 212W from the first axial direction side (the arrow Z1 side).

When the above is performed, the plural core configuration sections 214U, 214V, 214W are disposed in a ring shape, and, as illustrated in FIG. 24, each of the plural yoke configuration sections 222U, 222V, 222W is fitted between a pair of yoke configuration sections respectively adjacent on both sides, such that the inner peripheral portions of the plural yoke configuration sections 222U, 222V, 222W are in contact with the inner peripheral portions of the adjacent yoke configuration sections on both sides (core array process).

Moreover, as illustrated in FIG. 19A and FIG. 19B, the plural connection portions 34U, 34V, 34W are retained in a state separated from each other in the radial direction by the projection shaped retaining portions 36U, 36V, 36W.

Moreover, when the above is performed, the V-phase crossing wires 28V pass through inside the notches 38U formed at the U-phase connection portion 34U, and the W-phase crossing wires 28W pass through inside the notches 38U formed at the U-phase connection portion 34U and inside the notches 38V formed at the V-phase connection portion 34V.

Figure 22:
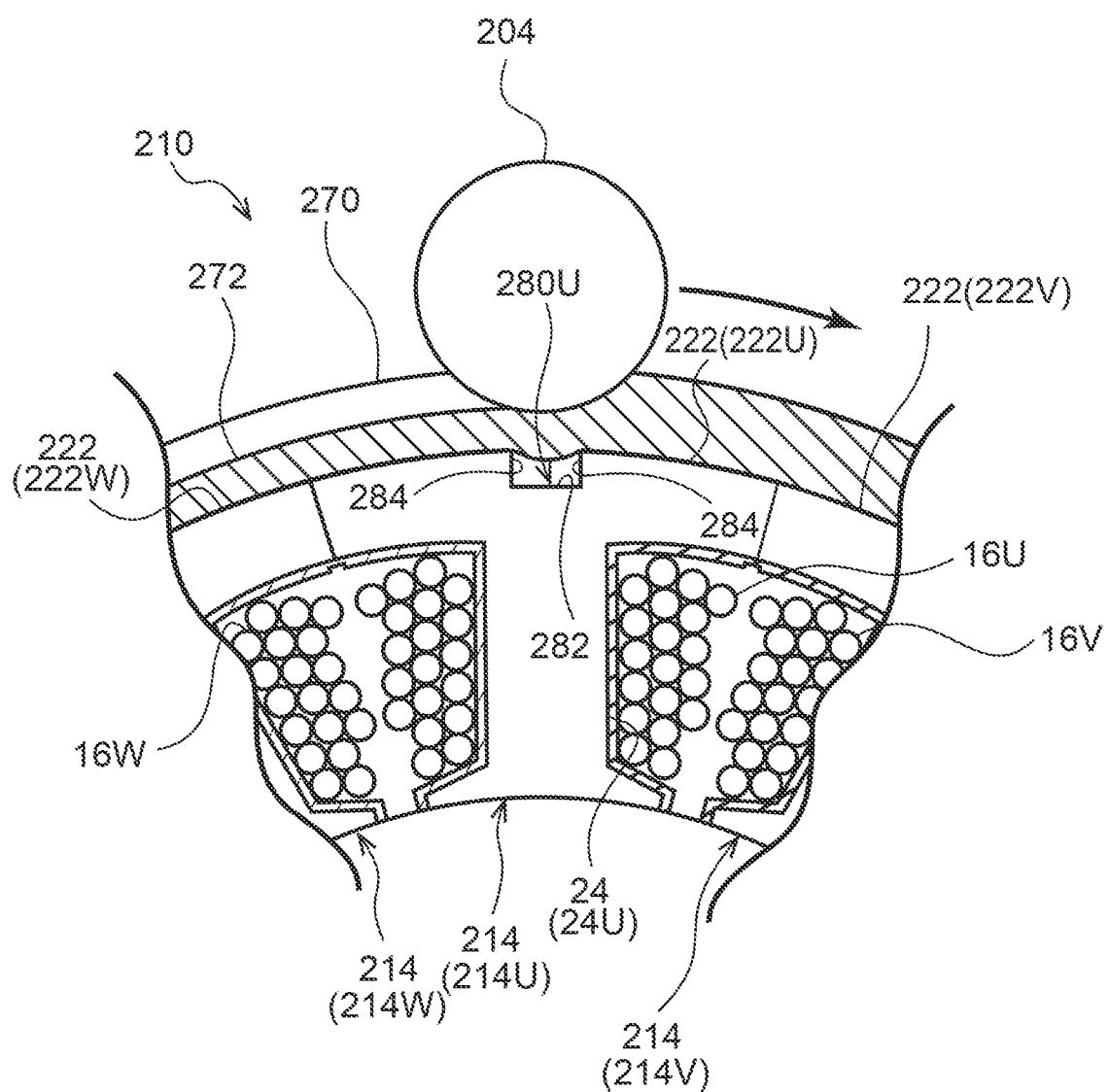
FIG. 22 is a horizontal cross-section illustrating a process in which a plastic deformable groove is being formed in an outer peripheral face of a stator case.

Moreover, as illustrated in FIG. 19C, the stator case 270 is disposed along the outer peripheral portions of the plural core configuration sections 214U, 214V, 214W that are arrayed in a ring shape. Then, as illustrated in FIG. 22, a roller body 204 with a larger outer diameter than the width W (groove width) in the circumferential direction of the indentation portions 280U, 280V, 280W is placed in contact with the stator case 270 by a press, and a plastic deformation groove 272 is formed. The plastic deformation groove 272 is formed by pressing the roller body 204 against the outer peripheral face of the stator case 270 with a specific pressure and rolling the roller body 204 along the circumferential direction of the stator case 270. The plastic deformation groove 272 is formed such that the depth of the plastic deformation groove 272 gradually deepens as the roller body 204 is rolled plural rotations (plural times) around the circumferential direction of the stator case 270. Moreover, the internal diameter of the stator case 270 at the location formed with the plastic deformation groove 272 is decreased by forming the plastic deformation groove 272. As a result, the stator case 270 and the plural core configuration sections 214U, 214V, 214W arrayed in a ring shape are integrated together (the plural core configuration sections 214U, 214V, 214W are retained by the stator case 270) (crimping process).

The stator 210 is configured through the above processes. Note that the terminal portions 30U, 30V, 30W are connected together by a buzz bar, not illustrated in the drawings.

Operation and Advantageous Effects of the Present Exemplary Embodiment

Explanation follows regarding operation and advantageous effect of the present exemplary embodiment.

As illustrated in FIG. 17, in the stator 210 of the present exemplary embodiment, due to integrally forming the stator case 270 along the circumferential direction, a magnetic transmission path is secured through the stator case 270 without needing to check there is contact between each of the yoke configuration sections 222U, 222V, 222W of the ring shape-arrayed core configuration sections 214U, 214V, 214W. Moreover, due to the yoke 240 being configured in a segmented structure with the core configuration sections 214U, 214V, 214W that are arrayed in a ring shape, the coil wires 16 can be easily wound on the teeth sections 24U, 24V, 24W without employing technology such as a nozzle apparatus. As explained above, in the present embodiment, a stator 210 can be obtained in which the coil wires 16 are easily wound whilst still securing the desired magnetic flux path.

Moreover, in the present exemplary embodiment, the indentation portions 280U, 280V, 280W are formed at the yoke configuration sections 222U, 222V, 222W of the core configuration sections 214U, 214V, 214W. Thus when pressure is applied towards the inside of the core configuration sections 214U, 214V, 214W by forming the plastic deformation groove 272 at the stator case 270, the core configuration sections 214U, 214V, 214W move towards the axial center, and make contact with each of the respective adjacent yoke configuration sections 222U, 222V, 222W. As a result, as illustrated in FIG. 23, a reaction force acts on the yoke configuration sections 222U, 222V, 222W to compress the yoke configuration sections 222U, 222V, 222W in the circumferential direction thereof. Thus the width of the indentation portions 280U, 280V, 280W is made narrower by this reaction force. In other words, by making the width of the indentation portions 280U, 280V, 280W narrower, unpredictable deformation of the yoke configuration sections 222U, 222V, 222W is suppressed, and the contact state between the yoke configuration sections 222U, 222V, 222W is maintained. As a result, the present exemplary embodiment is able to secure the magnetic flux path well.

Moreover, in the present exemplary embodiment, the indentation portions 280U, 280V, 280W are formed with the side walls 284 mentioned above. It is accordingly easier to leave a space between the stator case 270 and the bottom face 282 of the indentation portions 280U, 280V, 280W even though the plastic deformation groove 272 is formed at the stator case 270. As a result, due to the width of the indentation portions 280U, 280V, 280W narrowing, unpredictable deformation of the yoke configuration sections 222U, 222V, 222W can be suppressed further, and the contact state between each of the yoke configuration sections 222U, 222V, 222W is maintained with more certainty. As a result, in the present exemplary embodiment, the magnetic flux path can be secured with even more certainty.

As illustrated in FIG. 23, in the present exemplary embodiment, the widths of the indentation portions 280U, 280V, 280W are set smaller than the wall thickness of the stator case 270 prior to forming the plastic deformation groove 272. Consequently, space can be more certainly left between the stator case 270 and the bottom faces 282 of the indentation portions 280U, 280V, 280W even when the plastic deformation groove 272 is formed at the stator case 270. As a result, due to the widths of the indentation portions 280U, 280V, 280W narrowing, unpredictable deformation of the yoke configuration sections 222U, 222V, 222W is further suppressed from occurring, and the contact state between the yoke configuration sections 222U, 222V, 222W can be more certainly maintained. The present exemplary embodiment is as a result capable of more certainly securing the magnetic flux path.

Moreover, in the present exemplary embodiment, the indentation portions 280U, 280V, 280W are provided at locations facing towards the teeth sections 24U, 24V, 24W. Magnetic flux is accordingly transmitted from the teeth sections 24U, 24V, 24W to the yoke configuration sections 222U, 222V, 222W through the locations where the indentation portions 280U, 280V, 280W are formed. Namely, in the present exemplary embodiment, the magnetic flux can be transmitted to the yoke configuration sections 222U, 222V, 222W while making the influence of the indentation portions 280U, 280V, 280W as small as possible.

Moreover, in the present exemplary embodiment, as illustrated in FIG. 24, the angle θ1 formed between one end and the other end in the circumferential direction of the outer peripheral portion of the yoke configuration sections 222U, 222V, 222W is set at a more acute angle than the angle θ2 made between one end and the other end in the circumferential direction of the inner peripheral portion of the yoke configuration sections 222U, 222V, 222W. The inner peripheral portions of the yoke configuration sections 222U, 222V, 222W are accordingly in contact with each other in the ring shaped array of the core configuration sections 214U, 214V, 214W. When the plastic deformation groove 272 is being formed on the stator case 270 (see FIG. 25), contact between adjacent yoke configuration sections 222U, 222V, 222W is made at a location that gradually progresses from the inner peripheral portions of the yoke configuration sections to the outer peripheral portions thereof. Namely, in the present exemplary embodiment, the contact state between the adjacent yoke configuration sections 222U, 222V, 222W can be stabilized, and hence the magnetic flux path can be secured even more certainly.

Moreover, the angle θ1 and the angle θ2 are set at a smaller acute angle (about 30° or less in the present exemplary embodiment) than the angle θ3 (360°/the number of teeth (12 in the present exemplary embodiment)). Thus when forming the plastic deformation groove 272 on the stator case 270, abrupt contact of a location between the inner peripheral portion and the outer peripheral portion of the yoke configuration sections 222U, 222V, 222W is suppressed. In other words, contact is made at a position that more gradually progresses from the inner peripheral portion towards the outer peripheral portion of the yoke configuration sections 222U, 222V, 222W. As a result, the contact state between the adjacent yoke configuration sections 222U, 222V, 222W can be further stabilized, and hence the magnetic flux path can be secured more certainly.

Moreover, in the present exemplary embodiment, as illustrated in FIG. 22, the plastic deformation groove 272 is formed at the stator case 270 by rolling the roller body 204 plural rotations (plural times) around the circumferential direction of the stator case 270. Namely, due to the depth of the plastic deformation groove 272 gradually getting deeper by the roller body 204 being rolled plural rotations (plural times) around the circumferential direction of the stator case 270, a stable plastic deformation groove 272 can be obtained. As a result, in the present exemplary embodiment, the contact state between the stator case 270 and the yoke configuration sections 222U, 222V, 222W of the core configuration sections 214U, 214V, 214W can be stabilized, and hence the desired magnetic flux path can be secured.

Moreover, the plastic deformation groove 272 is formed by contacting the roller body 204 with a larger outer diameter than the circumferential direction width W of the indentation portions 280U, 280V, 280W against the stator case 270. Space is accordingly more certainly left remaining between the stator case 270 and the indentation portions 280U, 280V, 280W after the plastic deformation groove 272 has been formed. As a result, due to the width of the indentation portions 280U, 280V, 280W becoming narrower, unpredictable deformation of the yoke configuration sections 222U, 222V, 222W is suppressed from occurring, and the contact state between the yoke configuration sections 222U, 222V, 222W is maintained. Thus, the present exemplary embodiment is able to secure the magnetic flux path even more certainly.

Note that, although explanation has been given in the present exemplary embodiment in which the plastic deformation groove 272 is formed by contacting the roller body 204 with larger outer diameter than the circumferential direction width W of the indentation portions 280U, 280V, 280W against the stator case 270, the present invention is not limited thereto. For example, the plastic deformation groove 272 may be formed using a roller body with an outer diameter smaller than the circumferential direction width W by adjusting the processing force for pressing against the outer peripheral face of the stator case 270.

Moreover, in the present exemplary embodiment, the plastic deformation groove 272 is formed to the stator case 270 by rolling the roller body 204 plural rotations (plural times) around the circumferential direction of the stator case 270, the present invention is not limited thereto. For example, the plastic deformation groove 272 may be formed by rolling the roller body 204 around the circumferential direction of the stator case 270 a single rotation.

Moreover, in the present exemplary embodiment, the angle θ1 in the circumferential direction between one end and the other end of the outer peripheral portion of the yoke configuration sections 222U, 222V, 222W and the angle θ2 between one end and the other end of the inner peripheral portion of the yoke configuration sections 222U, 222V, 222W are set at smaller acute angles (about 30° or less in the present exemplary embodiment) than 360°/the number of teeth (twelve in the present exemplary embodiment), the present invention is not limited thereto. The angle θ1 and the angle θ2 may be set as appropriate in consideration of the characteristics of the desired stator.

Moreover, in the present exemplary embodiment, the angle θ1 is set at more acute angle than the angle θ2, the present invention is not limited thereto. For example, the angle θ1 and the angle θ2 f may be set substantially equal to each other.

Moreover, in the present exemplary embodiment, the width of the indentation portions 280U, 280V, 280W is set smaller than the wall thickness of the stator case 270 prior to forming the plastic deformation groove 272, the present invention is not limited thereto. For example, configuration may be made in which the width of the indentation portions 280U, 280V, 280W is set larger than the wall thickness of the stator case 270 prior to forming the plastic deformation groove 272. In cases of such a configuration, an excess amount is prepared for the indentation portions 280U, 280V, 280W to get narrower when there is unpredictable deformation of the yoke configuration sections 222U, 222V, 222W, and the contact state between the yoke configuration sections 222U, 222V, 222W is maintained. As a result it is possible to secure the magnetic flux path even more certainly.

Explanation next follows regarding modified examples of the second exemplary embodiment as described above, with reference to FIG. 26, FIG. 27A and FIG. 27B. Note that similar members to the members of the second exemplary embodiment are allocated the same reference numerals thereto and further explanation is omitted.

Figure 27A:
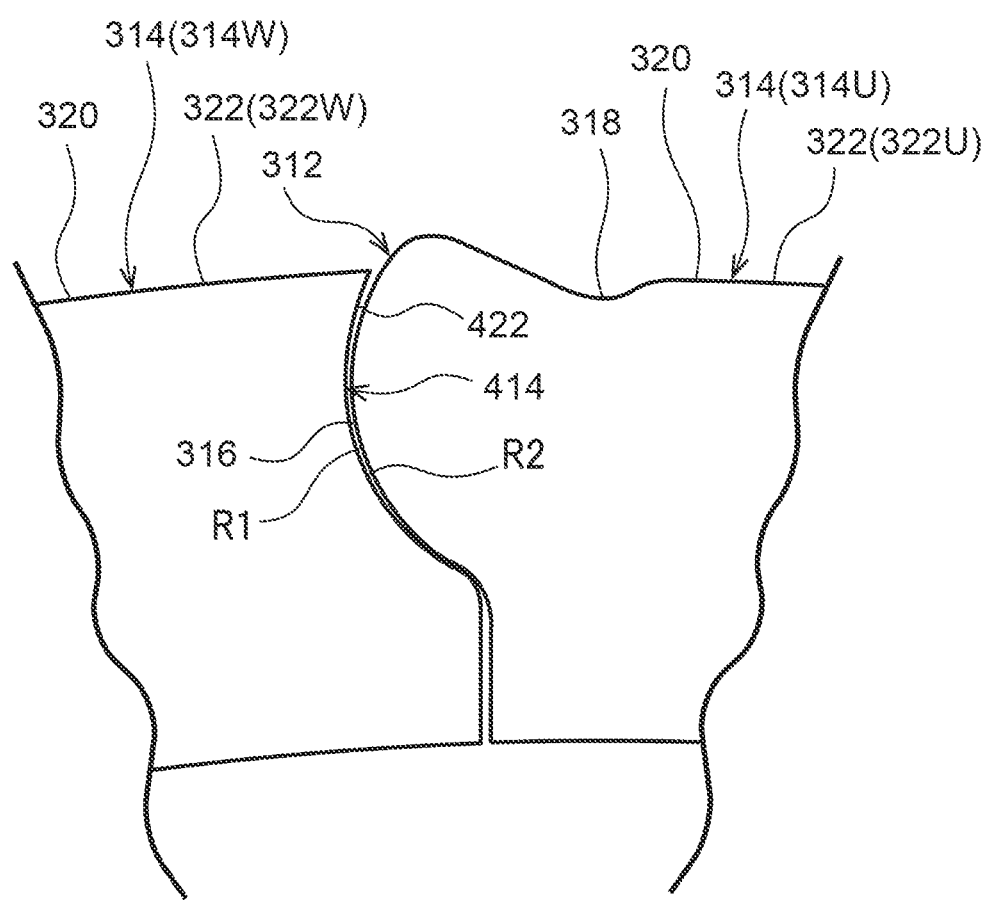
FIG. 27A is an enlarged plan view illustrating ring shape-arrayed core configuration sections according to the modified exemplary example.

As illustrated in FIG. 27B, a stator 310 according to the present modified example has a protruding portion 312 with a protrusion shaped curved face 316 formed at one end in a circumferential direction of yoke configuration sections 322, and with an indented portion 414 with an indentation shaped curved face 122 formed at the other end in the circumferential direction of yoke configuration sections 322. Specifically, as illustrated in FIG. 27A, the protruding portion 312 is formed at a location at one end side of the yoke configuration section 322 and outside in a radial direction of the yoke configuration section 322. The protruding portion 312 also projects out towards the other end side of the adjacent yoke configuration section 322, and a leading end side in a projection direction of the protruding portion 312 is configured by the curved face 316 with a radius of curvature R1. Moreover, a dip portion 318 is also formed dipping in toward inside in the radial direction of the yoke configuration section 322 at a location at a base end side of the protruding portion 312 and outside in the radial direction of the yoke configuration section 322. Moreover, a location of the leading end side of the protruding portion 312 and of the radial direction outside of the yoke configuration section 322 is positioned further to the radial direction outside than an outer peripheral face 320 of the yoke configuration section 322.

Moreover, the indented portion 414 is formed at a location on the other end side of the yoke configuration section 322 and at the radial direction outside of the yoke configuration section 322. Specifically, the indented portion 414 is open toward the other end side of the yoke configuration section 322, and the indented portion 414 is formed with the curved face 422 of radius of curvature R2 that is substantially the same as the radius of curvature R1 of the curved face 316 of the protruding portion 312.

Figure 26:
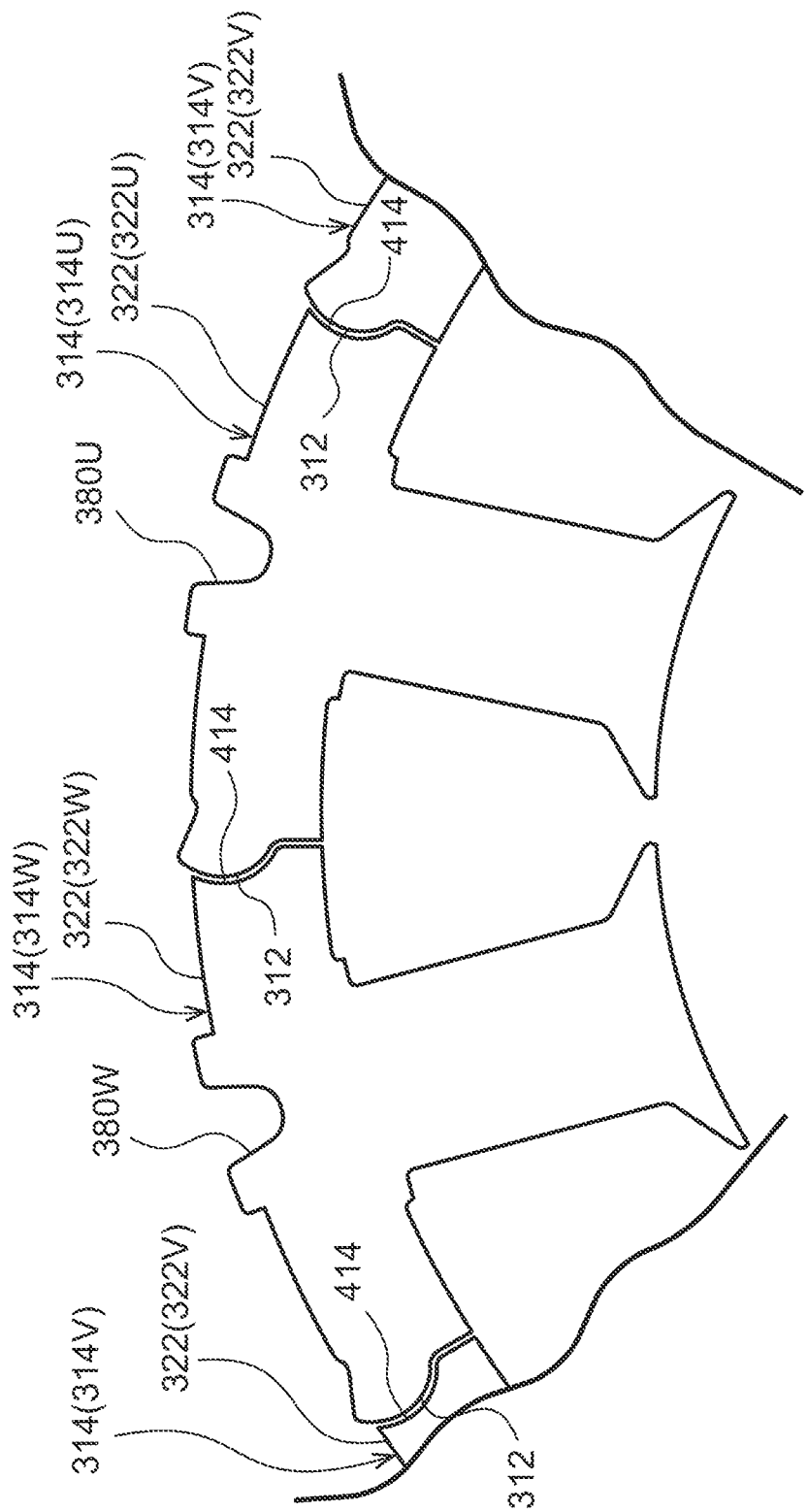
FIG. 26 is a plan view illustrating ring shape-arrayed core configuration sections according to a modified exemplary example.

As illustrated in FIG. 26, plural core configuration sections 314U, 314V, 314W that are each equipped with the protruding portion 312 and the indented portion 414 are arrayed in a ring shape, and a stator case 270 (see for example FIG. 17) is disposed along an outer peripheral portion of the plural ring shape-arrayed core configuration sections 314U, 314V, 314W. Then a plastic deformation groove 272 is formed to the stator case 270 (see for example FIG. 17). As a result, the internal diameter of the stator case 270 is reduced at the location where the plastic deformation groove 272 is formed, and the inner peripheral face of the stator case 270 presses locations of the leading end side of the protruding portions 312 and of the radial direction outside of the yoke configuration sections 322. Then, as illustrated in FIG. 27B, adjacent protruding portions 312 and indented portions 414 are made to contact each other by reducing the diameter at the locations of the leading end side of the protruding portions 312 and of the radial direction outside of the yoke configuration sections 322, thereby integrating together the stator case 270 and the plural ring shape-arrayed core configuration sections 314U, 314V, 314W.

In the stator 310 according to the present modified example as described above, the adjacent protruding portions 312 and indented portions 414 of the yoke configuration sections 322 are placed in contact with each other by forming the plastic deformation groove 272 at the outer peripheral face of the stator case 270. A localized contact state between adjacent yoke configuration sections 322 is accordingly suppressed compared to cases in which the protruding portions 312 and the indented portions 414 of the configuration described above are not formed at the yoke configuration sections 322 (a contact surface area is increased by the contact between the curved faces 316, 422). As a result, the contact state between the adjacent yoke configuration sections 322 is stabilized in the present modified example, enabling a magnetic flux path to be secured with more certainty. Moreover, the circularity of the stator 310 is improved by stabilizing the contact state between adjacent yoke configuration sections 322.

Note that, in the present modified example, the radius of curvature R1 of the curved face 316 of the protruding portion 312 and the radius of curvature R2 of the curved face 422 of the indented portion 414 are substantially the same as each other, the present invention is not limited thereto. Namely, there may be difference in the radii of curvature of the two faces within a range in which the above advantageous effects are obtained. Moreover, as long there are portions that make contact with each other at curved faces of the adjacent yoke configuration sections 322, other portions may make contact with each other as flat planes.

Explanation has been given regarding a second exemplary embodiment of the present invention, however the present invention is not limited to the above, and obviously various other modifications are possible within a scope not departing from the spirit of the present invention.

Explanation next follows regarding a third exemplary embodiment of the present invention. Each portion of the stator 410 of the present exemplary embodiment is substantially the same as those of the stator 210 of the second exemplary embodiment. Regarding the manufacturing method, the sub-assembly forming process, the stator configuration section forming process, up to the core array process of the stator 410 are also similar to that of the first exemplary embodiment and the second exemplary embodiment and so further explanation thereof is omitted. In the manufacturing method of the stator 410, as illustrated in FIG. 19C and FIG. 28A, after disposing the stator case 270 along the outer peripheral portion of plural ring shape-arrayed core configuration sections 214U, 214V, 214W, a metal core 306 with an outer diameter corresponding to the internal diameter of ring shape-arrayed core configuration sections 214U, 214V, 214W (in the present exemplary embodiment the outer diameter of the metal core 306 that is substantially the same as the internal diameter of the core configuration sections 214U, 214V, 214W) is then inserted into the inner peripheral portion of the core configuration sections 214U, 214V, 214W (metal core setting process).

Figure 28B:
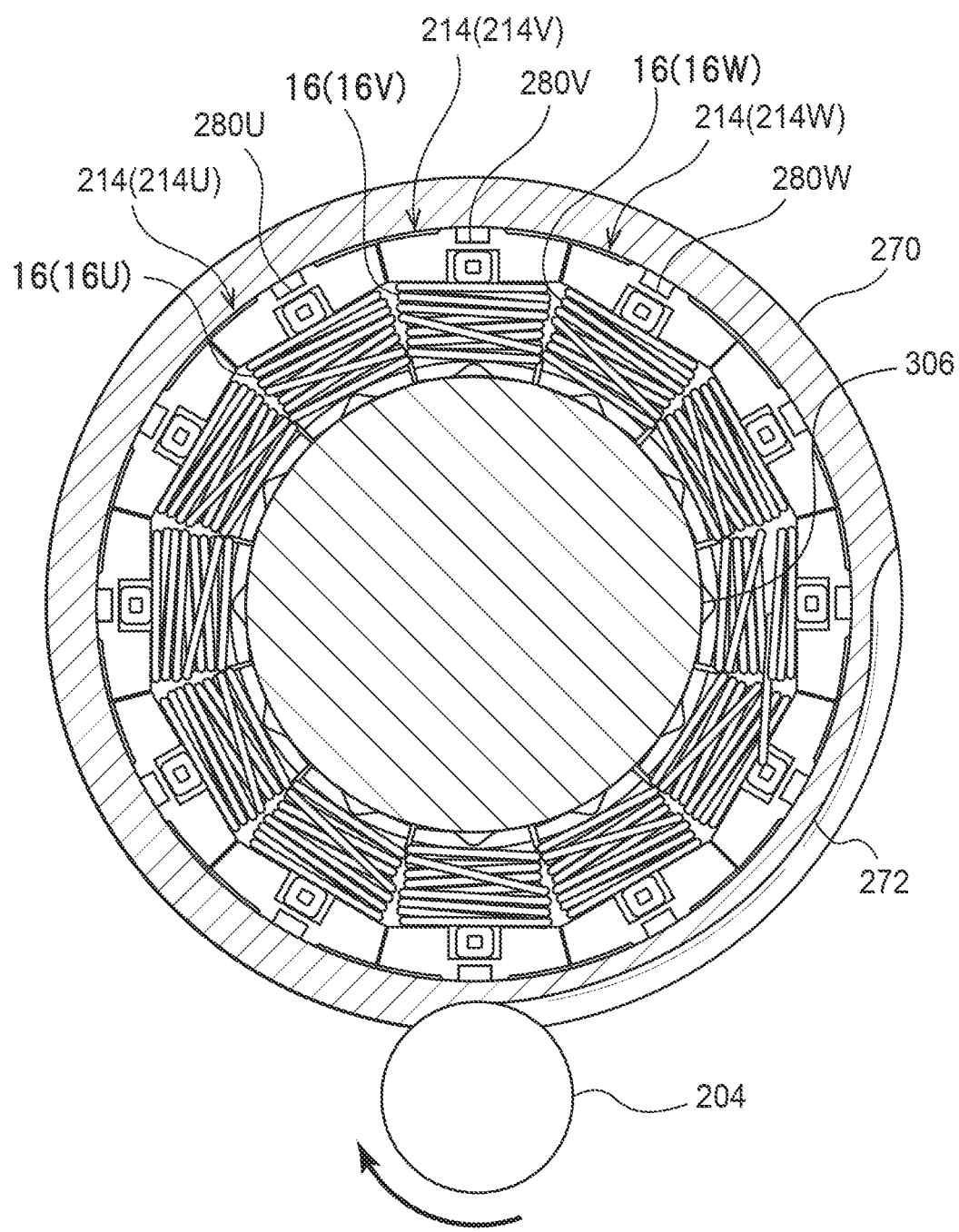
FIG. 28B is a horizontal cross-section illustrating a process of forming the plastic deformation groove on the outer peripheral face of the stator case.
Figure 28C:
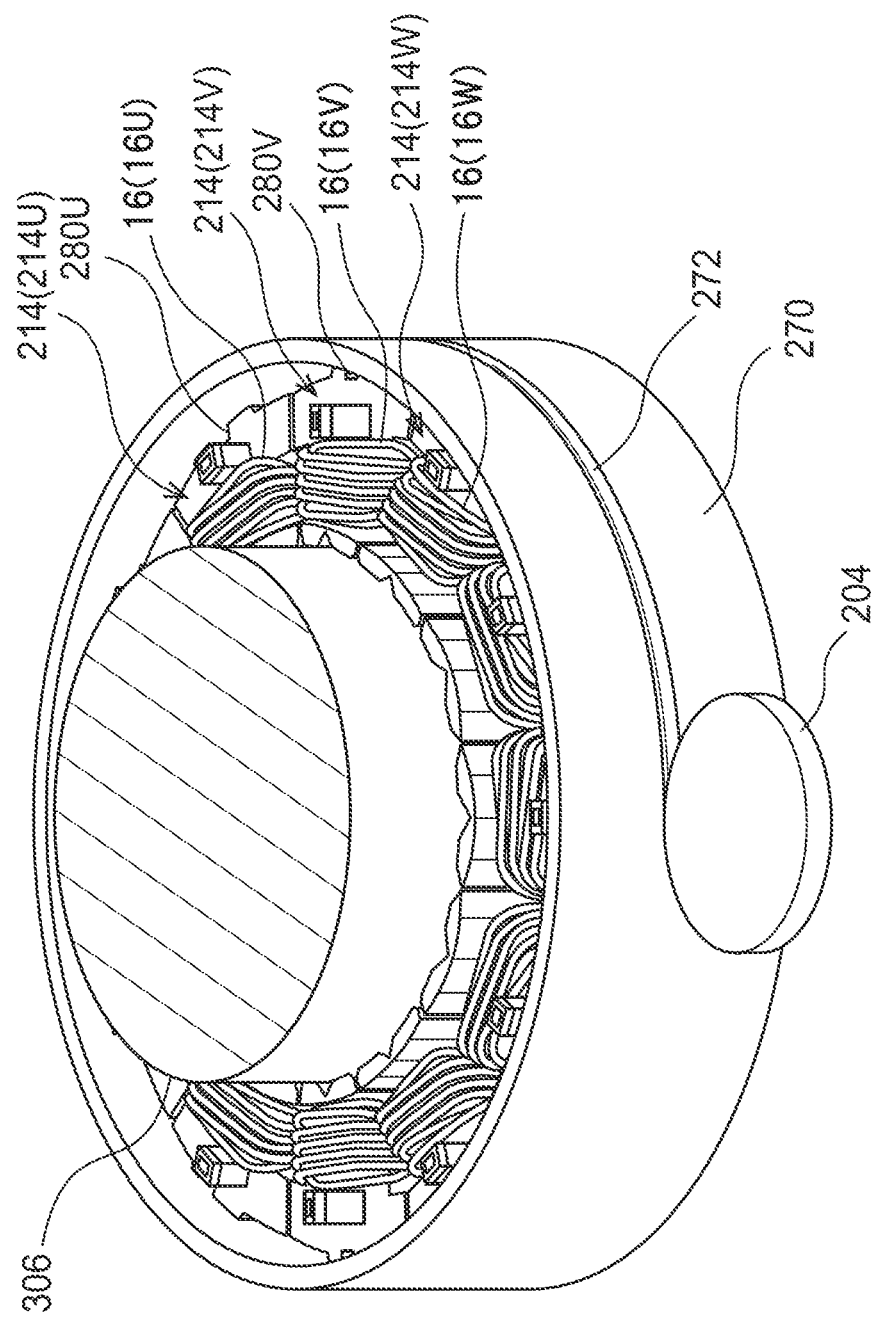
FIG. 28C is a perspective view illustrating a process of forming the plastic deformation groove on the outer peripheral face of the stator case.

Then, a roller body 204 is placed in contact with the stator case 270 using a press, and the plastic deformation groove 272 is formed. As illustrated in FIG. 28A, FIG. 28B and FIG. 28C, the outer diameter of the roller body 204 is larger than the circumferential direction width W (groove width) of indentation portions 80U, 80V, 80W formed in yoke configuration sections 22U, 22V, 22W of the core configuration sections 214U, 214V, 214W. The plastic deformation groove 272 is then formed by pressing the roller body 204 against the outer peripheral face of the stator case 270 with a specific pressure, and rolling the roller body 204 along the circumferential direction of the stator case 270. The plastic deformation groove 272 is formed by rolling the roller body 204 along the circumferential direction of the stator case 270 for plural rotations (plural times) such that the depth of the plastic deformation groove 272 gets gradually deeper. Moreover, by forming the plastic deformation groove 272 the internal diameter of the stator case 270 is reduced at locations where the plastic deformation groove 272 is formed. As a result, the stator case 270 and the plural ring shape-arrayed core configuration sections 214U, 214V, 214W are integrated together (the plural core configuration sections 214U, 214V, 214W are retained by the stator case 270) (crimping process).

Figure 28D:
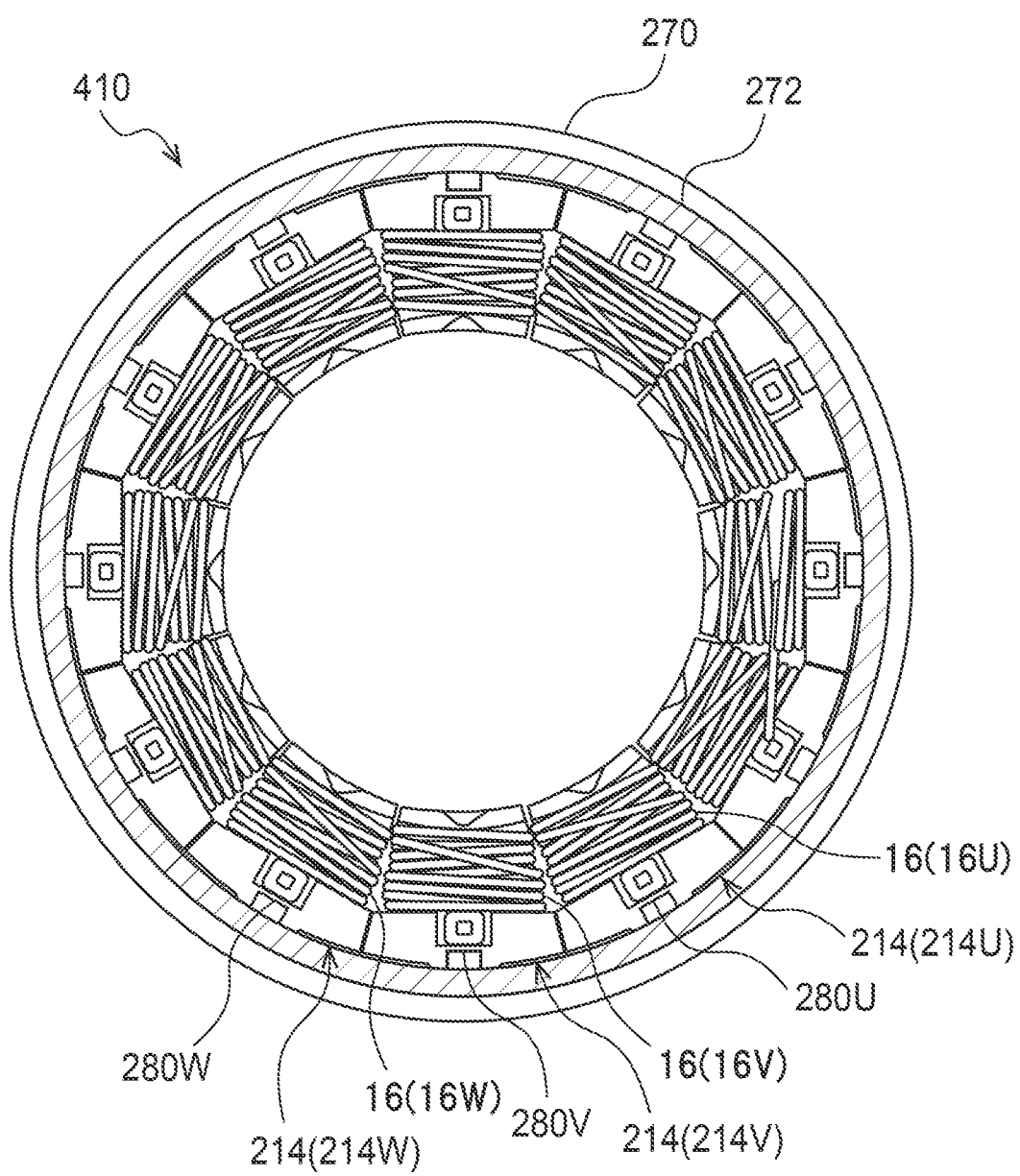
FIG. 28D is a horizontal cross-section illustrating a stator configured by removing the metal core from the inner peripheral portion of core configuration sections after forming plastic deformation groove on the outer peripheral face of the stator case.
Figure 28E:
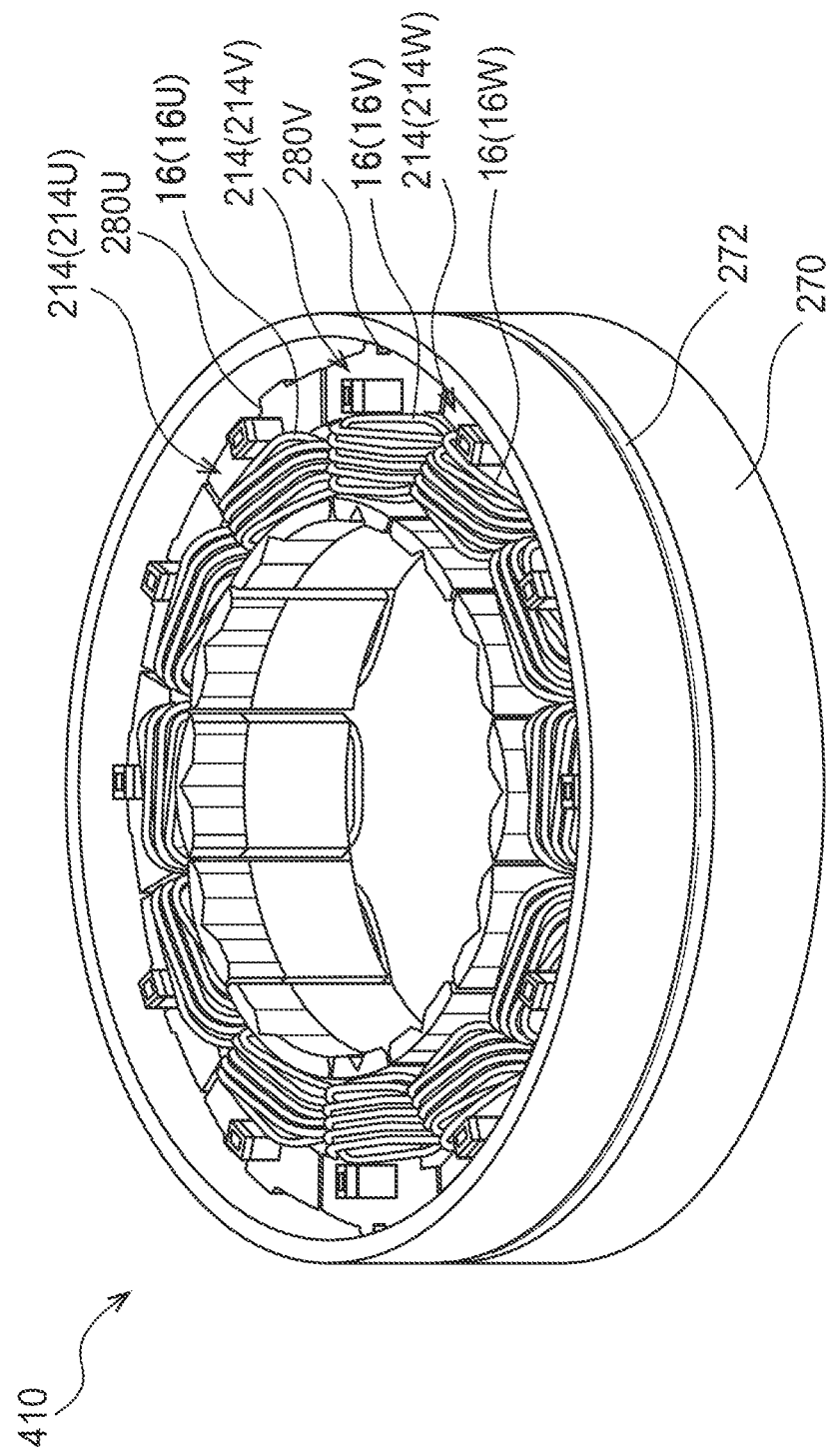
FIG. 28E is a perspective view illustrating a stator configured by removing a metal core from the inner peripheral portion of core configuration sections after forming the plastic deformation groove on the outer peripheral face of the stator case.

Next, as illustrated in FIG. 28D and FIG. 28E, the metal core 306 is removed from the inner peripheral portion of the core configuration sections 214U, 214V, 214W.

The stator 410 is configured through the above processes. Note that terminal portions 30U, 30V, 30W are connected together by for example a buzz bar, not illustrated in the drawings. The stator 410 is manufactured by the above technique.

Operation and Advantageous Effects of the Present Exemplary Embodiment

Explanation follows regarding operation and advantageous effects of the present exemplary embodiment.

As illustrated in FIG. 28A to FIG. 28E, in the present exemplary embodiment, after the metal core 306 is inserted into the inner peripheral portion of the core configuration sections 214U, 214V, 214W, the plastic deformation groove 272 is then formed at the outer peripheral face of the stator case 270. Thus even if the external force for forming the plastic deformation groove 272 is transmitted to the ring shape-arrayed core configuration sections 214U, 214V, 214W, the arraying of the ring shape-arrayed core configuration sections 214U, 214V, 214W is not dislodged. Namely, in the present exemplary embodiment the circularity of the ring shape-arrayed core configuration sections 214U, 214V, 214W can be improved.

Note that, although explanation has been given in the present exemplary embodiment in which the metal core 306 is inserted into the inner peripheral portion of the core configuration sections 214U, 214V, 214W after disposing the stator case 270 along the outer peripheral portion of the plural ring shape-arrayed core configuration sections 214U, 214V, 214W, the present invention is not limited thereto. For example, the stator case 270 may be disposed along the outer peripheral portion of the core configuration sections 214U, 214V, 214W after inserting the metal core 306 into the inner peripheral portion of the core configuration sections 214U, 214V, 214W.

Explanation next follows regarding another manufacturing method of the stator 410 configured as described above.

Figure 29A:
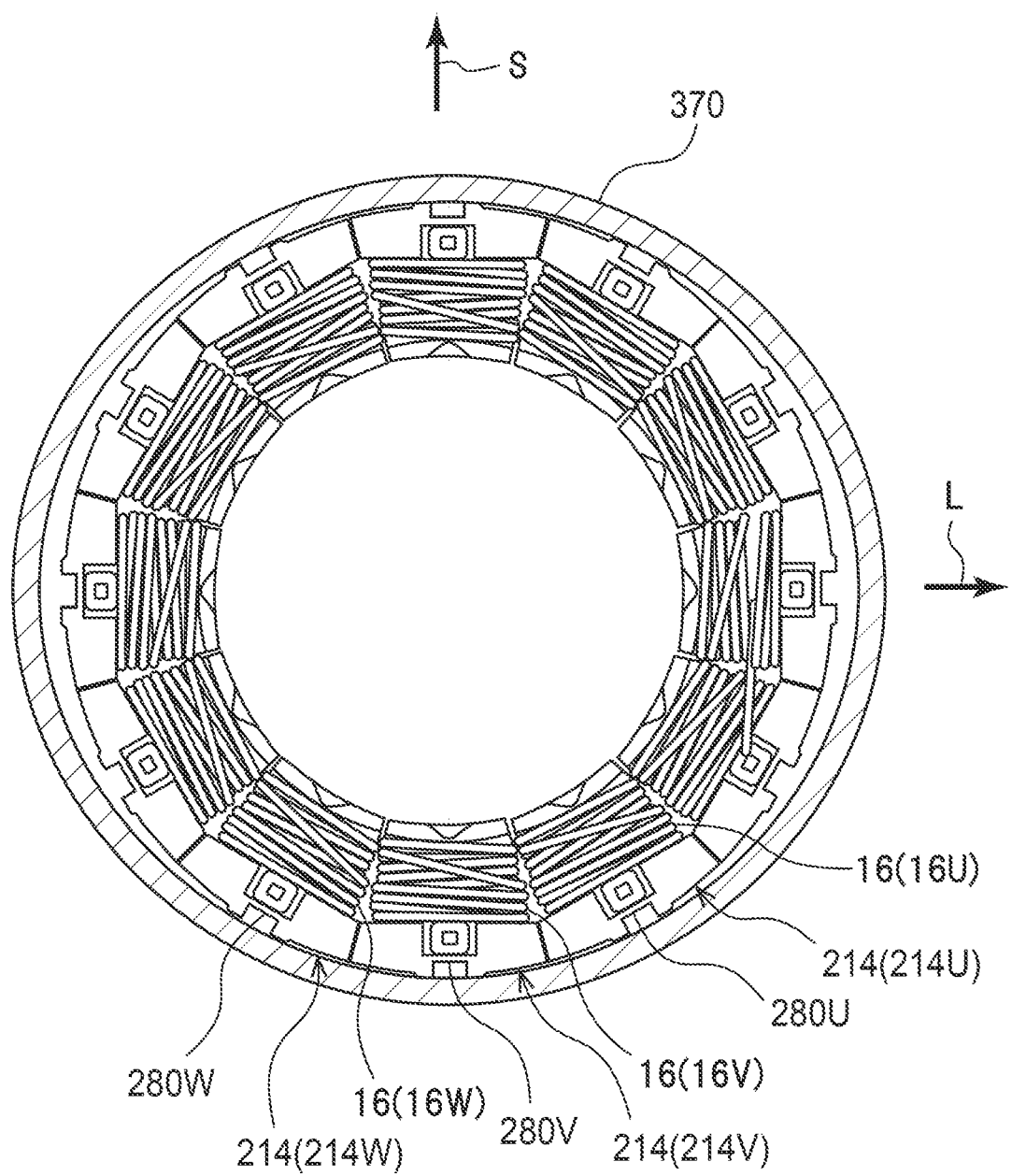
FIG. 29A is a horizontal cross-section illustrating a state in which a deformed stator case is disposed along outer peripheral portions of ring shape-arrayed core configuration sections.

In this manufacturing method, after completing the sub-assembly forming process, the stator configuration section forming process and the core array process, first distortion of a stator case 370 is measured through a case measurement process and then the stator case 370 is disposed along the outer peripheral portion of the plural ring shape-arrayed core configuration sections 214U, 214V, 214W, as illustrated in FIG. 29A. Note that the stator case 370 in the present exemplary embodiment has an internal diameter that is distorted into a substantially elliptical shape (with the long axis direction indicated by arrow L, and the short axis direction indicated by the arrow S). Note that, the distortion is exaggerated in FIG. 29A to FIG. 29C.

Figure 29B:
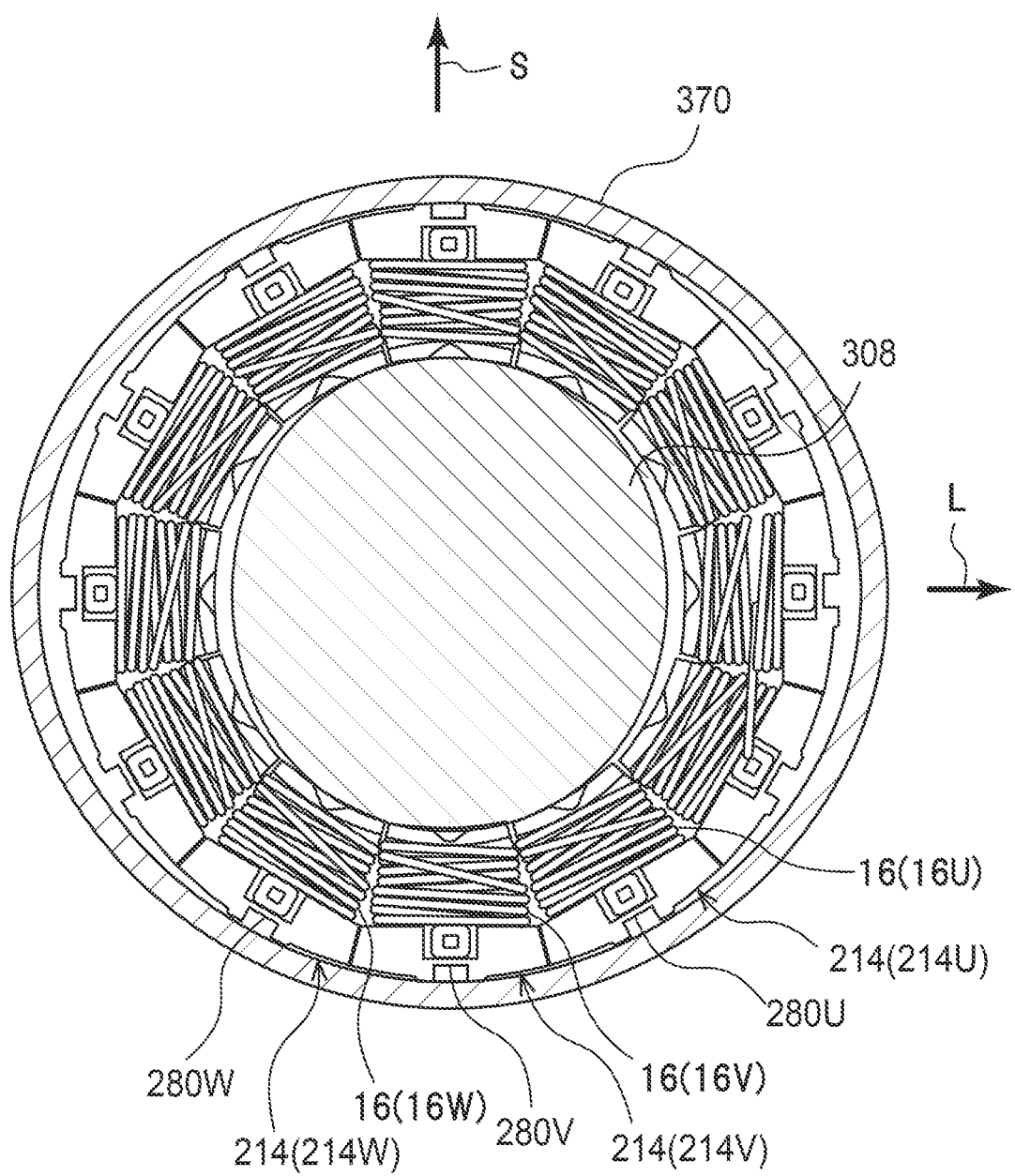
FIG. 29B is a horizontal cross-section illustrating a state in which a metal core is inserted into an inner peripheral portion of ring shape-arrayed core configuration sections.

Next, as illustrated in FIG. 29B, a metal core 308 is selected to correspond to the distortion of the stator case 370 that has been measured by the above case measurement process. The selected metal core 308 is then inserted into the inner peripheral portion of the ring shape-arrayed core configuration sections 214U, 214V, 214W (metal core selection and setting process). More specifically, the metal core 308 of substantially elliptical cross-section is inserted into the inner peripheral portion of the ring shape-arrayed core configuration sections 214U, 214V, 214W in an orientation with its short diameter direction oriented along a long diameter direction of the stator case 370 (the arrow L direction) and its long diameter direction oriented along a short diameter direction of the stator case 370 (the arrow S direction).

Figure 29C:
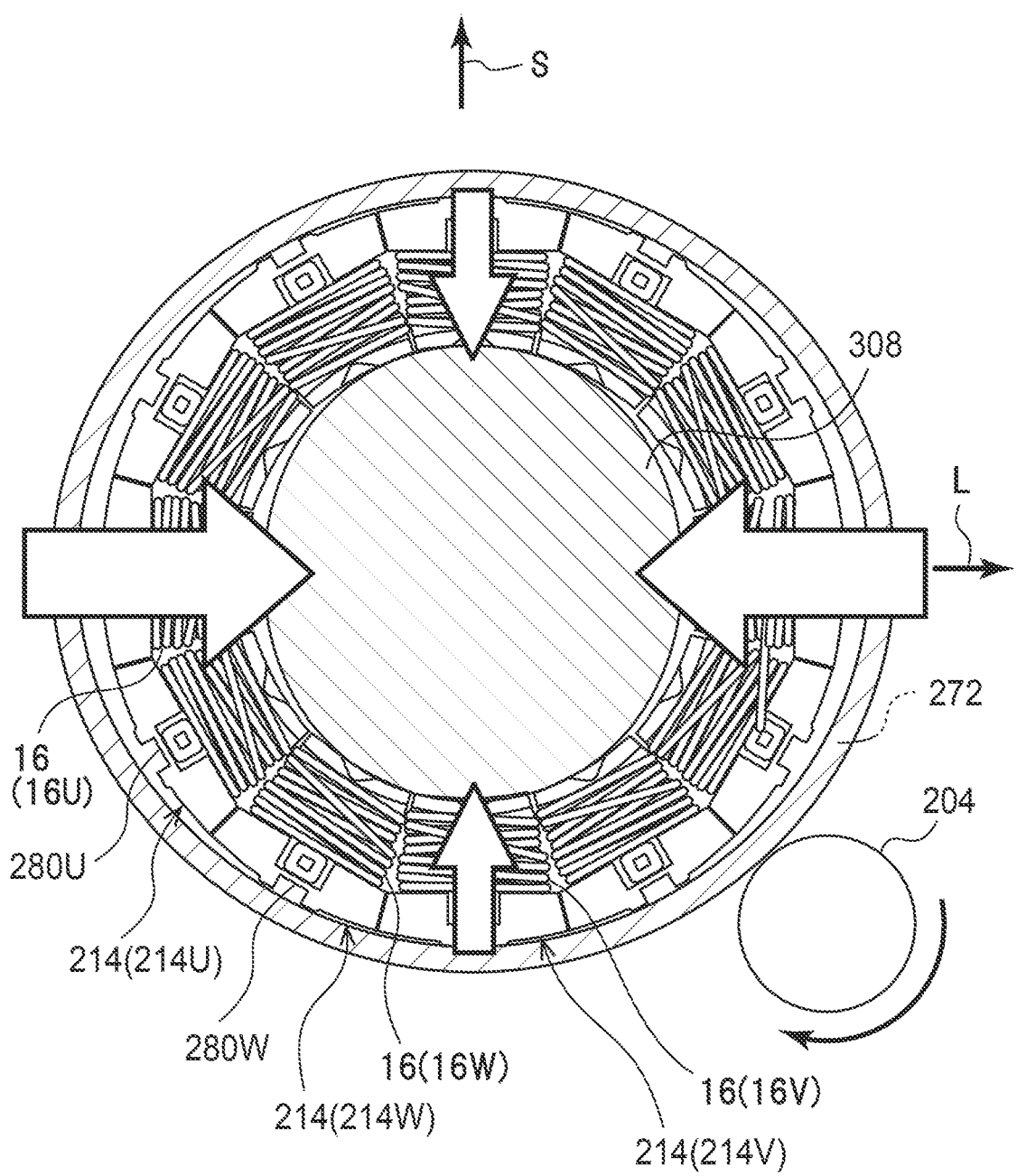
FIG. 29C is a horizontal cross-section illustrating a process in which a plastic deformation groove is formed at an outer peripheral face of the stator case.
Figure 29D:
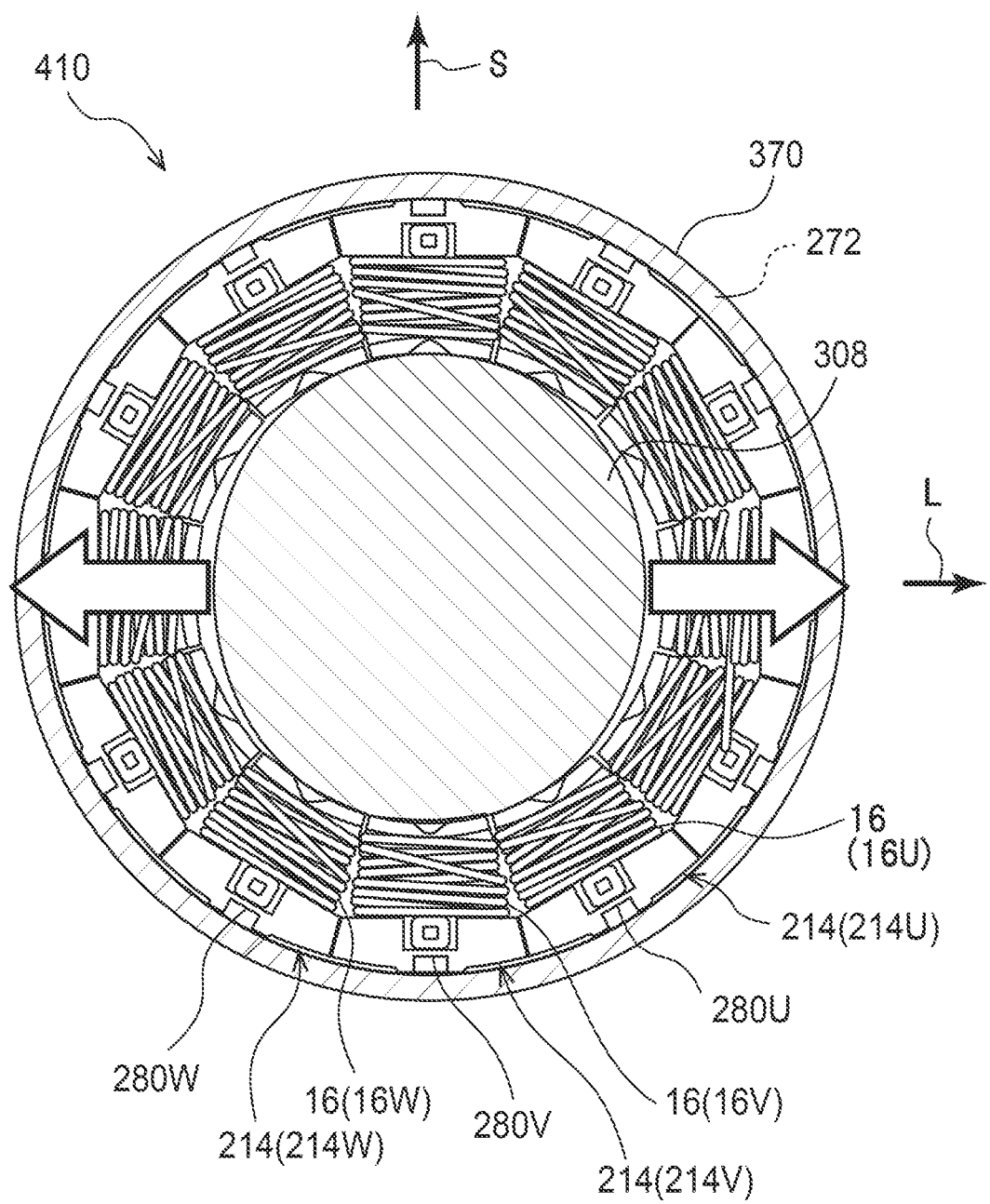
FIG. 29D is a horizontal cross-section illustrating a state after the plastic deformation groove has been formed at the outer peripheral face of the stator case.

Next, as illustrated in FIG. 29C, the roller body 204 is pressed against the outer peripheral face of the stator case 370 with a specific pressure, and the roller body 204 is rolled around a circumferential direction of the stator case 370. As a result, as illustrated in FIG. 29D, the stator case 370 and the core configuration sections 214U, 214V, 214W are integrated together whilst the distortion of the stator case 370 is corrected (distortion correction and crimping process).

Next, the metal core 308 is removed from the inner peripheral portion of the core configuration sections 214U, 214V, 214W, thereby configuring the stator 410.

As explained above, in the present manufacturing method, the stator case 370 and the core configuration sections 214U, 214V, 214W can be integrated together whilst correcting distortion in the stator case 370.

What is claimed is:

1. A stator manufacturing method comprising:
    a core array process in which core configuration sections are arrayed in a ring shape, each of the core configuration sections including a yoke configuration section and a teeth section, the yoke configuration sections configuring a ring shaped yoke and is segmented on a circumferential direction of the yoke, and the teeth projecting out from the yoke configuration section toward a radial direction inside of the yoke;
    a metal core setting process in which a metal core with outer diameter corresponding to an internal diameter of the ring shape-arrayed core configuration sections is inserted into an inner peripheral portion of the ring shape-arrayed core configuration sections; and
    a crimping process that integrates a stator case and the core configuration sections together by disposing the stator case, formed in a circular cylinder shape with an internal diameter that exceeds an outer diameter of the ring shape-arrayed core configuration sections, along an outer peripheral portion of the ring shape-arrayed core configuration sections, and forming a plastic deformation portion along a circumferential direction on an outer peripheral face of the stator case.

2. The stator manufacturing method of claim 1, further comprising:
    a case measurement process that measures distortion of the stator case; and
    a metal core selection process that selects the metal core corresponding to distortion of the stator case measured in the case measurement process; and wherein
    in the crimping process, distortion correction and crimping processes are performed to integrate the stator case and the core configuration sections together whilst correcting distortion of the stator case.

3. The stator manufacturing method of claim 1, wherein:
    in the metal core setting process, an outer peripheral face of the metal core and an inner peripheral face of the core configuration sections are brought into contact with each other by expanding a diameter of the metal core.

4. The stator manufacturing method of claim 1, wherein:
    in the metal core setting process, an outer peripheral face of the core configuration sections and an inner peripheral face of the stator case are brought into contact with each other by further expanding the diameter of the metal core; and
    in the crimping process, a plurality of the plastic deformation portions are formed on the outer peripheral face of the stator case with the outer peripheral face of the core configuration sections and the inner peripheral face of the stator case in a contacting state.

5. The stator manufacturing method of claim 1, wherein the diameter of the metal core is compressed when a pressing force exceeding a specific value is input to the outer peripheral face of the stator case to form the plastic deformation portion.

* * * * *